United States Patent
Kondoh

(10) Patent No.: US 9,493,092 B2
(45) Date of Patent: Nov. 15, 2016

(54) ELECTRIC AUTOMOBILE

(75) Inventor: Hajime Kondoh, Chuo-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 125 days.

(21) Appl. No.: 13/807,266

(22) PCT Filed: May 25, 2011

(86) PCT No.: PCT/JP2011/061997
§ 371 (c)(1),
(2), (4) Date: Dec. 27, 2012

(87) PCT Pub. No.: WO2012/002082
PCT Pub. Date: Jan. 5, 2012

(65) Prior Publication Data
US 2013/0110337 A1    May 2, 2013

(30) Foreign Application Priority Data

Jun. 29, 2010    (JP) ................... 2010-148244

(51) Int. Cl.
*B60L 15/00* (2006.01)
*H02P 31/00* (2006.01)
(Continued)

(52) U.S. Cl.
CPC ............ *B60L 15/00* (2013.01); *B60L 11/1868* (2013.01); *H02J 7/34* (2013.01); *H02P 31/00* (2013.01);
(Continued)

(58) Field of Classification Search
None
See application file for complete search history.

(56) References Cited

U.S. PATENT DOCUMENTS 5,877,601 A    3/1999  Obara et al.
7,122,991 B2 * 10/2006 Kitajima ................. B60K 6/26
                                                                318/440
(Continued)

FOREIGN PATENT DOCUMENTS

DE    19724356 C1 *  5/1998  ............ H02J 7/1423
JP    4-271209           9/1992
(Continued)

OTHER PUBLICATIONS

Japanese Office Action for Application No. 2010-148270, 4 pages, dated Aug. 20, 2013.
(Continued)

*Primary Examiner* — Jean-Paul Cass
(74) *Attorney, Agent, or Firm* — Nelson Mullins Riley & Scarborough LLP; Anthony A. Laurentano

(57) ABSTRACT

When a control device of an electric automobile carries out fixing control for fixing the energization or cut-off of semiconductor switches in each of at least one switching cycle, at least one cut-off control is implemented among a first cut-off control for cutting off both a power generation path and a power charging path of one power system, and a second cut-off control for cutting off all of the power generation paths or the power charging paths of all the power systems. When only the first cut-off control is implemented, the energization or the cut-off of the semiconductor switches is controlled so that the number of power systems, implementing the first cut-off control is N−1 {N being an integer of at least 2 representing the number of power supplies and semiconductor switches}.

13 Claims, 37 Drawing Sheets

(51) Int. Cl.
*B60L 11/18* (2006.01)
*H02J 7/34* (2006.01)

(52) U.S. Cl.
CPC ......... *Y02T 10/7005* (2013.01); *Y02T 10/7066* (2013.01)

(56) References Cited

U.S. PATENT DOCUMENTS

| | | | |
|---|---|---|---|
| 7,626,353 B2 * | 12/2009 | Kanouda | G06F 1/26 307/46 |
| 7,728,545 B2 * | 6/2010 | Kanouda | H01M 10/441 320/101 |
| 7,741,895 B2 * | 6/2010 | Kihara | H03K 17/6874 327/423 |
| 7,764,042 B2 * | 7/2010 | Obata | B60L 11/08 318/800 |
| 8,039,987 B2 * | 10/2011 | Sawada | B60K 6/445 307/9.1 |
| 8,159,823 B2 * | 4/2012 | Murakami | H01L 23/473 180/243 |
| 8,228,690 B2 * | 7/2012 | Watanabe | H02J 1/10 307/43 |
| 8,344,677 B2 * | 1/2013 | Takizawa | H02M 1/32 180/65.1 |
| 8,422,235 B2 * | 4/2013 | Azuma | B60K 6/445 361/688 |
| 8,557,461 B2 * | 10/2013 | Kazuno | H01M 8/0488 429/428 |
| 8,565,930 B2 * | 10/2013 | Miwa | B60K 6/445 141/192 |
| 8,593,845 B2 * | 11/2013 | Manabe | B60L 11/1887 363/131 |
| 8,715,876 B2 * | 5/2014 | Kazuno | B60L 1/003 307/46 |
| 8,795,861 B2 * | 8/2014 | Kazuno | H01M 16/006 307/46 |
| 2006/0006832 A1 * | 1/2006 | Kitajima | B60K 6/26 318/800 |
| 2006/0083955 A1 * | 4/2006 | Kanouda | G06F 1/26 429/9 |
| 2006/0091833 A1 | 5/2006 | Kitajima et al. | |
| 2006/0164027 A1 * | 7/2006 | Welchko | B60L 11/12 318/105 |
| 2007/0171684 A1 * | 7/2007 | Fukumoto | H02M 7/4807 363/21.09 |
| 2007/0216339 A1 * | 9/2007 | Yoshimoto | H02M 7/483 318/800 |
| 2008/0007197 A1 * | 1/2008 | Obata | B60L 11/08 318/801 |
| 2009/0243386 A1 | 10/2009 | Mimatsu et al. | |
| 2010/0019569 A1 * | 1/2010 | Izumi | B60L 11/1868 307/9.1 |
| 2010/0060080 A1 * | 3/2010 | Sawada | B60K 6/445 307/48 |
| 2010/0315780 A1 * | 12/2010 | Murakami | H01L 23/473 361/699 |
| 2011/0006718 A1 * | 1/2011 | Teshima | H05K 3/284 318/494 |
| 2011/0025236 A1 * | 2/2011 | Takizawa | H02M 1/32 318/139 |
| 2011/0032733 A1 * | 2/2011 | Watanabe | H02J 1/10 363/21.14 |
| 2011/0051371 A1 * | 3/2011 | Azuma | B60K 6/445 361/699 |
| 2011/0196545 A1 * | 8/2011 | Miwa | B60K 6/445 700/292 |
| 2012/0026757 A1 * | 2/2012 | Manabe | B60L 11/1887 363/21.12 |
| 2012/0140526 A1 * | 6/2012 | Martinelli | H02J 7/35 363/21.06 |
| 2012/0288777 A1 * | 11/2012 | Kazuno | H01M 8/04619 429/432 |
| 2012/0288778 A1 * | 11/2012 | Kazuno | H01M 8/04559 429/432 |
| 2012/0292990 A1 * | 11/2012 | Watanabe | H01M 8/0491 307/10.1 |
| 2012/0321917 A1 * | 12/2012 | Kazuno | H01M 16/006 429/9 |
| 2013/0063072 A1 * | 3/2013 | Shirasaka | H01M 8/0488 320/101 |
| 2013/0110337 A1 * | 5/2013 | Kondoh | B60L 11/1868 701/22 |
| 2013/0285581 A1 * | 10/2013 | Meyer, III | H01M 10/44 318/139 |
| 2013/0314027 A1 * | 11/2013 | Li | H02J 7/0016 320/107 |

FOREIGN PATENT DOCUMENTS

| | | |
|---|---|---|
| JP | 8-19262 | 1/1996 |
| JP | 8-251714 | 9/1996 |
| JP | 9-294301 | 11/1997 |
| JP | 2000-278806 | 10/2000 |
| JP | 2000-354304 | 12/2000 |
| JP | 2001-211698 | 8/2001 |
| JP | 2005-237064 | 9/2005 |
| JP | 2006-129644 | 5/2006 |
| JP | 2007-202387 | 8/2007 |
| JP | 2008-17560 | 1/2008 |
| JP | 2008-154431 | 7/2008 |
| JP | 2009-240125 | 10/2009 |
| JP | 2010-4611 | 1/2010 |
| JP | 2010-4719 | 1/2010 |
| WO | 2009/136483 A1 | 11/2009 |

OTHER PUBLICATIONS

Lu, Shuai et al., "High Efficiency Energy Storage System Design for Hybrid Electric Vehicle with Motor Drive Integration," 41st IAS Annual Meeting, Industry Applications Conference, pp. 2560-2567 (2006).
German Office Action for Application No. 112011102229.8, 10 pages, dated Sep. 6, 2013.
International Search Report for Application No. PCT/JP2011/061997, 11 pages, dated Aug. 16, 2011.
Japanese Notice of Allowance for Application No. 2010-148245, 4 pages, dated Jan. 7, 2014.
Japanese Office Action for Application No. 2012-522523, 5 pages, dated Aug. 5, 2014.

* cited by examiner

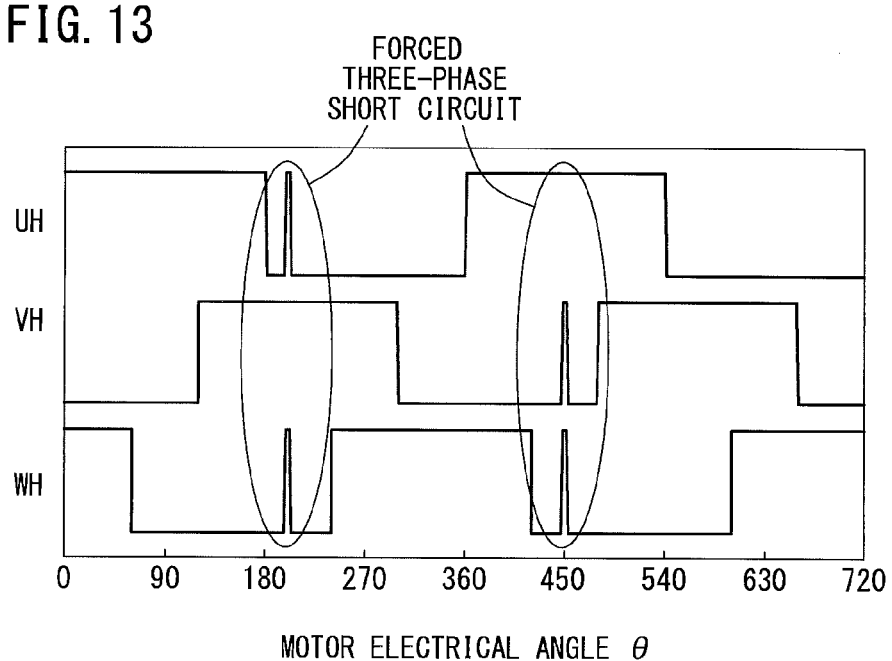

FIG. 14

| MODE | | GENERATING SW ELEMENT | CHARGING SW ELEMENT |
|---|---|---|---|
| STOP | FIRST BATTERY | OFF | OFF |
| | SECOND BATTERY | OFF | OFF |
| ONE POWER SUPPLY GENERATION (FIRST BATTERY) | FIRST BATTERY | ON | OFF |
| | SECOND BATTERY | OFF | OFF |
| ONE POWER SUPPLY GENERATION (SECOND BATTERY) | FIRST BATTERY | OFF | OFF |
| | SECOND BATTERY | ON | OFF |
| ONE POWER SUPPLY CHARGE (FIRST BATTERY) | FIRST BATTERY | OFF | ON |
| | SECOND BATTERY | OFF | OFF |
| ONE POWER SUPPLY CHARGE (SECOND BATTERY) | FIRST BATTERY | OFF | OFF |
| | SECOND BATTERY | OFF | ON |
| ONE POWER SUPPLY USE (FIRST BATTERY) | FIRST BATTERY | ON | ON |
| | SECOND BATTERY | OFF | OFF |
| ONE POWER SUPPLY USE (SECOND BATTERY) | FIRST BATTERY | OFF | OFF |
| | SECOND BATTERY | ON | ON |
| HIGH-VOLTAGE BATTERY GENERATION | FIRST BATTERY | ON | OFF |
| | SECOND BATTERY | ON | OFF |
| LOW-VOLTAGE BATTERY CHARGE | FIRST BATTERY | OFF | ON |
| | SECOND BATTERY | OFF | ON |

FIG. 20

| MODE | | GENERATING SW ELEMENT | CHARGING SW ELEMENT |
|---|---|---|---|
| STOP | FIRST BATTERY (VOLTAGE: HIGH) | OFF | OFF |
| | SECOND BATTERY (VOLTAGE: LOW) | OFF | OFF |
| ONE POWER SUPPLY GENERATION (VOLTAGE: HIGH) | FIRST BATTERY (VOLTAGE: HIGH) | ON | OFF |
| | SECOND BATTERY (VOLTAGE: LOW) | OFF | OFF |
| ONE POWER SUPPLY GENERATION (VOLTAGE: LOW) | FIRST BATTERY (VOLTAGE: HIGH) | OFF | OFF |
| | SECOND BATTERY (VOLTAGE: LOW) | ON | OFF |
| ONE POWER SUPPLY CHARGE (VOLTAGE: HIGH) | FIRST BATTERY (VOLTAGE: HIGH) | OFF | ON |
| | SECOND BATTERY (VOLTAGE: LOW) | OFF | OFF |
| ONE POWER SUPPLY CHARGE (VOLTAGE: LOW) | FIRST BATTERY (VOLTAGE: HIGH) | OFF | OFF |
| | SECOND BATTERY (VOLTAGE: LOW) | OFF | ON |
| ONE POWER SUPPLY USE (VOLTAGE: HIGH) | FIRST BATTERY (VOLTAGE: HIGH) | ON | ON |
| | SECOND BATTERY (VOLTAGE: LOW) | OFF | OFF |
| ONE POWER SUPPLY USE (VOLTAGE: LOW) | FIRST BATTERY (VOLTAGE: HIGH) | OFF | OFF |
| | SECOND BATTERY (VOLTAGE: LOW) | ON | ON |
| HIGH-VOLTAGE BATTERY GENERATION | FIRST BATTERY (VOLTAGE: HIGH) | ON | OFF |
| | SECOND BATTERY (VOLTAGE: LOW) | ON | OFF |
| LOW-VOLTAGE BATTERY CHARGE | FIRST BATTERY (VOLTAGE: HIGH) | OFF | ON |
| | SECOND BATTERY (VOLTAGE: LOW) | OFF | ON |
| ONE POWER SUPPLY GENERATION & ONE POWER SUPPLY CHARGE | FIRST BATTERY (VOLTAGE: HIGH) | OFF | ON |
| | SECOND BATTERY (VOLTAGE: LOW) | ON | OFF |
| HIGH-VOLTAGE BATTERY GENERATION & ONE POWER SUPPLY CHARGE | FIRST BATTERY (VOLTAGE: HIGH) | ON | ON |
| | SECOND BATTERY (VOLTAGE: LOW) | ON | OFF |
| ONE POWER SUPPLY GENERATION & LOW-VOLTAGE BATTERY CHARGE | FIRST BATTERY (VOLTAGE: HIGH) | OFF | ON |
| | SECOND BATTERY (VOLTAGE: LOW) | ON | ON |

FIG. 23

| MODE | | GENERATING SW ELEMENT | CHARGING SW ELEMENT |
|---|---|---|---|
| STOP | FC | OFF | OFF |
| | BATTERY | OFF | OFF |
| ONE POWER SUPPLY GENERATION (FC) | FC | ON | OFF |
| | BATTERY | ON | OFF |
| ONE POWER SUPPLY GENERATION (BATTERY) | FC | OFF | OFF |
| | BATTERY | ON | OFF |
| ONE POWER SUPPLY CHARGE (BATTERY) | FC | OFF | OFF |
| | BATTERY | OFF | ON |
| ONE POWER SUPPLY USE (BATTERY) | FC | OFF | OFF |
| | BATTERY | ON | ON |
| ONE POWER SUPPLY GENERATION & ONE POWER SUPPLY CHARGE | FC | ON | OFF |
| | BATTERY | OFF | ON |

FIG. 26

| MODE | | GENERATING SW ELEMENT | CHARGING SW ELEMENT |
|---|---|---|---|
| STOP | FC | OFF | OFF |
| | FIRST BATTERY | OFF | OFF |
| | SECOND BATTERY | OFF | OFF |
| ONE POWER SUPPLY GENERATION (FC, FIRST BATTERY) | FC | ON | OFF |
| | FIRST BATTERY | ON | OFF |
| | SECOND BATTERY | OFF | OFF |
| ONE POWER SUPPLY GENERATION (FC, SECOND BATTERY) | FC | ON | OFF |
| | FIRST BATTERY | OFF | OFF |
| | SECOND BATTERY | ON | OFF |
| ONE POWER SUPPLY GENERATION (FIRST BATTERY) | FC | OFF | OFF |
| | FIRST BATTERY | ON | OFF |
| | SECOND BATTERY | OFF | OFF |
| ONE POWER SUPPLY GENERATION (SECOND BATTERY) | FC | OFF | OFF |
| | FIRST BATTERY | OFF | OFF |
| | SECOND BATTERY | ON | OFF |
| ONE POWER SUPPLY CHARGE (FIRST BATTERY) | FC | OFF | OFF |
| | FIRST BATTERY | OFF | ON |
| | SECOND BATTERY | OFF | OFF |
| ONE POWER SUPPLY CHARGE (SECOND BATTERY) | FC | OFF | OFF |
| | FIRST BATTERY | OFF | OFF |
| | SECOND BATTERY | OFF | ON |
| ONE POWER SUPPLY USE (FIRST BATTERY) | FC | OFF | OFF |
| | FIRST BATTERY | ON | ON |
| | SECOND BATTERY | OFF | OFF |
| ONE POWER SUPPLY USE (SECOND BATTERY) | FC | OFF | OFF |
| | FIRST BATTERY | OFF | OFF |
| | SECOND BATTERY | ON | ON |
| HIGH-VOLTAGE BATTERY GENERATION | FC | OFF | OFF |
| | FIRST BATTERY | ON | OFF |
| | SECOND BATTERY | ON | OFF |
| LOW-VOLTAGE BATTERY CHARGE | FC | OFF | OFF |
| | FIRST BATTERY | OFF | ON |
| | SECOND BATTERY | OFF | ON |

FIG. 28

| MODE | | GENERATING SW ELEMENT | CHARGING SW ELEMENT |
|---|---|---|---|
| STOP | FC | OFF | OFF |
| | FIRST BATTERY | OFF | OFF |
| | SECOND BATTERY | OFF | OFF |
| ONE POWER SUPPLY GENERATION (FC, VOLTAGE: HIGH) | FC | ON | OFF |
| | FIRST BATTERY | ON | OFF |
| | SECOND BATTERY | OFF | OFF |
| ONE POWER SUPPLY GENERATION (FC, VOLTAGE: LOW) | FC | ON | OFF |
| | FIRST BATTERY | OFF | OFF |
| | SECOND BATTERY | ON | OFF |
| ONE POWER SUPPLY GENERATION (VOLTAGE: HIGH) | FC | OFF | OFF |
| | FIRST BATTERY (VOLTAGE: HIGH) | ON | OFF |
| | SECOND BATTERY (VOLTAGE: LOW) | OFF | OFF |
| ONE POWER SUPPLY GENERATION (VOLTAGE: LOW) | FC | OFF | OFF |
| | FIRST BATTERY (VOLTAGE: HIGH) | OFF | OFF |
| | SECOND BATTERY (VOLTAGE: LOW) | ON | OFF |
| ONE POWER SUPPLY CHARGE (VOLTAGE: HIGH) | FC | OFF | OFF |
| | FIRST BATTERY (VOLTAGE: HIGH) | OFF | ON |
| | SECOND BATTERY (VOLTAGE: LOW) | OFF | OFF |
| ONE POWER SUPPLY CHARGE (VOLTAGE: LOW) | FC | OFF | OFF |
| | FIRST BATTERY (VOLTAGE: HIGH) | OFF | OFF |
| | SECOND BATTERY (VOLTAGE: LOW) | OFF | ON |
| ONE POWER SUPPLY USE (VOLTAGE: HIGH) | FC | OFF | OFF |
| | FIRST BATTERY (VOLTAGE: HIGH) | ON | ON |
| | SECOND BATTERY (VOLTAGE: LOW) | OFF | OFF |
| ONE POWER SUPPLY USE (VOLTAGE: LOW) | FC | OFF | OFF |
| | FIRST BATTERY (VOLTAGE: HIGH) | OFF | OFF |
| | SECOND BATTERY (VOLTAGE: LOW) | ON | ON |
| HIGH-VOLTAGE BATTERY GENERATION | FC | OFF | OFF |
| | FIRST BATTERY (VOLTAGE: HIGH) | ON | OFF |
| | SECOND BATTERY (VOLTAGE: LOW) | ON | OFF |
| LOW-VOLTAGE BATTERY CHARGE | FC | OFF | OFF |
| | FIRST BATTERY (VOLTAGE: HIGH) | OFF | ON |
| | SECOND BATTERY (VOLTAGE: LOW) | OFF | ON |
| ONE POWER SUPPLY GENERATION & ONE POWER SUPPLY CHARGE | FC | OFF | OFF |
| | FIRST BATTERY (VOLTAGE: HIGH) | OFF | ON |
| | SECOND BATTERY (VOLTAGE: LOW) | ON | OFF |
| HIGH-VOLTAGE BATTERY GENERATION & ONE POWER SUPPLY CHARGE | FC | OFF | OFF |
| | FIRST BATTERY (VOLTAGE: HIGH) | ON | ON |
| | SECOND BATTERY (VOLTAGE: LOW) | ON | OFF |
| ONE POWER SUPPLY GENERATION & LOW-VOLTAGE BATTERY CHARGE | FC | OFF | OFF |
| | FIRST BATTERY (VOLTAGE: HIGH) | OFF | ON |
| | SECOND BATTERY (VOLTAGE: LOW) | ON | ON |

FIG. 29

FIRST CONTROL RULE WHICH DOES NOT
USE POWER SUPPLY VOLTAGES

|  | GENERATING SW ELEMENT | CHARGING SW ELEMENT |
|---|---|---|
| FIRST POWER SUPPLY | OFF | ↑<br>CAN BE TURNED OFF ONLY<br>↓ |
| SECOND POWER SUPPLY | OFF | |
| THIRD POWER SUPPLY | OFF | |
| FOURTH POWER SUPPLY | ON | CAN BE TURNED ON AND OFF |
| FIFTH POWER SUPPLY | OFF | ↑<br><br>CAN BE TURNED OFF ONLY<br><br>↓ |
| SIXTH POWER SUPPLY | OFF | |
| ⋮ | ⋮ | |
| nTH POWER SUPPLY | OFF | |

FIG. 30

SECOND CONTROL RULE WHICH DOES NOT
USE POWER SUPPLY VOLTAGES

|  | GENERATING SW ELEMENT | CHARGING SW ELEMENT |
|---|---|---|
| FIRST POWER SUPPLY | OFF | CAN BE TURNED ON AND OFF |
| SECOND POWER SUPPLY | OFF | |
| THIRD POWER SUPPLY | OFF | |
| FOURTH POWER SUPPLY | OFF | |
| FIFTH POWER SUPPLY | OFF | |
| SIXTH POWER SUPPLY | OFF | |
| ⋮ | ⋮ | |
| nTH POWER SUPPLY | OFF | |

FIG. 31

FIRST CONTROL RULE WHICH USES POWER SUPPLY VOLTAGES

| | | GENERATING SW ELEMENT | CHARGING SW ELEMENT |
|---|---|---|---|
| HIGHER ↑ VOLTAGE ↓ LOWER | FIRST POWER SUPPLY | OFF | CAN BE TURNED ON AND OFF |
| | SECOND POWER SUPPLY | OFF | |
| | THIRD POWER SUPPLY | OFF | |
| | FOURTH POWER SUPPLY | ON | |
| | FIFTH POWER SUPPLY | OFF | CAN BE TURNED OFF ONLY |
| | SIXTH POWER SUPPLY | ON | |
| | ⋮ | ⋮ | |
| | nTH POWER SUPPLY | OFF | |

FIG. 32

SECOND RULE WHICH USES POWER SUPPLY VOLTAGES

| | | GENERATING SW ELEMENT | CHARGING SW ELEMENT |
|---|---|---|---|
| HIGHER ↑ VOLTAGE ↓ LOWER | FIRST POWER SUPPLY | CAN BE TURNED OFF ONLY ↑ ↓ | OFF |
| | SECOND POWER SUPPLY | | OFF |
| | THIRD POWER SUPPLY | | OFF |
| | FOURTH POWER SUPPLY | | ON |
| | FIFTH POWER SUPPLY | | OFF |
| | SIXTH POWER SUPPLY | CAN BE TURNED ON AND OFF ↑ ↓ | ON |
| | SEVENTH POWER SUPPLY | | OFF |
| | ⋅ ⋅ ⋅ | | ⋅ ⋅ ⋅ |
| | nTH POWER SUPPLY | | OFF |

ELECTRIC AUTOMOBILE

RELATED APPLICATIONS

This application is a 35 U.S.C. 371 national stage filing of International Application No. PCT/JP2011/061997, filed May 25, 2011, which claims priority to Japanese Patent Application No. 2010-148244 filed on Jun. 29, 2010 in Japan. The contents of the aforementioned applications are hereby incorporated by reference.

TECHNICAL FIELD

The present invention relates to an electric automobile having a primary side including a plurality of power supplies whose power supply voltages are variable independently of each other and a secondary side including an inverter and a drive motor connected to the inverter.

BACKGROUND ART

Growing efforts are being made to develop electric automobiles including fuel cell vehicles and hybrid vehicles. Some of the electric vehicles are capable of selectively supplying electric power from a plurality of power supplies to a drive motor and of selectively charging the power supplies with regenerated electric power from the drive motor {see Japanese Laid-Open Patent Publication No. 2005-237064 (hereinafter referred to as "JP2005-237064A")}. According to JP2005-237064A, when the vehicle is propelled in a power mode, some batteries whose voltages are equal to or higher than a certain voltage are selected from a plurality of batteries (14), and one of the selected batteries which has the lowest voltage is selected and used (see FIG. 2, paragraphs [0031] through [0041]). When the vehicle is traveling in a regenerative mode, one of the batteries which has the lowest remaining battery level is selected and charged (see FIG. 4, paragraphs [0042] through [0050]).

SUMMARY OF INVENTION

According to JP2005-237064A, as described above, batteries to be used are selected depending on the power mode and the regenerative mode. However, processes for selecting batteries are limited.

The present invention has been made in view of the above problems. It is an object of the present invention to provide an electric automobile which has an increased range of options for processes for using power supplies.

An electric automobile according to the present invention comprises a primary side including N (N is an integer of 2 or greater) power supplies whose power supply voltages are variable independently of each other, a secondary side including an inverter and a drive motor connected to the inverter, first through Nth electric power systems connecting the primary side and the secondary side with the N power supplies being parallel to each other, N semiconductor switches disposed respectively in the first through Nth electric power systems, for being rendered nonconductive separately in a generating direction and a charging direction of bidirectional conduction, and a control unit for controlling nonconduction of the N semiconductor switches, wherein for fixedly rendering the semiconductor switches conductive or nonconductive in at least each switching period, the control unit carries out at least one of a first cut-off control process for cutting off both a generating path and a charging path of one of the electric power systems and a second cut-off control process for cutting off all generating paths or charging paths of all the electric power systems, and if the control unit carries out only the first cut-off control process, the control unit controls conduction or nonconduction of the semiconductor switches such that the first cut-off control process is performed on (N−1) electric power system or systems.

According to the present invention, when only the first cut-off control process for cutting off both the generating path and the charging path of one of the electric power systems is carried out, the control unit controls conduction or nonconduction of the semiconductor switches such that the first cut-off control process is performed on (N−1) electric power system(s). Therefore, when only the first cut-off control process is carried out, only one electric power system renders the semiconductor switch conductive. Consequently, a short-circuited state wherein a current flows from one of the power supplies into another power supply through a parallel circuit is prevented from being developed.

When only the second cut-off control process for cutting off all the generating paths or charging paths of all the electric power systems is carried out, all the charging paths are cut off at the time the power supplies generate electric power, and all the generating paths are cut off at the time the power supplies are charged. Therefore, the above short-circuited state is prevented from being developed when only the second cut-off control process is carried out.

Therefore, when either one of the first cut-off control process and the second cut-off control process is carried out, the above short-circuited state is prevented from occurring. An excessive current is thus prevented from being generated, particularly when switching between the power supplies, due to a voltage difference between the power supplies, and a power loss is also prevented from being caused due to equalization of the power supplies. When at least one of the first cut-off control process and the second cut-off control process is carried out, a short-circuited state is reliably avoided without performing a process which uses high and low voltages of the power supplies.

It is thus possible to increase the range of options for processes for using the power supplies while achieving the above advantages.

An electric automobile according to the present invention comprises a primary side including N (N is an integer of 2 or greater) power supplies whose power supply voltages are variable independently of each other, a secondary side including an inverter and a drive motor connected to the inverter, first through Nth electric power systems connecting the primary side and the secondary side with the N power supplies being parallel to each other, N semiconductor switches disposed respectively in the first through Nth electric power systems, for being rendered nonconductive separately in a generating direction and a charging direction of bidirectional conduction, and a control unit for controlling nonconduction of the N semiconductor switches, wherein when the control unit fixedly renders the semiconductor switches conductive or nonconductive in at least each switching period, the control unit selectively renders the semiconductor switches conductive or nonconductive to cause at least one of a first cut-off state in which a charging path whose voltage is lower than a highest voltage generating path whose voltage is highest of energized generating paths is cut off and a second cut-off state in which a generating path whose voltage is higher than a lowest voltage charging path whose voltage is lowest of energized charging paths is cut off.

According to the present invention, when the semiconductor switches are selectively rendered conductive and nonconductive, at least one of the first cut-off state and the second cut-off state is achieved. In the first cut-off state, the charging path whose voltage is lower than the highest voltage generating path whose voltage is highest of energized generating paths is cut off. Consequently, a short-circuited state wherein a current flows from the highest voltage generating path into either one of the charging paths through a parallel circuit is prevented from being developed. In the second cut-off state, the generating path whose voltage is higher than the lowest voltage charging path whose voltage is lowest of energized charging paths is cut off. Consequently, a short-circuited state wherein a current flows from the lowest voltage charging path into either one of the generating paths through a parallel circuit is prevented from being developed.

Therefore, the above short-circuited state is prevented from occurring in either one of the first cut-off state and the second cut-off state. An excessive current is thus prevented from being generated, particularly when switching between the power supplies, due to a voltage difference between the power supplies, and a power loss is also prevented from being caused due to equalization of the power supplies.

It is thus possible to increase the range of options for processes for using the power supplies while achieving the above advantages.

The semiconductor switches may comprise bidirectional switches, which can separately be rendered conductive and nonconductive bidirectionally.

A dead time may be inserted into drive signals for the semiconductor switches for switching between the generating path of one of the power supplies and the charging path of another one of the power supplies. Therefore, a short circuit is thus reliably prevented from occurring between the power supplies.

The control unit may control the semiconductor switches for changing from a bidirectionally conductive state of one of the power supplies to a bidirectionally conductive state of another one of the power supplies. Therefore, the power supplies can generate electric power and can be charged while being switched over.

The control unit may control the semiconductor switches for changing from a bidirectionally conductive state of one of the power supplies to a bidirectionally conductive state of another one of the power supplies when the electric automobile is in an intermediate mode between a power mode and a regenerative mode. Consequently, power supplies for generating electric power and power supplies for being charged can be used separately from each other.

The control unit may simultaneously turn on at least two generating switching elements when the electric automobile is in a power mode. Since the power supply whose voltage is higher now supplies electric power without the need for comparing the voltages of the power supplies, the electric power can efficiently be supplied under a high load. The power supply whose voltage is lower, i.e., whose state of charge is lower, is prevented from generating electric power.

The control unit may simultaneously turn on at least two charging switching elements when the electric automobile is in a regenerative mode. The power supply whose voltage is lower is now automatically positively charged without the need for comparing the voltages of the power supplies. As the power supply whose state of charge is lower can positively be charged, an electric energy storage device is prevented from being excessively discharged.

It may be judged whether the electric automobile is in a power mode or a regenerative mode, at least two generating switching elements may be connected if the electric automobile is in the power mode, and at least two charging switching elements may be connected if the electric automobile is in the regenerative mode. When the electric automobile is in the power mode, since the power supply whose voltage is higher now supplies electric power without the need for comparing the voltages of the power supplies, the electric power can efficiently be supplied under a high load. The power supply whose voltage is lower, i.e., whose state of charge is lower, is prevented from generating electric power. When the electric automobile is in the regenerative mode, the power supply whose voltage is lower is now automatically positively charged without the need for comparing the voltages of the power supplies. As the power supply whose state of charge is lower can positively be charged, an electric energy storage device is prevented from being excessively discharged. An appropriate control process can thus be carried out depending on the automobile mode.

It may be judged whether the electric automobile is in an intermediate mode between the power mode and the regenerative mode, and the control unit may control the semiconductor switches to render one of the power supplies conductive bidirectionally and render another one of the power supplies nonconductive bidirectionally when the electric automobile is in the intermediate mode. When the electric automobile is in the intermediate mode, the single power supply can generate electric power and can be charged. The power supplies and the control unit can thus operate stably in the intermediate mode, and a short circuit is reliably prevented from occurring between the power supplies.

The intermediate mode may be judged based on at least one command value or measured value of an input electric power and an input current of the inverter and a torque and a load electric power of the drive motor.

The intermediate mode may be determined by a predicted time until actual electric power crosses a zero point.

The control unit may selectively render semiconductor switches conductive or nonconductive while a three-phase short-circuited state is being developed in the inverter. Therefore, a short circuit is reliably prevented from occurring between the power supplies.

For example, the power supplies may include at least one of an electric energy storage device, a fuel cell, and an electric generator.

The electric automobile may further comprise first through Nth voltage sensors, wherein the control unit may grasp magnitudes of voltages of the power supplies from the voltage sensors, and may control the semiconductor switches based on the grasped magnitudes of the voltages. Since the control unit controls the semiconductor switches based on the grasped magnitudes of the voltages, it can reliably prevent a short circuit from being developed between the power supplies.

An electric automobile according to the present invention comprises a primary side including a first power supply and a second power supply as at least two power supplies whose power supply voltages are variable, a secondary side including a three-phase AC brushless motor for propelling the electric automobile and an inverter having parallel pairs of series-connected upper arm elements and lower arm elements connected in a three-phase configuration, the three-phase AC brushless motor having three-phase lines connected respectively to midpoints between the upper arm elements and the lower arm elements, a first electric power system and a second electric power system connecting the primary side and the secondary side with the first power supply and the second power supply being parallel to each other, switches for selectively using either one of the first power supply and the second power supply as a power supply for the motor, and a control unit for selectively turning on and off the switches in a three-phase short-circuited state in which all the upper arm elements of the inverter are turned on and all the lower arm elements of the inverter are turned off, or all the upper arm elements of the inverter are turned off and all the lower arm elements of the inverter are turned on.

According to the present invention, the first power supply and the second power supply are selectively used as a power supply for the drive motor while a three-phase short-circuited state is being developed in the inverter. Therefore, a voltage variation due to the switching between the first power supply and the second power supply is not transmitted to the drive motor, which is thus prevented from causing an unwanted torque variation.

The control unit may turn on and off upper arm switching elements in three phases and lower arm switching elements in three phases based on a result of comparison between voltage command values in three phases and a carrier signal, and the control unit may detect the three-phase short-circuited state by detecting when the carrier signal is higher than all the voltage command values in three phases or when the carrier signal is lower than all the voltage command values in three phases.

While the inverter is being normally controlled, therefore, it is possible to judge a three-phase short-circuited state as being developed when all the upper arm elements in the respective three phases or all the lower arm elements in the respective three phases are turned on, and to switch between the arm elements in the three-phase short-circuited state. Therefore, the arm elements can be switched over while preventing the drive motor from causing an unwanted torque variation while the inverter is being normally controlled.

In response to a switching request for switching between the first power supply and the second power supply, the control unit may output drive signals to all the upper arm switching elements in three phases or all the lower arm switching elements in three phases, forcibly causing the three-phase short-circuited state. Consequently, when switching between the first power supply and the second power supply is required, they can be switched over at an appropriate timing.

BRIEF DESCRIPTION OF DRAWINGS

FIG. 13 is a diagram showing an example of the waveforms of the drive signals for producing a forced short circuit;

FIG. 14 is a table showing the relationship between modes and turning-on and -off of switching elements according to the first embodiment;

FIG. 20 is a table showing the relationship between modes and turning-on and -off of switching elements according to the second embodiment;

FIG. 23 is a table showing the relationship between modes and turning-on and -off of switching elements according to the third embodiment;

FIG. 26 is a table showing the relationship between modes and turning-on and -off of switching elements according to the fourth embodiment;

FIG. 28 is a table showing the relationship between modes and turning-on and -off of switching elements according to the fifth embodiment;

FIG. 29 is a table illustrative of a first control rule in case power supply voltages are not used;

FIG. 30 is a table illustrative of a second control rule in case power supply voltages are not used;

FIG. 31 is a table illustrative of a first control rule in case power supply voltages are used;

FIG. 32 is a table illustrative of a second control rule in case power supply voltages are used;

DESCRIPTION OF EMBODIMENTS

I. First Embodiment

A. Description of Arrangement

Figure 1:
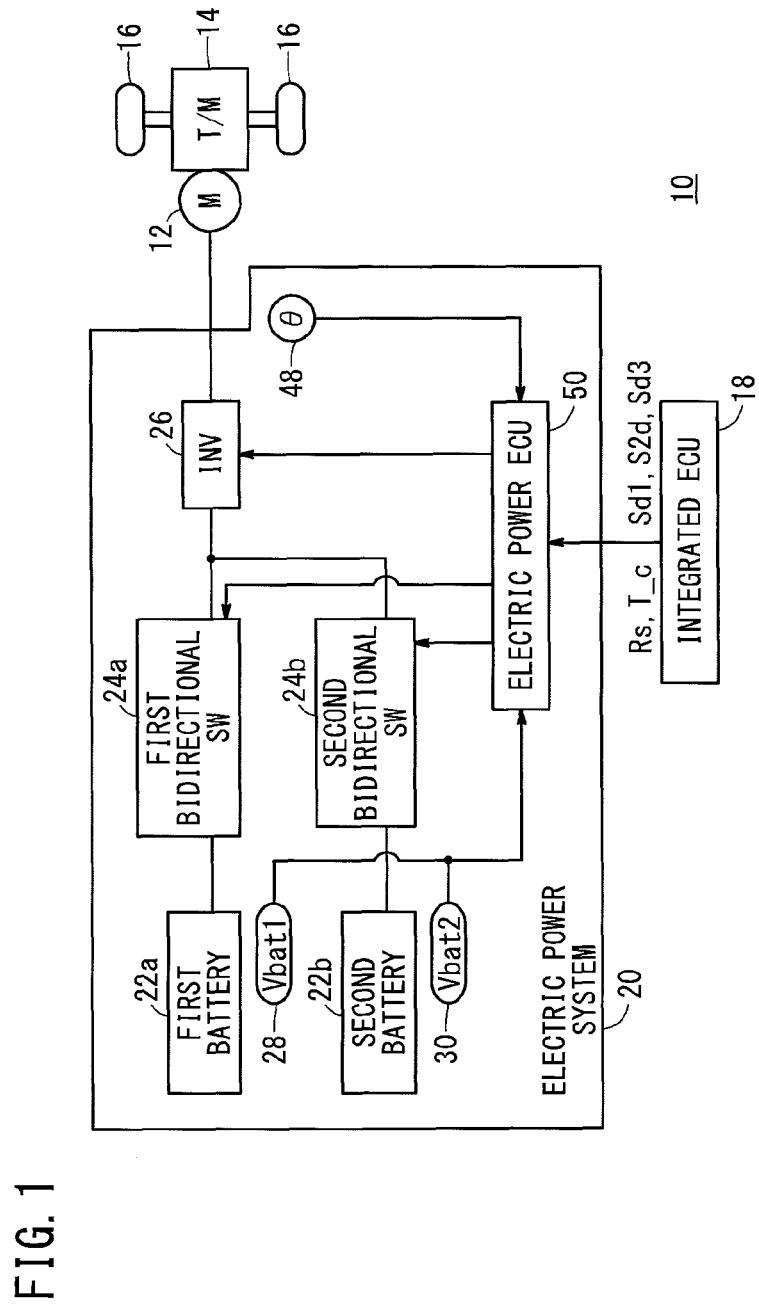
FIG. 1 is a block diagram of an electric automobile according to a first embodiment of the present invention.
Figure 2:
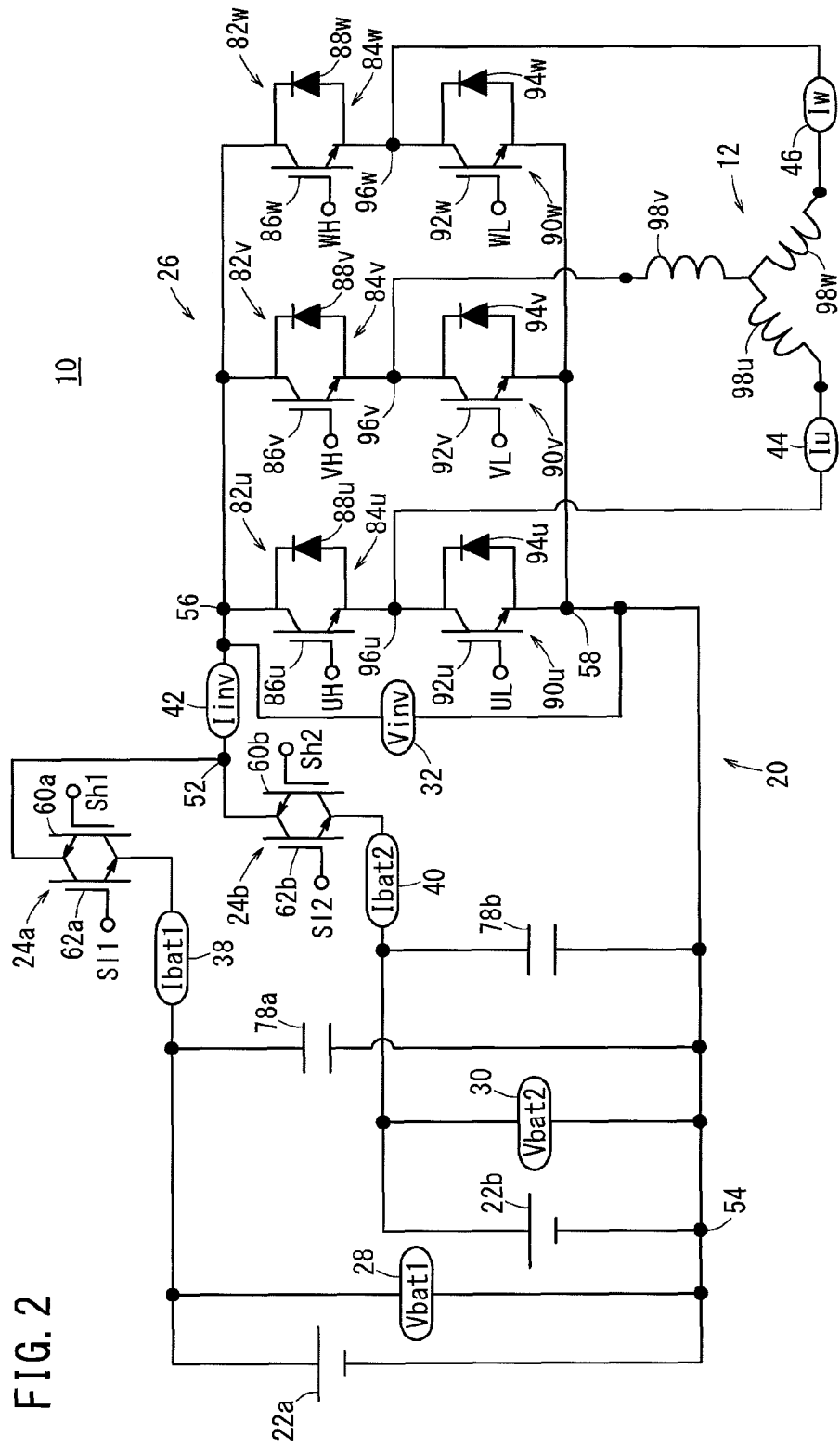
FIG. 2 is a circuit diagram showing a portion of a circuit arrangement of the electric automobile according to the first embodiment.

1. Overall Electric Automobile 10:

FIG. 1 is a block diagram of an electric automobile 10 according to a first embodiment of the present invention. FIG. 2 is a circuit diagram showing a portion of a circuit arrangement of the electric automobile 10. The electric automobile 10 has a traction motor 12, a transmission 14, road wheels 16, an integrated electronic control unit 18 (hereinafter referred to as "integrated ECU 18"), and an electric power system 20.

2. Motor 12:

The motor 12 comprises a three-phase AC brushless motor which generates a drive force based on electric power supplied from the electric power system 20 and rotates the road wheels 16 with the driver force through the transmission 14. The motor 12 also outputs electric power [W] generated in a regenerative mode (regenerative electric power Preg) to the electric power system 20. The motor 12 may alternatively output the regenerative electric power Preg to accessories or auxiliaries, not shown.

The motor 12 may have specific structural details as disclosed in Japanese Laid-Open Patent Publication No. 2009-240125 (hereinafter referred to as "JP2009-240125A").

3. Integrated ECU 18:

The integrated ECU 18, which controls an entire control system of the electric automobile 10, has an input/output device, a processor, and a storage device, etc., not shown. According to the first embodiment, the integrated ECU 18 selects at least one of a first battery 22a and a second battery 22b as a battery for generating electric power and a battery for being charged, as described in detail later.

4. Electric Power System 20:

(1) Overall Arrangement of Electric Power System 20:

The electric power system 20 supplies electric power to the motor 12 and is supplied with regenerative electric power Preg from the motor 12. The electric power system 20 has, in addition to the first battery 22a and the second battery 22b, a first bidirectional switch 24a (hereinafter referred to as "first bidirectional SW 24a"), a second bidirectional switch 24b (hereinafter referred to as "second bidirectional SW 24b"), an inverter 26, voltage sensors 28, 30, 32, current sensors 38, 40, 42, 44, 46, a resolver 48, and an electric power electronic control unit 50 (hereinafter referred to as "electric power ECU 50").

(2) First Battery 22a and Second Battery 22b:

Each of the first battery 22a and the second battery 22b comprises an electric energy storage device which includes a plurality of battery cells and is capable of outputting a high voltage (several hundred volts in the first embodiment). Each of the first battery 22a and the second battery 22b may comprise lithium ion secondary cells or capacitors. In the first embodiment, each of the first battery 22a and the second battery 22b comprises lithium ion secondary cells.

The first battery 22a has an output voltage (hereinafter referred to as "first battery voltage Vbat1") [V] detected by the voltage sensor 28, and an output current (hereinafter referred to as "first battery current Ibat1") [A] detected by the current sensor 38. The detected voltage and current are output to the electric power ECU 50.

Similarly, the second battery 22b has an output voltage (hereinafter referred to as "second battery voltage Vbat2") [V] detected by the voltage sensor 30, and an output current (hereinafter referred to as "second battery current Ibat2") [A] detected by the current sensor 40. The detected voltage and current are output to the electric power ECU 50.

The first battery 22a and the second battery 22b have positive terminals connected to each other at a junction 52 and negative terminals connected to each other at a junction 54. The junction 52 on the positive side is connected to a junction 56 of the inverter 26, and the junction 54 on the negative side is connected to a junction 58 of the inverter 26. A power supply path including the first battery 22a and a power supply path including the second battery 22b are connected parallel to each other with respect to the inverter 26 and the motor 12.

Hereinafter, the first battery 22a and the second battery 22b (a battery 154 according to third and subsequent embodiments) will be collectively referred to as batteries 22. The output voltages from the first battery 22a and the second battery 22b (the battery 154 according to the third and subsequent embodiments) will be collectively referred to as battery voltages Vbat. The output currents from the first battery 22a and the second battery 22b (the battery 154 according to the third and subsequent embodiments) will be collectively referred to as battery currents Ibat.

(3) First Bidirectional SW 24a and Second Bidirectional SW 24b:

The first bidirectional SW 24a and the second bidirectional SW 24b can independently be selectively turned on and off (rendered selectively conductive and nonconductive) in directions to generate electric power from and charge electric power into the first battery 22a and the second battery 22b based on a command from the electric power ECU 50.

According to the first embodiment, each of the first bidirectional SW 24a and the second bidirectional SW 24b comprises bidirectional insulated gate bipolar transistors (IGBTs). Specifically, the first bidirectional SW 24a comprises a generating switching element 60a (hereinafter referred to as "generating SW element 60a" or "SW element 60a") which can be rendered selectively conductive and nonconductive in a generating direction, i.e., a direction from the electric power system 20 to the motor 12, and a charging switching element 62a (hereinafter referred to as "charging SW element 62a" or "SW element 62a") which can be rendered selectively conductive and nonconductive in a charging direction, i.e., a direction from the motor 12 to the electric power system 20.

Likewise, the second bidirectional SW 24b comprises a generating switching element 60b (hereinafter referred to as "generating SW element 60b" or "SW element 60b") which can be rendered selectively conductive and nonconductive in the generating direction, and a charging switching element 62b (hereinafter referred to as "charging SW element 62b" or "SW element 62b") which can be rendered selectively conductive and nonconductive in the charging direction.

The SW elements 60a, 60b, 62a, 62b are turned on and off under the control of drive signals Sh1, Sh2, Sl1, Sl2 from the electric power ECU 50.

Figure 3:
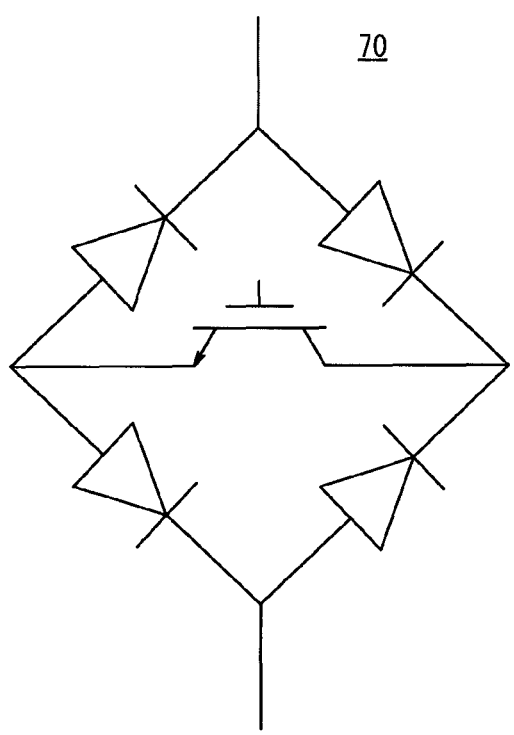
FIG. 3 is a diagram showing a first modification of a bidirectional switch used in the electric automobile according to the first embodiment.
Figure 4:
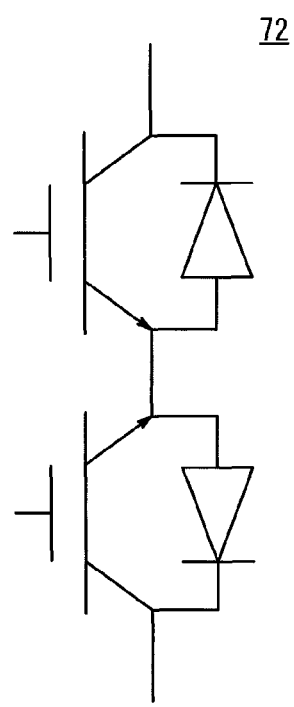
FIG. 4 is a diagram showing a second modification of the bidirectional switch used in the electric automobile according to the first embodiment.
Figure 5:
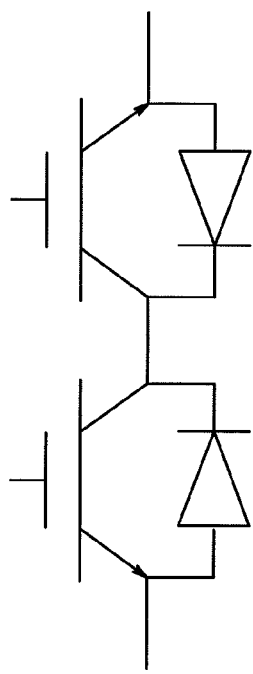
FIG. 5 is a diagram showing a third modification of the bidirectional switch used in the electric automobile according to the first embodiment.
Figure 6:
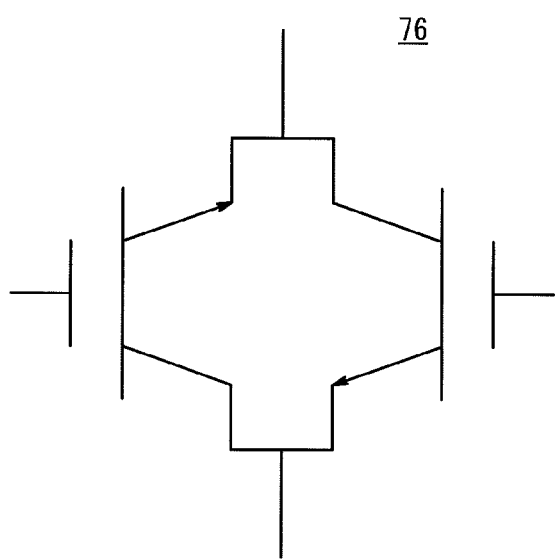
FIG. 6 is a diagram showing a fourth modification of the bidirectional switch used in the electric automobile according to the first embodiment.

Each of the first bidirectional SW 24a and the second bidirectional SW 24b, which comprises bidirectional IGBTs, may alternatively comprise a diode bridge 70 shown in FIG. 3, reverse conducting IGBIs 72 or 74 shown in FIG. 4 or 5, or reverse blocking IGBIs 76 shown in FIG. 6.

As shown in FIG. 2, a first smoothing capacitor 78a is connected between the first battery 22a and the first bidirectional SW 24a, and a second smoothing capacitor 78b is connected between the second battery 22b and the second bidirectional SW 24b.

Hereinafter, the first bidirectional SW 24a and the second bidirectional SW 24b (and a third bidirectional switch 24c in the fourth and subsequent embodiments) will be collectively referred to as bidirectional switches 24 or bidirectional SWs 24. The generating SW elements 60a, 60b (and a generating switching element 60c in the fourth and subsequent embodiments) will be collectively referred to as generating switching elements 60 or SW elements 60. The charging SW elements 62a, 62b (and a charging switching element 62c in the fourth and subsequent embodiments) will be collectively referred to as charging switching elements 62 or SW elements 62.

(4) Inverter 26:

The inverter 26, which is of a three-phase full bridge configuration, performs a DC/AC conversion process for converting a direct current into three-phase alternating currents and supplies the three-phase alternating currents to the motor 12. The inverter 26 also performs an AC/DC conversion process for converting regenerated three-phase alternating currents into a direct current and supplies the direct current to at least one of the first battery 22a and the second battery 22b.

As shown in FIG. 2, the inverter 26 has three phase arms 82u, 82v, 82w.

The U phase arm 82u comprises an upper arm element 84u having an upper arm switching element 86u (hereinafter referred to as "upper arm SW element 86u") and a diode 88u, and a lower arm element 90u having a lower arm switching element 92u (hereinafter referred to as "lower arm SW element 92u") and a diode 94u.

Similarly, the V phase arm 82v comprises an upper arm element 84v having an upper arm switching element 86v (hereinafter referred to as "upper arm SW element 86v") and a diode 88v, and a lower arm element 90v having a lower arm switching element 92v (hereinafter referred to as "lower arm SW element 92v") and a diode 94v. The W phase arm 82w comprises an upper arm element 84w having an upper arm switching element 86w (hereinafter referred to as "upper arm SW element 86w") and a diode 88w, and a lower arm element 90w having a lower arm switching element 92w (hereinafter referred to as "lower arm SW element 92w") and a diode 94w.

Each of the upper arm SW elements 86u, 86v, 86w and the lower arm SW elements 92u, 92v, 92w comprises a MOSFET, an IGBT, or the like.

Hereinafter, the phase arms 82u, 82v, 82w will be collectively referred to as phase arms 82, the upper arm elements 84u, 84v, 84w as upper arm elements 84, the lower arm elements 90u, 90v, 90w as lower arm elements 90, the upper arm SW elements 86u, 86v, 86w as upper arm SW elements 86, and the lower arm SW elements 92u, 92v, 92w as lower arm SW elements 92.

In the phase arms 82, midpoints 96u, 96v, 96w between the upper arm elements 84 and the lower arm elements 90 are connected to respective windings 98u, 98v, 98w of the motor 12. The windings 98u, 98v, 98w will hereinafter be collectively referred to as windings 98.

The upper arm SW elements 86 and the lower arm SW elements 92 are energized by drive signals UH, VH, WH, UL, VL, WL from the electric power ECU 50.

(5) Voltage Sensors 28, 30, 32:

As described above, the voltage sensor 28 detects the first battery voltage Vbat1 across the first battery 22a, and outputs the detected first battery voltage Vbat1 to the electric power ECU 50. The voltage sensor 30 detects the second battery voltage Vbat2 across the second battery 22b, and outputs the detected second battery voltage Vbat2 to the electric power ECU 50.

The voltage sensor 32, which is connected between a path interconnecting the junctions 52, 56 and a path interconnecting the junctions 54, 58, detects an input voltage Vinv [V] of the inverter 26 and outputs the detected input voltage Vinv to the electric power ECU 50.

(6) Current Sensors 38, 40, 42, 44, 46:

As described above, the current sensor 38 detects the first battery current Ibat1 of the first battery 22a, and outputs the detected first battery current Ibat1 to the electric power ECU 50. The current sensor 40 detects the second battery current Ibat2 of the second battery 22b, and outputs the detected second battery current Ibat2 to the electric power ECU 50.

The current sensor 42 detects an input current Iinv [A] of the inverter 26 on the path interconnecting the junctions 52, 56, and outputs the detected input current Iinv [A] to the electric power ECU 50.

The current sensor 44 detects a U phase current (U phase current Iu) of the winding 98u of the motor 12, and outputs the detected U phase current Iu to the electric power ECU 50. Similarly, the current sensor 46 detects a W phase current (W phase current Iw) of the winding 98w, and outputs the detected W phase current Iw to the electric power ECU 50.

The current sensors 44, 46 may detect currents in phases other than the combination of the U phase and the W phase insofar as they detect currents of two out of the three phases of the motor 12.

(7) Resolver 48:

The resolver 48 (FIG. 1) detects an electrical angle θ representing the rotation angle of the output shaft or outer rotor, not shown, of the motor 12, i.e., the rotation angle in a coordinate system fixed with respect to the stator, not shown, of the motor 12. The resolver 48 may be of a configuration as disclosed in JP2009-240125A.

(8) Electric Power ECU 50:

(a) Overall Configuration:

The electric power ECU 50, which controls the electric power system 20 in its entirety, has an input/output device, a processor, and a storage device, etc., not shown. According to the first embodiment, the electric power ECU 50 mainly controls the inverter 26 and the bidirectional SWs 24.

Figure 7:
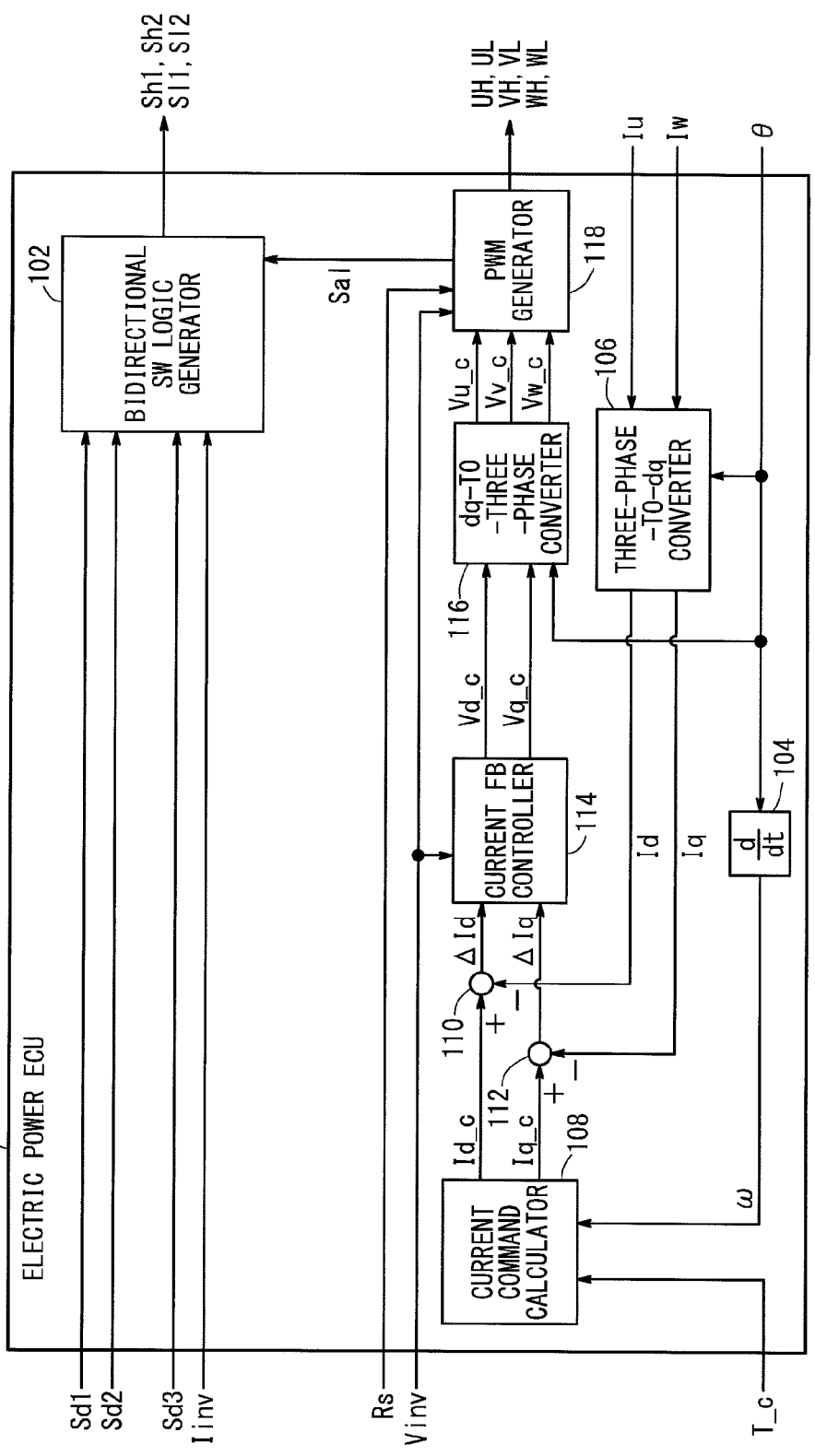
FIG. 7 is a functional block diagram of an electric power electronic control unit according to the first embodiment.

FIG. 7 is a functional block diagram of the electric power ECU 50. As shown in FIG. 7, the electric power ECU 50 has a bidirectional switch logic generator 102 (hereinafter referred to as "bidirectional SW logic generator 102" or "logic generator 102"), an electrical angular velocity calculator 104, a three-phase-to-dq converter 106, a current command calculator 108, subtractors 110, 112, current feedback controller 114 (hereinafter referred to as "current FB controller 114"), a dq-to-three-phase converter 116, and a PWM generator 118.

The bidirectional SWs 24 are turned on and off under the control of the logic generator 102. When the bidirectional SWs 24 are selectively turned on and off, the inverter 26 is brought into a three-phase short-circuited state by the logic generator 102, as described in detail later.

The inverter 26 is controlled using the electrical angular velocity calculator 104, the three-phase-to-dq converter 106, the current command calculator 108, the subtractors 110, 112, the current FB controller 114, the dq-to-three-phase converter 116, and the PWM generator 118.

(b) Control System for Turning On and Off the SWs 24:

As described above, the bidirectional SWs 24 are turned on and off under the control of the logic generator 102.

Figure 8:
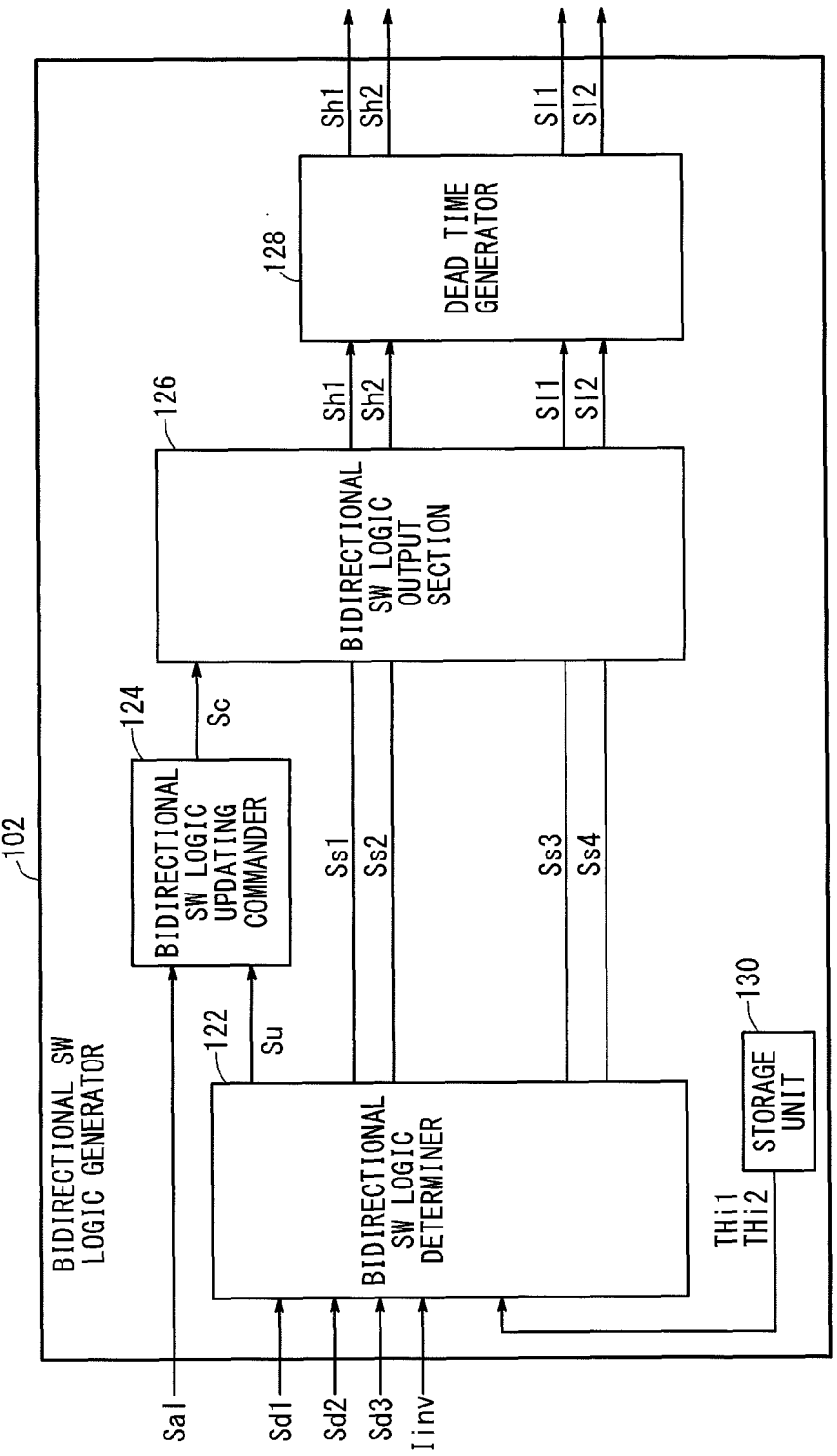
FIG. 8 is a functional block diagram of a bidirectional switch logic generator according to the first embodiment.

FIG. 8 is a functional block diagram of the bidirectional SW logic generator 102. As shown in FIG. 8, the logic generator 102 has a bidirectional switch logic determiner 122 (hereinafter referred to as "bidirectional SW logic determiner 122" or "logic determiner 122"), a bidirectional switch logic updating commander 124 (hereinafter referred to as "bidirectional SW logic updating commander 124" or "logic updating commander 124"), a bidirectional switch logic output section 126 (hereinafter referred to as "bidirectional SW logic output section 126" or "logic output section 126"), a dead time generator 128, and a storage unit 130.

The logic determiner 122 generates switching element selection signals Ss1, Ss2, Ss3, Ss4 (hereinafter referred to as "SW element selection signals Ss1, Ss2, Ss3, Ss4") based on power supply indicating signals Sd1, Sd2, Sd3 from the integrated ECU 18, an input current Iinv of the inverter 26, and current threshold values THi1, THi2 from the storage unit 130, and sends the generated SW element selection signals Ss1, Ss2, Ss3, Ss4 to the logic output section 126.

The power supply indicating signals Sd1, Sd2, Sd3 serve to indicate power supplies (in the first embodiment, the first battery 22a and the second battery 22b) for generating electric power, selectively generating electric power and being charged, and being charged. More specifically, the power supply indicating signal Sd1 serves to indicate a power supply for generating electric power, the power supply indicating signal Sd2 serves to indicate power supply for switching electric power and being charged, and the power supply indicating signal Sd3 serves to indicate power supply for being charged.

The logic determiner 122 judges a power mode of the electric automobile 10 in which the batteries 22 generate electric power, a regenerative mode of the electric automobile 10 in which the batteries 22 are charged, and an intermediate mode of the electric automobile 10 in which the batteries 22 generate electric power or are charged, using the input current Iinv of the inverter 26 and the current threshold values THi1, THi2, and selects the power supply indicating signals Sd1, Sd2, Sd3 to be used, as described in detail later.

The SW element selection signals Ss1, Ss2, Ss3, Ss4 serve to select which of the SW elements 60a, 60b, 62a, 62b of the bidirectional SWs 24 are to be turned on or off. More specifically, the SW element selection signal Ss1 serves to turn on the generating SW element 60a, the SW element selection signal Ss2 to turn on the generating SW element 60b, the SW element selection signal Ss3 to turn on the charging SW element 62a, and the SW element selection signal Ss4 to turn on the charging SW element 62b. Stated otherwise, when the SW element selection signals Ss1, Ss2, Ss3, Ss4 are high, the corresponding SW elements 60a, 60b, 62a, 62b are turned on, and when the SW element selection signals Ss1, Ss2, Ss3, Ss4 are low, the corresponding SW elements 60a, 60b, 62a, 62b are turned off.

If there are three or more power supplies as with the fourth and fifth embodiments to be described later, then as many SW element selection signals as the product of the number of power supplies and 2 are output from the logic determiner 122.

When the logic determiner 122 changes the logic level (high or low) of the SW element selection signals Ss1, Ss2, Ss3, Ss4, the logic determiner 122 outputs an updating preparation completion signal Su indicating the changed logic level, i.e., the completion of the preparation for updating the logic level, to the logic updating commander 124.

The logic updating commander 124 generates a logic updating execution signal Sc based on the updating preparation completion signal Su from the logic determiner 122 and a bidirectional switch logic switching permission signal Sal (hereinafter referred to as "switching permission signal Sal") from the PWM generator 118, and sends the generated logic updating execution signal Sc to the logic output section 126.

The switching permission signal Sal is sent from the PWM generator 118 to the logic updating commander 124 when the bidirectional SWs 24 are permitted to switch, as described in detail later.

The logic updating commander 124 outputs the logic updating execution signal Sc to the logic output section 126 when the logic determiner 122 completes the preparation for updating the logic level of the SW element selection signals Ss1, Ss2, Ss3, Ss4 and the bidirectional SWs 24 are capable of switching.

The logic output section 126 generates drive signals Sh1, Sh2, Sl1, Sl2 for the SW elements 60a, 60b, 62a, 62b based on the SW element selection signals Ss1, Ss2, Ss3, Ss4 from the logic determiner 122 and the logic updating execution signal Sc from the logic updating commander 124, and outputs the generated drive signals Sh1, Sh2, Sl1, Sl2 to the dead time generator 128.

More specifically, when the logic output section 126 does not receive the logic updating execution signal Sc from the logic updating commander 124, i.e., when the logic updating execution signal Sc is low (logic 0), even if the logic of the SW element selection signals Ss1, Ss2, Ss3, Ss4 from the logic determiner 122 is changed, i.e., even if the SW elements 60a, 60b, 62a, 62b are to switch between turning-on and turning-off, the logic output section 126 keeps the logic of the SW element selection signals Ss1, Ss2, Ss3, Ss4 before it is changed, and continuously outputs the drive signals Sh1, Sh2, Sl1, Sl2 at the same logic level, not allowing the SW elements 60a, 60b, 62a, 62b to switch between turning-on and turning-off. If the SW elements 60a, 60b, 62a, 62b are allowed to switch between turning-on and turning-off in this case, then a problem such as a short circuit between the first battery 22a and the second battery 22b will tend to arise.

When the logic output section 126 receives the logic updating execution signal Sc from the logic updating commander 124, i.e., when the logic updating execution signal Sc is high (logic 1), the logic output section 126 outputs the drive signals Sh1, Sh2, Sl1, Sl2 at the logic level depending on the SW element selection signals Ss1, Ss2, Ss3, Ss4 from the logic determiner 122. Even if the SW elements 60a, 60b, 62a, 62b are allowed to switch between turning-on and turning-off at this time, the above problem will not tend to arise.

The dead time generator 128 inserts a dead time dt into the drive signals Sh1, Sh2, Sl1, Sl2 from the logic output section 126, and outputs the drive signals Sh1, Sh2, Sl1, Sl2 with the inserted dead time dt to the respective SW elements 60a, 60b, 62a, 62b. The dead time dt is inserted in order to prevent a short circuit which is not intended.

(c) Control System for Inverter 26:

As described above, the inverter 26 is controlled using the electrical angular velocity calculator 104, the three-phase-to-dq converter 106, the current command calculator 108, the subtractors 110, 112, the current FB controller 114, the dq-to-three-phase converter 116, and the PWM generator 118. The system disclosed in JP2009-240125A may be basically used as a control system for the inverter 26, and may additionally be applied to components which are omitted in the first embodiment.

The electrical angular velocity calculator 104 shown in FIG. 7 calculates an electrical angular velocity $\omega$ as a detected value (observed value) of the rotational speed of the output shaft of the motor 12, which is equal to the rotational speed of the outer rotor of the motor 12, by differentiating the electrical angle $\theta$ from the resolver 48, and outputs the calculated electrical angular velocity $\omega$ to the current command calculator 108.

The three-phase-to-dq converter 106 performs a three-phase-to-dq conversion process using the U phase current Iu from the current sensor 44, the W phase current Iw from the current sensor 46, and the electrical angle $\theta$ from the resolver 48, for thereby calculating a current of a d-axis armature as a current component in a d-axis direction (hereinafter referred to as "d-axis current Id") and a current of a q-axis armature as a current component in a q-axis direction (hereinafter referred to as "q-axis current Iq"). The three-phase-to-dq converter 106 then outputs the d-axis current Id to the subtractor 110 and outputs the q-axis current Iq to the subtractor 112.

The three-phase-to-dq conversion process is a process for converting a set of the U phase current Iu, the W phase current Iw, and a V phase current Iv determined from the U phase current Iu and the W phase current Iw (Iv=−Iu−Iw) into a set of the d-axis current Id and the q-axis current Iq based on a conversion matrix depending on the electrical angle $\theta$, or more specifically the rotation angle of the output shaft at the electrical angle $\theta$.

The current command calculator 108 calculates a d-axis current command value Id_c as a command value for the d-axis current Id and a q-axis current command value Iq_c as a command value for the q-axis current Iq. Specifically, the current command calculator 108 is supplied with a torque command value T_c from the integrated ECU 18 and the electrical angular velocity $\omega$ calculated by the electrical angular velocity calculator 104. The current command calculator 108 then calculates the d-axis current command value Id_c and the q-axis current command value Iq_c from the supplied values based on a preset map. The d-axis current command value Id_c and the q-axis current command value Iq_c are meant to be feed-forward command values for the d-axis current and the q-axis current for causing the output shaft of the motor 12 to generate a torque indicated by the torque command value T_c.

The torque command value T_c is determined depending on the manipulated variable of the accelerator pedal (the depth to which the accelerator pedal is depressed) of the electric automobile 10 which incorporates the motor 12 as a propulsive force generating source and the traveling speed of the electric automobile 10. The torque command value T_c includes a command value for a power mode torque and a command value for a regenerative mode torque, and these command values have different positive and negative polarities.

The subtractor 110 calculates the difference between the d-axis current command value Id_c and the d-axis current Id (=Id_c−Id) (hereinafter referred to as "d-axis current difference $\Delta$Id"), and outputs the d-axis current difference $\Delta$Id to the current FB controller 114. The subtractor 112 calculates the difference between the q-axis current command value Iq_c and the q-axis current Iq (=Iq_c−Iq) (hereinafter referred to as "q-axis current difference $\Delta$Iq"), and outputs the q-axis current difference $\Delta$Iq to the current FB controller 114.

The current FB controller 114 calculates a d-axis voltage command value Vd_c as a voltage command value for the d-axis armature (a target value for a d-axis voltage) and a q-axis voltage command value Vq_c as a voltage command value for the q-axis armature (a target value for a q-axis voltage), based on the d-axis current difference $\Delta$Id and the q-axis current difference $\Delta$Iq from the subtractors 110, 112, and outputs the d-axis voltage command value Vd_c and the q-axis voltage command value Vq_c to the dq-to-three-phase converter 116.

The current FB controller 114 determines the d-axis voltage command value Vd_c depending on the d-axis current difference $\Delta$Id according to a feedback control process such as a PI control process (proportional plus integral control process) or the like in order to bring the d-axis current difference $\Delta$Id to 0. Similarly, the current FB controller 114 determines the q-axis voltage command value Vq_c depending on the q-axis current difference $\Delta$Iq according to a feedback control process such as a PI control process or the like in order to bring the q-axis current difference $\Delta$Iq to 0.

The current FB controller 114 should preferably determine the d-axis voltage command value Vd_c and the q-axis voltage command value Vq_c by adding a non-interference component for canceling the effect of speed electromotive forces that interfere with each other between the d-axis and the q-axis, respectively to a d-axis voltage command value and a q-axis voltage command value which are determined respectively from the d-axis current difference $\Delta$Id and the q-axis current difference $\Delta$Iq according to a feedback control process.

The dq-to-three-phase converter 116 performs a dq-to-three-phase conversion process using the d-axis voltage command value Vd_c and the q-axis voltage command value Vq_c from the current FB controller 114 and the electrical angle $\theta$ from the resolver 48, for thereby calculating phase voltage command values Vu_c, Vv_c, Vw_c for the respective U phase, V phase, and W phase, and outputs the phase voltage command values Vu_c, Vv_c, Vw_c to the PWM generator 118. The dq-to-three-phase conversion process is a process for converting a set of the d-axis voltage command value Vd_c and the q-axis voltage command value Vq_c into a set of the phase voltage command values Vu_c, Vv_c, Vw_c based on a conversion matrix depending on the electrical angle $\theta$, or more specifically the rotation angle of the output shaft at the electrical angle $\theta$.

The PWM generator 118 energizes the windings 98 of the respective phases of the motor 12 through the inverter 26 according to a pulse width modulation (PWM) control process depending on the phase voltage command values Vu_c, Vv_c, Vw_c. The PWM generator 118 turns on and off the SW elements 86, 92 of the inverter 26 thereby to energize the windings 98 of the respective phases of the motor 12.

Figure 9:
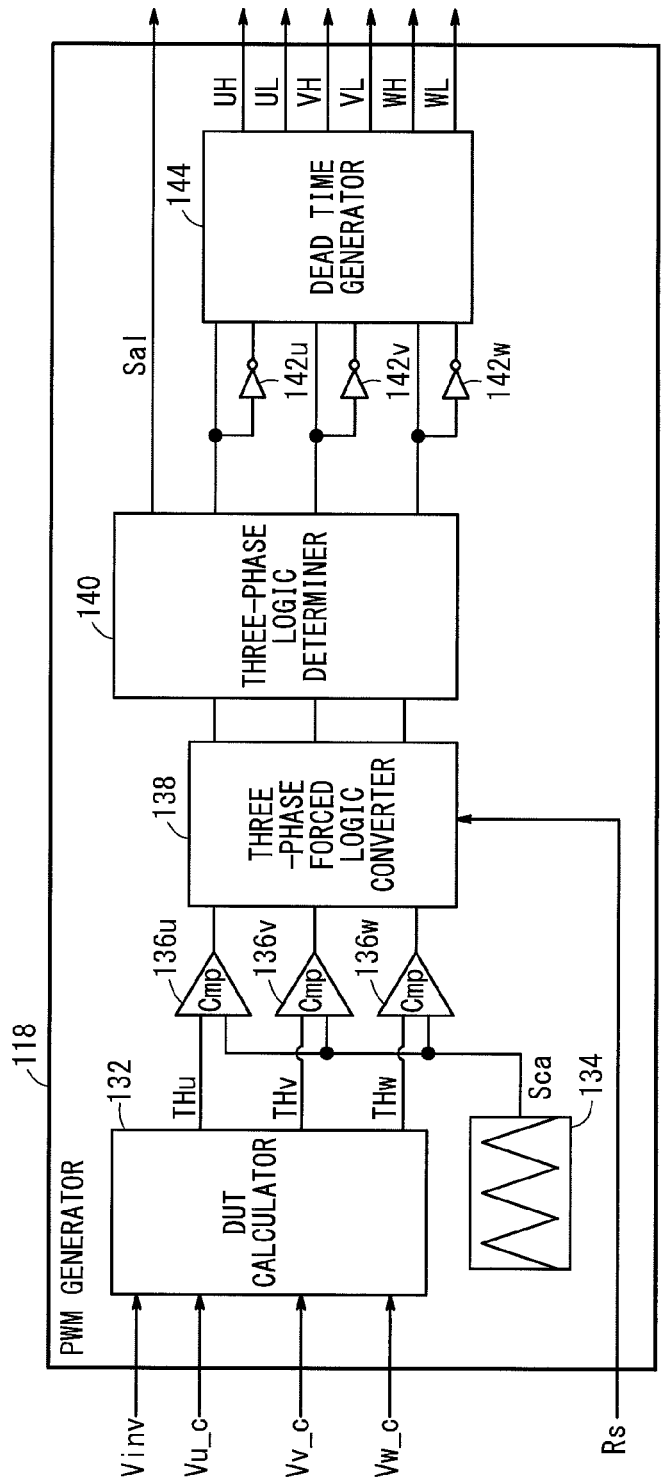
FIG. 9 is a functional block diagram of a PWM generator according to the first embodiment.

FIG. 9 is a functional block diagram of the PWM generator 118. As shown in FIG. 9, the PWM generator 118 has a duty value calculator 132 (hereinafter referred to as "DUT calculator 132"), a carrier signal generator 134, comparators 136u, 136v, 136w, a three-phase forced logic converter 138, a three-phase logic determiner 140, NOT gates 142u, 142v, 142w, and a dead time generator 144.

The DUT calculator 132 calculates three-phase voltage command values THu, THv, THw that define duty values DUT1 [%] for the respective upper arm SW elements 86 depending on the input voltage Vinv [V] of the inverter 26 and the phase voltage command values Vu_c, Vv_c, Vw_c, and outputs the calculated three-phase voltage command values THu, THv, THw to the comparators 136u, 136v, 136w. Specifically, the voltage command value THu of the U phase is output to the comparator 136u, the voltage command value THv of the V phase to the comparator 136v, and the voltage command value THw of the W phase to the comparator 136w.

The carrier signal generator 134 generates a carrier signal Sca and outputs the generated carrier signals Sca to the comparators 136u, 136v, 136w.

The comparator 136u compares the voltage command value THu and the carrier signal Sca with each other. When the carrier signal Sca is smaller than the voltage command value THu, the comparator 136u outputs a signal of logic level 0. When the carrier signal Sca is equal to or greater than the voltage command value THu, the comparator 136u outputs a signal of logic level 1. The comparators 136v, 136w operate in the same manner.

The three-phase forced logic converter 138 outputs the output signals from the comparators 136u, 136v, 136w unchanged to the three-phase logic determiner 140 when the three-phase forced logic converter 138 does not receive a forced short circuit request Rs from the integrated ECU 18, i.e., when a signal representative of the forced short circuit request Rs is of logic level 0. When the three-phase forced logic converter 138 receives a forced short circuit request Rs from the integrated ECU 18, i.e., when a signal representative of the forced short circuit request Rs is of logic level 1, the three-phase forced logic converter 138 forcibly outputs signals of logic level 0 for all the three phases to the three-phase logic determiner 140, regardless of the output signals from the comparators 136u, 136v, 136w. Alternatively, the three-phase forced logic converter 138 may output signals of logic level 1 for all the three phases to the three-phase logic determiner 140.

The three-phase logic determiner 140 judges whether or not the signals for all the three phases are of logic level 0 or logic level 1. If the signals for all the three phases are of logic level 0 or logic level 1 outputs the switching permission signal Sal to the logic generator 102. The three-phase logic determiner 140 also outputs the output signals from the three-phase forced logic converter 138 unchanged to the NOT gates 142u, 142v, 142w and the dead time generator 144.

The NOT gates 142u, 142v, 142w, which serve to calculate duty values DUT2 [%] for the respective lower arm SW elements 92, invert the logic levels indicated by the three-phase logic determiner 140 and output signals of inverted logic levels to the dead time generator 144. The sum of the duty values DUT1 [%] for the respective upper arm SW elements 86 and the duty values DUT2 [%] for the respective lower arm SW elements 92 represents 100%.

The dead time generator 144 inserts a dead time dt into the three-phase logic signals from the three-phase logic determiner 140, and outputs the drive signals UH, VH, WH with the inserted dead time dt to the respective upper arm SW elements 86. The dead time generator 144 also inserts a dead time dt into the three-phase logic signals from the respective NOT gates 142u, 142v, 142w, and outputs the drive signals UL, VL, VW with the inserted dead time dt to the respective lower arm SW elements 92.

The control system for the inverter 26, described above, determines a set of the d-axis voltage command value Vd_c and the q-axis voltage command value Vq_c such that the combination of the d-axis voltage and the q-axis voltage will not exceed a target value depending on the power supply voltages, i.e., the radius of a voltage circle, and that the torque generated by the output shaft of the motor 12, i.e., the output torque of the motor 12, will follow the torque command value T_c, i.e., the d-axis current difference ΔId and the q-axis current difference ΔIq will be converged to 0. The currents that are supplied to the windings 98 of the respective phases of the motor 12 are controlled depending on the d-axis voltage command value Vd_c and the q-axis voltage command value Vq_c.

B. Various Control Processes

1. Short-Circuit Control for the Inverter 26:

As described above, when the bidirectional SWs 24 are selectively turned on and off, the inverter 26 is brought into a three-phase short-circuited state by the PWM generator 118.

Figure 10:
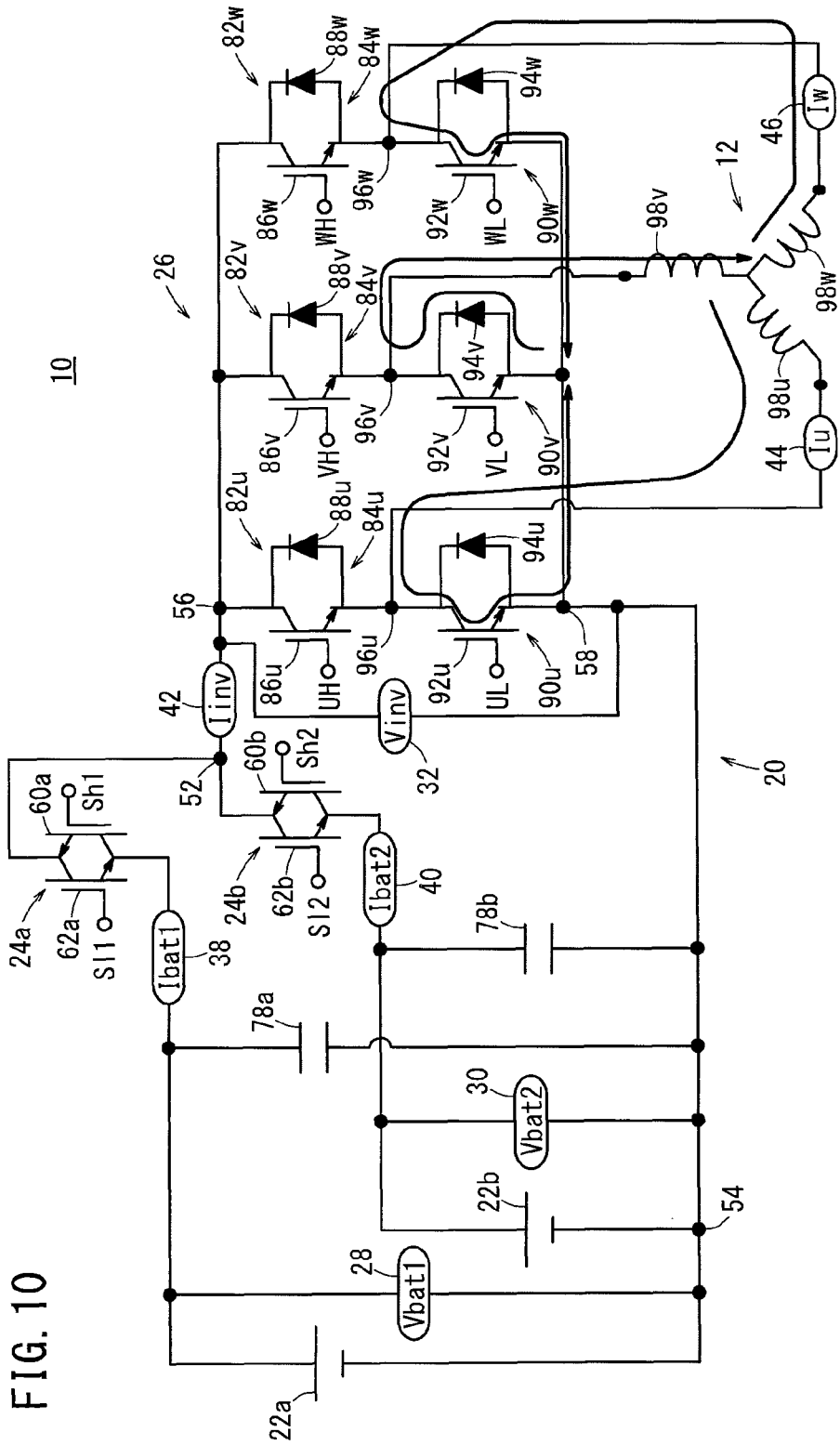
FIG. 10 is a circuit diagram showing the manner in which lower arm elements of a three-phase inverter is short-circuited.
Figure 11:
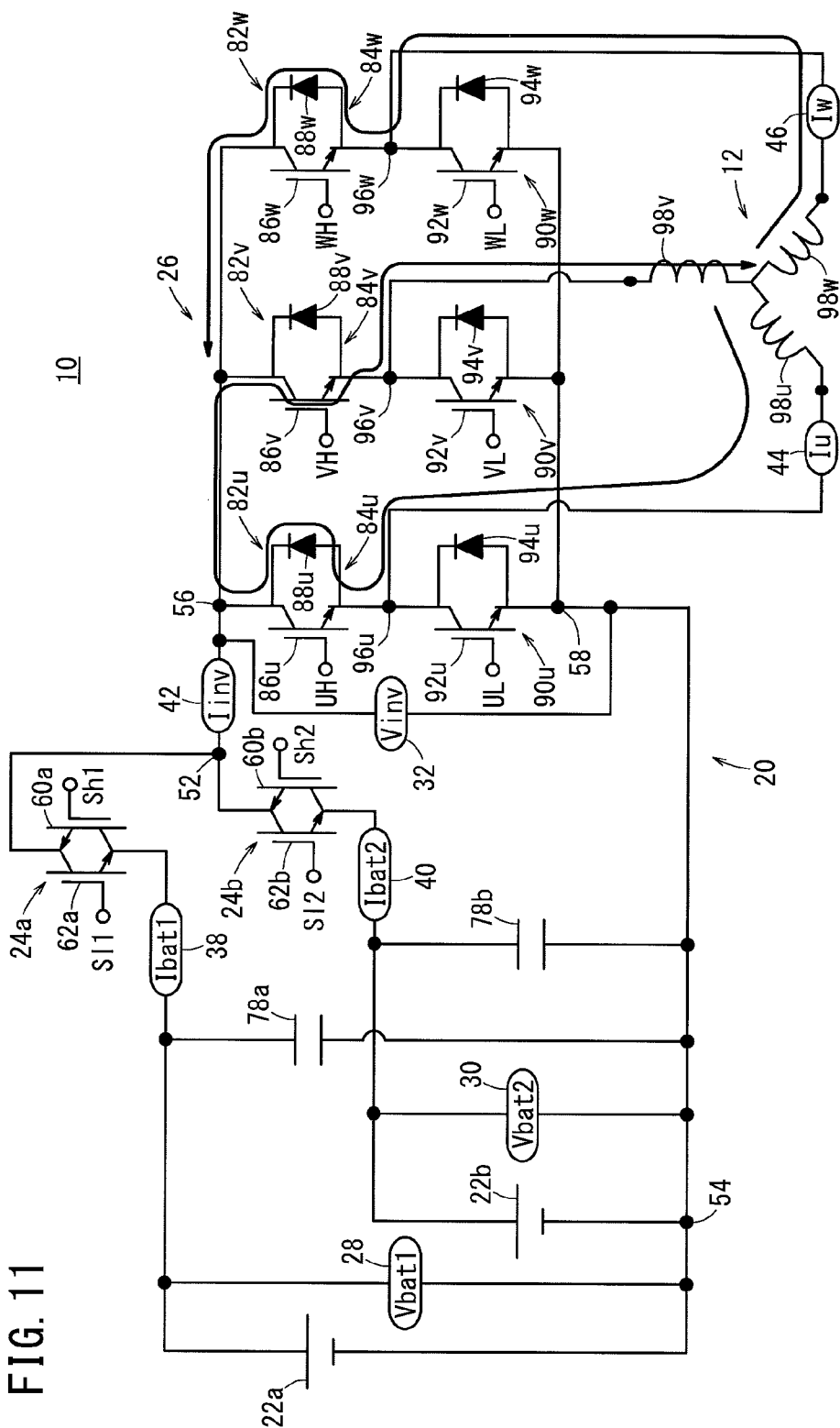
FIG. 11 is a circuit diagram showing the manner in which upper arm elements of the three-phase inverter is short-circuited.

Specifically, the PWM generator 118 turns on all the three-phase lower arm SW elements 92 (see FIG. 10) or turns on all the three-phase upper arm SW elements 86 (see FIG. 11). The inverter 26 is now brought into a three-phase short-circuited state, and will not be supplied with electric power from either one of the first battery 22a and the second battery 22b.

The PWM generator 118 brings on the three-phase short-circuited state based on the phase voltage command values Vu_c, Vv_c, Vw_c from the dq-to-three-phase converter 116. Alternatively, the PWM generator 118 forcibly brings on the three-phase short-circuited state based on the forced short circuit request Rs from the integrated ECU 18.

For bringing on the three-phase short-circuited state based on the phase voltage command values Vu_c, Vv_c, Vw_c from the dq-to-three-phase converter 116, the PWM generator 118 carries out the following process:

According to the first embodiment, it is assumed that the PWM generator 118 generates drive signals UH, UL, VH, VL, WH, WL for the phase arms 82 in each switching period. If the duty value DUT in one switching period is 100%, then the duty values DUT2 for the lower arm SW elements 92 are calculated by subtracting the duty values DUT1 for the upper arm SW elements 86 from 100%, and the drive signals UH, UL, VH, VL, WH, WL that are actually output are generated by reflecting the dead time dt in the duty values DUT1, DUT2 for the upper arm SW elements 86 and the lower arm SW elements 92.

The duty values DUT1 for the upper arm SW elements 86 are established such that voltage command values THu, THv, THw are established for the respective phases and the drive signals UH, VH, WH are output when the carrier signal Sca is equal to or greater than the voltage command values THu, THv, THw.

Figure 12:
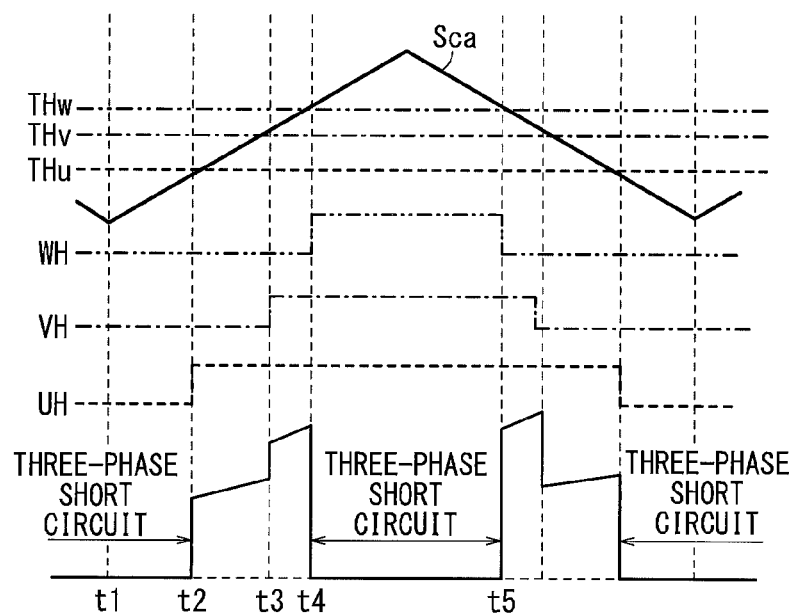
FIG. 12 is a diagram showing an example of the relationship between a carrier signal, voltage command values, and drive signals.

In an example shown in FIG. 12, before time t1 and from time t1 to time t2, the carrier signal Sca is smaller than the voltage command values THu, THv, THw, the drive signals UH, VH, WH are not output to any of the upper arm SW elements 86, i.e., the drive signals UH, VH, WH are low, i.e., of logic level 0. Therefore, the drive signals UL, VL, WL are output to all the lower arm SW elements 92, i.e., the drive signals UL, VL, WL are high, i.e., of logic level 1. In this case, since all the lower arm SW elements 92 are turned on, the three-phase short-circuited state shown in FIG. 10 occurs.

From time t2 to time t3, since the carrier signal Sca is equal to or greater than the voltage control value THu, the U-phase upper arm SW element 86u is turned on, but the V- and W-phase upper arm SW elements 86 are turned off, with no three-phase short-circuited state brought on. Similarly, from time t3 to time t4, since the carrier signal Sca is equal to or greater than the voltage control values THu, THv, the U- and V-phase upper arm SW elements 86u, 86v are turned on, but the W-phase upper arm SW element 86w is turned off, with no three-phase short-circuited state caused.

From time t4 to time t5, since the carrier signal Sca is equal to or greater than all the voltage command values THu, THv, THw, the upper arm SW elements 86 in all the phases are turned on, resulting in the three-phase short-circuited state shown in FIG. 11.

For bringing on the three-phase short-circuited state based on the forced short circuit request Rs from the integrated ECU 18, the PWM generator 118 turns on all the drive signals UH, VH, WH as shown in FIG. 13, for example, as described in detail later.

2. On-Off Control for Bidirectional SWs 24:

A control process for turning on and off the bidirectional SWs 24 will be described below.

According to the first embodiment, the integrated ECU 18 determines which of the batteries 22 is to be used without comparing the first battery voltage Vbat1 of the first battery 22a and the second battery voltage Vbat2 of the second battery 22b with each other.

The integrated ECU 18 switches and selects one of the modes shown in FIG. 14, for example. According to the first embodiment, specifically, the integrated ECU 18 selects and uses one of the modes "STOP", "ONE POWER SUPPLY GENERATION", "ONE POWER SUPPLY CHARGE", "ONE POWER SUPPLY USE", "HIGH-VOLTAGE BATTERY GENERATION", and "LOW-VOLTAGE BATTERY CHARGE".

The integrated ECU 18 switches and selects one of the modes when necessary, rather than selectively turning on and off (making high and low) the modes in one switching period as is the case with the generation of drive signals UH, UL, VH, VL, WH, WL for the inverter 26. In other words, the integrated ECU 18 performs a process of fixedly turning on and off the SW elements 60, 62 in one switching period (fixed process). The fixed process is also carried out in second through fifth embodiments.

The "STOP" mode is a mode to be used when the electric automobile 10 is at rest. In the "STOP" mode, either one of the switching elements 60, 62 of the bidirectional SWs 24 is turned off.

The "ONE POWER SUPPLY GENERATION" mode is a mode in which one of the first battery 22a and the second battery 22b is used to generate electric power. The "ONE POWER SUPPLY GENERATION" mode is used when the motor 12 is in the power mode even if it is known that one of the batteries 22 will soon be replaced, when one of the batteries 22 is suffering a failure, and when there is a battery 22 which the user is willing to use.

The "ONE POWER SUPPLY CHARGE" mode is a mode in which one of the first battery 22a and the second battery 22b is to be charged. The "ONE POWER SUPPLY CHARGE" mode is used when the motor 12 is in the regenerative mode even if it is known that one of the batteries 22 will soon be replaced, when one of the batteries 22 is suffering a failure, and when there is a battery 22 which the user is willing to use.

The "ONE POWER SUPPLY GENERATION" mode and the "ONE POWER SUPPLY CHARGE" mode may be combined with each other to switch between a battery 22 to be used to generate electric power and a battery 22 to be charged.

The "ONE POWER SUPPLY USE" mode is a mode in which one of the first battery 22a and the second battery 22b is used to generate electric power and is to be charged, and the other battery is not used to generate electric power and is not to be charged. For example, the "ONE POWER SUPPLY USE" mode is used when the motor 12 is hardly determined as being in the power mode or the regenerative mode, i.e., when the motor 12 is in an intermediate mode even if it is known that one of the batteries 22 will soon be replaced, when one of the batteries 22 is suffering a failure, and when there is a battery 22 which the user is willing to use.

The "HIGH-VOLTAGE BATTERY GENERATION" mode is a mode in which the generating SW elements 60a, 60b of the first battery 22a and the second battery 22b are turned on and the battery 22 which is of a relatively high voltage generates electric power. When the electric automobile 10 is in the power mode, if both the generating SW elements 60a, 60b are turned on, at least one of the first battery 22a and the second battery 22b supplies electric power to the motor 12. If there is a voltage difference between the first battery 22a and the second battery 22b, then the battery 22 whose voltage is higher supplies electric power to the motor 12, and the battery 22 whose voltage is lower supplies no electric power to the motor 12. Therefore, though both the generating SW elements 60a, 60b turned on, only the battery 22 whose voltage is higher is essentially selected to supply electric power. For example, the "HIGH-VOLTAGE BATTERY GENERATION" mode is used when the motor 12 is to be energized by the battery 22 whose voltage is higher, i.e., when the battery 22 which is more powerful is preferentially used to output electric power because the battery 22 whose voltage is higher is the battery 22 whose remaining battery level (SOC: State Of Charge) is higher.

The "LOW-VOLTAGE BATTERY CHARGE" mode is a mode in which the charging SW elements 62a, 62b of the first battery 22a and the second battery 22b are turned on and the battery 22 which is of a relatively low voltage is charged. When the electric automobile 10 is in the regenerative mode, if both the charging SW elements 62a, 62b are turned on, the motor 12 supplies electric power to at least one of the first battery 22a and the second battery 22b. If there is a voltage difference between the first battery 22a and the second battery 22b, then the regenerative electric power Preg from the motor 12 finds it easy to be supplied to the battery 22 whose voltage is lower, and finds it difficult to be supplied to the battery 22 whose voltage is higher. Therefore, though both the charging SW elements 62a, 62b turned on, the battery 22 whose voltage is lower is preferentially charged. For example, the "LOW-VOLTAGE BATTERY CHARGE" mode is used when the battery 22 whose voltage is lower is to be charged, i.e., when the battery 22 whose SOC is lower is to be charged because the battery 22 whose voltage is lower is the battery 22 whose SOC is lower.

As can be seen from FIG. 14, according to the first embodiment, the integrated ECU 18 controls the SW elements 60, 62 such that when one of the first battery 22a and the second battery 22b is generating electric power, the other cannot be charged. Similarly, the integrated ECU 18 controls the SW elements 60, 62 such that when one of the first battery 22a and the second battery 22b is being charged, the other cannot generate electric power. Stated otherwise, in each of the modes shown in FIG. 14, SW elements that are turned on do not exist in a diagonally opposite pair, i.e., both the generating SW element 60a and the charging SW element 62b are not turned on, or both the generating SW element 60b and the charging SW element 62a are not turned on. In this manner, a short-circuited state is prevented from occurring between the first battery 22a and the second battery 22b.

In other words, according to the first embodiment, the SW elements 60a, 60b, 62a, 62b are selectively turned on and off to satisfy at least one of a first control rule and a second control rule, to be described below, thereby to prevent a short circuit from occurring between the first battery 22a and the second battery 22b.

The first control rule is that if there are N bidirectional SWs 24 (N is an integer of 2 or greater), there exist(s) (N–1) bidirectional SW or SWs 24 wherein both the generating SW element 60 and the charging SW element 62 are turned off. Stated otherwise, there exist(s) (N–1) electric power system or systems wherein both a generating path and a charging path are turned off. In the bidirectional SW 24 representing the remaining electric power system, only one of the generating SW element 60 and the charging SW element 62 may be turned on or both the generating SW element 60 and the charging SW element 62 may be turned on.

The second control rule is that all the generating SW elements 60 or all the charging SW elements 62 of all (N) bidirectional SWs 24 are turned off. Stated otherwise, the generating paths or the charging paths of all the electric power systems are turned off. In this case, some or all charging paths or generating paths which are opposite to generating paths or charging paths all of which are turned off may be turned on.

According to the first control rule and the second control rule described above, a short-circuited state is prevented from occurring between the first battery 22a and the second battery 22b.

3. Control for Switching of Bidirectional SWs 24:

A control process for the SW elements 60, 62 for switching between the modes will be described below. As described above, for switching between the modes, the inverter 26 brings on a three-phase short-circuited state of the lower arm SW elements 92 (FIG. 10) or a three-phase short-circuited state of the upper arm SW elements 86 (FIG. 11).

(1) Simple Switching:

For switching between the "STOP" mode and another mode, e.g., for switching from the "STOP" mode to the "ONE POWER SUPPLY GENERATION" mode or vice versa, the electric power ECU 50 turns on and off the SW elements 60, 62 simply according to the table shown in FIG. 14. When the SW elements 60, 62 are thus turned on and off, no short circuit occurs between the first battery 22a and the second battery 22b. At the time of switching, the dead time generator 128 inserts a dead time dt.

Similarly, for switching from the "ONE POWER SUPPLY GENERATION (FIRST BATTERY)" mode to the "ONE POWER SUPPLY GENERATION (SECOND BATTERY)" mode or vice versa, or for switching from "ONE POWER SUPPLY CHARGE (FIRST BATTERY)" mode to the "ONE POWER SUPPLY CHARGE (SECOND BATTERY)" mode or vice versa, or for switching from the "ONE POWER SUPPLY GENERATION (FIRST BATTERY)" or the "ONE POWER SUPPLY GENERATION (SECOND BATTERY)" mode to the "HIGH-VOLTAGE BATTERY GENERATION" or vice versa, or for switching from the "ONE POWER SUPPLY CHARGE (FIRST BATTERY)" mode or the "ONE POWER SUPPLY CHARGE (SECOND BATTERY)" mode to the "LOW-VOLTAGE BATTERY CHARGE" or vice versa, the electric power ECU 50 turns on and off the SW elements 60, 62 simply according to the table shown in FIG. 14. When the SW elements 60, 62 are thus turned on and off, no short circuit occurs between the first battery 22a and the second battery 22b. At the time of switching, the dead time generator 128 inserts a dead time dt.

Figure 15:
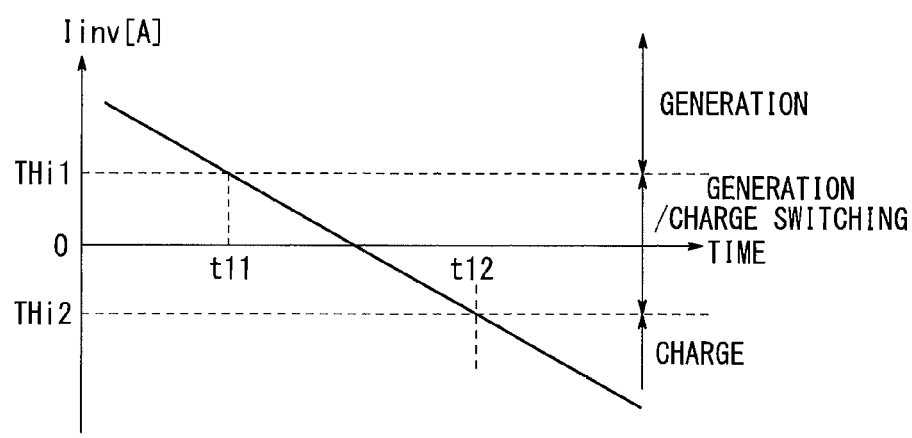
FIG. 15 is a diagram showing the relationship between the manner in which an input current of the inverter switches from positive to negative and the control for the switching elements.

(2) Stepwise Switching:

If the above simple switching is not effective to prevent a short circuit from occurring between the first battery 22a and the second battery 22b, then such a short circuit can be prevented by the following process:

(a) When the electric automobile 10 is in the power mode, the "ONE POWER SUPPLY USE" mode is carried out for one of the batteries 22, and when the electric automobile 10 is in the regenerative mode, the "ONE POWER SUPPLY USE" mode is carried out for the other battery 22:

When the electric automobile 10 is in the power mode, for example, the "ONE POWER SUPPLY USE (FIRST BATTERY)" mode is carried out to generate electric power from the first battery 22a. When the electric automobile 10 is in the regenerative mode, the "ONE POWER SUPPLY USE (SECOND BATTERY)" mode is carried out to charge the second battery 22b. In this case, the SW elements 60, 62 are selectively turned on and off as follows:

In FIG. 15, a case will be described, in which the input current Iinv of the inverter 26 switches from positive to negative, i.e., the electric automobile 10 switches from the power mode to the regenerative mode. When the input current Iinv of the inverter 26 exceeds the current threshold value THi1 (a state referred to as "GENERATION STATE"), both the generating SW element 60a and the charging SW element 62a of the first bidirectional SW 24a are turned on, and both the generating SW element 60b and the charging SW element 62b of the second bidirectional SW 24b are turned off.

At time t11, when the input current Iinv of the inverter 26 becomes equal to or lower than the current threshold value THi1, both the generating SW element 60a and the charging SW element 62a of the first bidirectional SW 24a are turned off. Thereafter, both the generating SW element 60b and the charging SW element 62b of the second bidirectional SW 24b are turned on. When the input current Iinv of the inverter 26 is equal to or higher than the current threshold value THi2 and equal to or lower than the current threshold value THi1 (a state referred to as "GENERATION/CHARGE SWITCHING MODE"), the SW elements 60, 62 remain thus turned on and off.

At time t12, when the input current Iinv of the inverter 26 becomes lower than the current threshold value THi2 (a state referred to as "CHARGE STATE"), both the generating SW element 60a and the charging SW element 62a of the first bidirectional SW 24a are kept turned off, and both the generating SW element 60b and the charging SW element 62b of the second bidirectional SW 24b are kept turned on.

Figure 16:
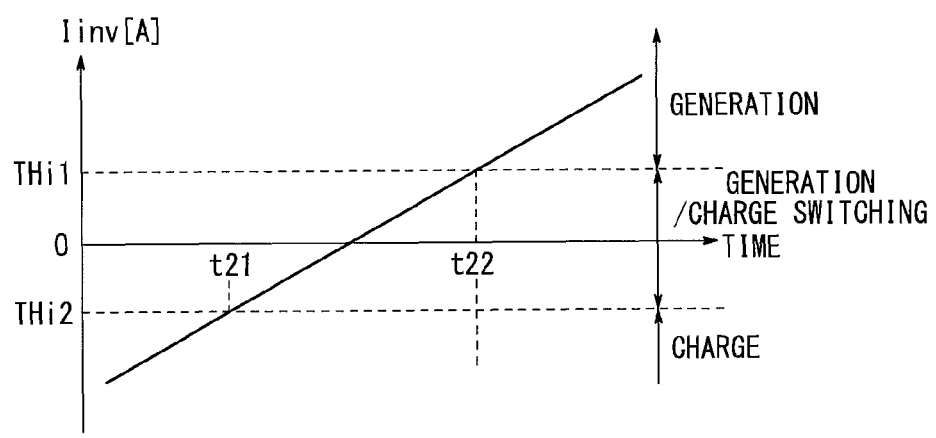
FIG. 16 is a diagram showing the relationship between the manner in which an input current of the inverter switches from negative to positive and the control for the switching elements.

In FIG. 16, a case will be described, in which the input current Iinv of the inverter 26 switches from negative to positive, i.e., the electric automobile 10 switches from the regenerative mode to the power mode. When the input current Iinv of the inverter 26 is lower than the current threshold value THi2, both the generating SW element 60a and the charging SW element 62a of the first bidirectional SW 24a are turned off, and both the generating SW element 60b and the charging SW element 62b of the second bidirectional SW 24b are turned on.

At time t21, when the input current Iinv of the inverter 26 becomes equal to or higher than the current threshold value THi2, both the generating SW element 60b and the charging SW element 62b of the second bidirectional SW 24b are turned off. Thereafter, both the generating SW element 60a and the charging SW element 62a of the first bidirectional SW 24a are turned on. When the input current Iinv of the inverter 26 is equal to or higher than the current threshold value THi2 and equal to or lower than the current threshold value THi1, the SW elements 60, 62 remain thus turned on and off.

At time t22, when the input current Iinv of the inverter 26 becomes equal to or higher than the current threshold value THi1, both the generating SW element 60a and the charging SW element 62a of the first bidirectional SW 24a are kept turned on, and both the generating SW element 60b and the charging SW element 62b of the second bidirectional SW 24b are kept turned off.

Though the first bidirectional SW 24a and the second bidirectional SW 24b are turned on and off based on the input current Iinv of the inverter 26 as described above, the first bidirectional SW 24a and the second bidirectional SW 24b may be turned on and off based on the input voltage Vinv of the inverter 26 or the electric power consumed by the motor 12 or the electric power regenerated thereby. Alternatively, if times of switching between generation and charge can be determined, then the SW elements 60, 62 can be selectively turned on and off at prescribed times before and after the times of switching. The times of switching between generation and charge may be determined using a predicted time until actual electric power crosses a zero point.

(b) Combination of the HIGH-VOLTAGE BATTERY GENERATION" mode and the "LOW-VOLTAGE BATTERY CHARGE" mode:

When the HIGH-VOLTAGE BATTERY GENERATION" mode and the "LOW-VOLTAGE BATTERY CHARGE" mode are combined with each other, the SW elements 60, 62 are selectively turned on and off as described below. It is assumed hereinbelow that the second battery voltage Vbat2 is higher than the first battery voltage Vbat1 (Vbat1<Vbat2).

In FIG. 15, a case will be described, in which the input current Iinv of the inverter 26 switches from positive to negative, i.e., the electric automobile 10 switches from the power mode to the regenerative mode. When the input current Iinv of the inverter 26 exceeds the current threshold value THi1, the generating SW elements 60a, 60b are turned on, and the charging SW element 62a, 62b are turned off. In this case, the electric power from the second battery 22b whose voltage is higher is supplied to the inverter 26, and the electric power from the first battery 22a whose voltage is lower is not supplied to the inverter 26. Since the charging SW element 62a, 62b are turned off, no short circuit occurs between the first battery 22a and the second battery 22b, and the electric power from the second battery 22b is not supplied to the first battery 22a.

At time t11, when the input current Iinv of the inverter 26 becomes equal to or lower than the current threshold value THi1, the generating SW element 60a of the first bidirectional SW 24a is turned off. Thereafter, the charging SW element 62b of the second bidirectional SW 24b is turned on. As a result, the generating SW element 60a and the charging SW element 62a of the first bidirectional SW 24a are turned off, and the generating SW element 60b and the charging SW element 62b of the second bidirectional SW 24b are turned on. When the input current Iinv of the inverter 26 is equal to or higher than the current threshold value THi2 and equal to or lower than the current threshold value THi1, the SW elements 60, 62 remain thus turned on and off.

At time t12, when the input current Iinv of the inverter 26 becomes lower than the current threshold value THi2, the generating SW element 60b of the second bidirectional SW 24b is turned off. Thereafter, the charging SW element 62a of the first bidirectional SW 24a is turned on. As a result, the generating SW elements 60a, 60b are turned off, and the charging SW elements 62a, 62b are turned on. The regenerative electric power Preg from the motor 12 is preferentially supplied to charge the first battery 22a whose voltage is lower. Since the generating SW elements 60a, 60b are turned off, no short circuit occurs between the first battery 22a and the second battery 22b, and the electric power from the second battery 22b is not supplied to the first battery 22a.

In FIG. 16, the input current Iinv of the inverter 26 switches from negative to positive, i.e., the electric automobile 10 switches from the regenerative mode to the power mode. When the input current Iinv of the inverter 26 is lower than the current threshold value THi2, the generating SW elements 60a, 60b are turned off, and the charging SW elements 62a, 62b are turned on. The regenerative electric power Preg from the motor 12 is preferentially supplied to charge the first battery 22a whose voltage is lower. Since the generating SW elements 60a, 60b are turned off, no short circuit occurs between the first battery 22a and the second battery 22b, and the electric power from the second battery 22b is not supplied to the first battery 22a.

At time T21, when the input current Iinv of the inverter 26 becomes equal to or higher than the current threshold value THi2, the charging SW element 62a of the first bidirectional SW 24a is turned off. Thereafter, the generating SW element 60b of the second bidirectional SW 24b is turned on. As a result, the generating SW element 60a and the charging SW element 62a of the first bidirectional SW 24a are turned off, and the generating SW element 60b and the charging SW element 62b of the second bidirectional SW 24b are turned on. When the input current Iinv of the inverter 26 is equal to or higher than the current threshold value THi2 and equal to or lower than the current threshold value THi1, the SW elements 60, 62 remain thus turned on and off.

At time t22, when the input current Iinv of the inverter 26 becomes equal to or higher than the current threshold value THi1, the charging SW element 62b of the second bidirectional SW 24b is turned off. Thereafter, the generating SW element 60a of the first bidirectional SW 24a is turned on. As a result, the generating SW elements 60a, 60b are turned on, and the charging SW elements 62a, 62b are turned off. The electric power from the second battery 22b whose voltage is higher is supplied to the inverter 26, and the electric power from the first battery 22a whose voltage is lower is not supplied to the inverter 26. Since the charging SW elements 62a, 62b are turned off, no short circuit occurs between the first battery 22a and the second battery 22b, and the electric power from the second battery 22b is not supplied to the first battery 22a.

Though the first bidirectional SW 24a and the second bidirectional SW 24b are turned on and off based on the input current Iinv of the inverter 26 as described above, the first bidirectional SW 24a and the second bidirectional SW 24b may be turned on and off based on the input voltage Vinv of the inverter 26 or the electric power consumed by the motor 12 or the electric power regenerated thereby. Alternatively, if times of switching between generation and charge can be determined, then the SW elements 60, 62 can be selectively turned on and off at prescribed times before and after the times of switching. The times of switching between generation and charge may be determined using a predicted time until actual electric power crosses a zero point.

C. Example of Output Waveforms

Figure 17:
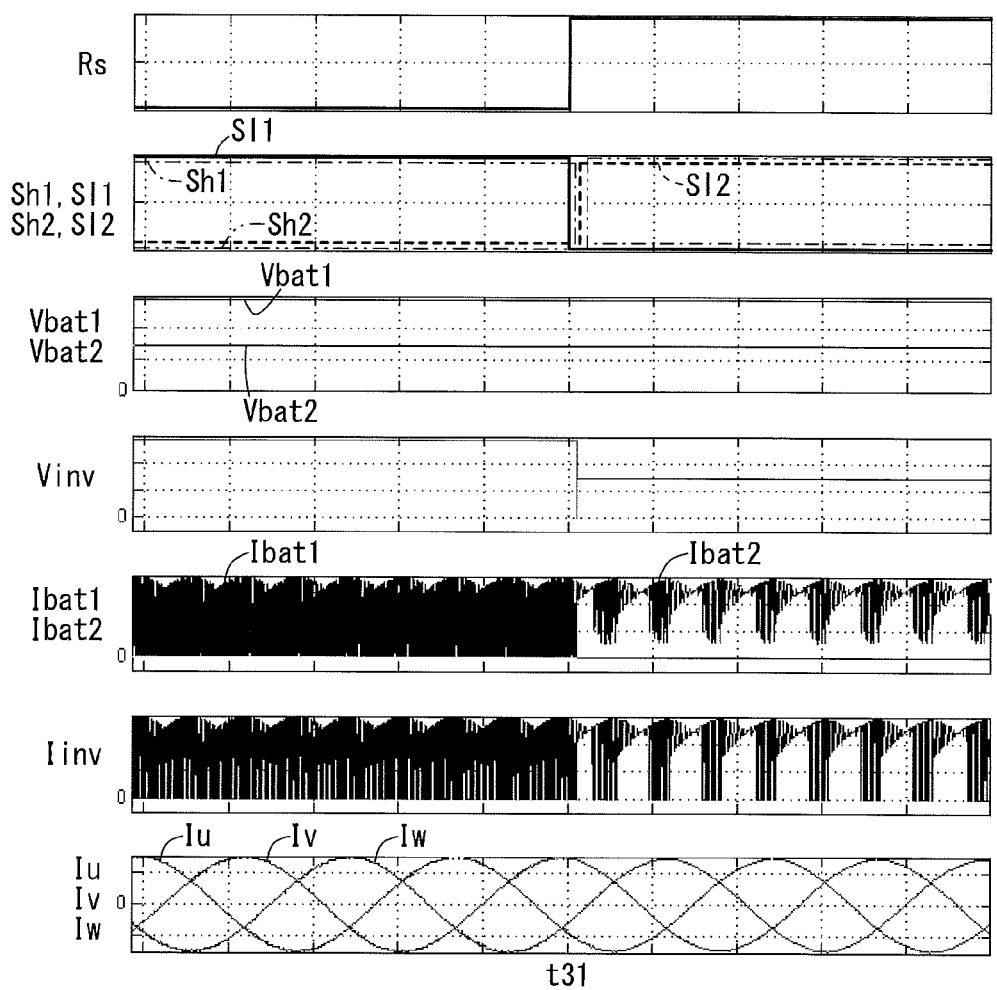
FIG. 17 is a diagram showing an example of the output waveforms of various signals in the electric automobile according to the first embodiment.
Figure 18:
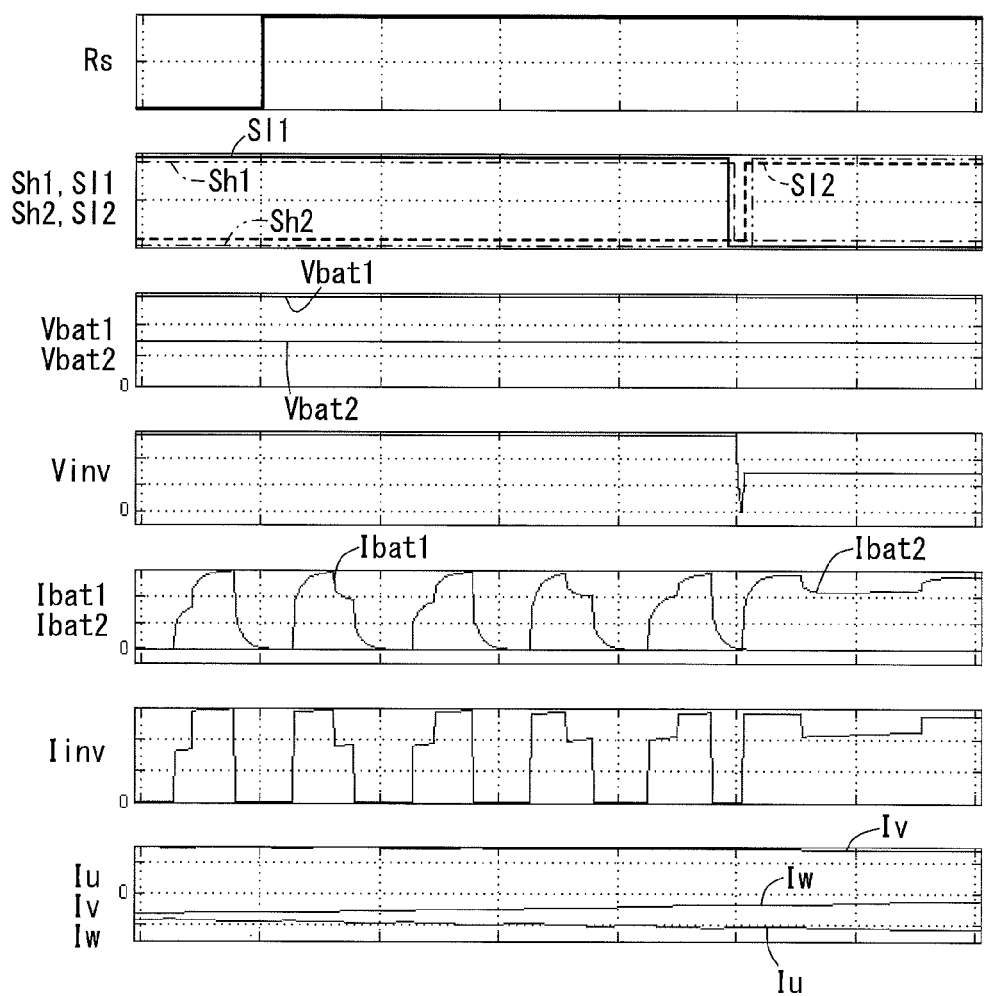
FIG. 18 is a diagram illustrating portions of FIG. 17, at an enlarged scale.

FIG. 17 shows an example of the output waveforms of the forced short circuit request Rs, the drive signals Sh1, Sh2, Sl1, Sl2 for the SW elements 60a, 60b, 62a, 62b, the first battery voltage Vbat1, the second battery voltage Vbat2, the output voltage Vinv of the inverter 26, the first battery current Ibat1, the second battery current Ibat2, the input current Iinv of the inverter 26, the U phase current Iu, the V phase current Iv, and the W phase current Iw in the electric automobile 10 according to the first embodiment. FIG. 18 illustrates portions, around time t31 in FIG. 17, of the output waveforms at an enlarged scale.

As shown in FIGS. 17 and 18, prior to time t31, since the drive signals Sh1, Sl1 are high, i.e., of logic level 1 and the drive signals Sh2, Sl2 are low, i.e., of logic level 0, the SW elements 60a, 62a are turned on, and the SW elements 60b, 62b are turned off. Therefore, the input voltage Vinv of the inverter 26 is equal to the first battery voltage Vbat1 of the first battery 22a, whereas the input current Iinv of the inverter 26 is substantially equal to the first battery current Ibat1 of the first battery 22a.

When the forced short circuit request Rs is supplied, i.e., its logic level changes to 1, at time t31, all the drive signals UH, VH, WH are made to go high, i.e., change to logic level 1, forcibly bringing on a three-phase short-circuited state in the inverter 26 to temporarily make the input voltage Vinv of the inverter 26 nil, for example. Then, the drive signals Sh1, Sl1 are made to go low, i.e., change to logic level 0, and the drive signals Sh2, Sl2 are made to go high, i.e., change to logic level 1, turning off the SW elements 60a, 62a and turning on the SW elements 60b, 62b. When the three-phase short-circuited state is finished, the input voltage Vinv of the inverter 26 becomes equal to the second battery voltage Vbat2 of the second battery 22b, whereas the input current Iinv of the inverter 26 becomes equal to the second battery current Ibat2 of the second battery 22b.

D. Advantages of First Embodiment

According to the first embodiment, as described above, when the second control rule (a second cut-off control) which does not use the first battery voltage Vbat1 and the second battery voltage Vbat2 is not used, but only the first control rule is used, i.e., when only a first cut-off control process for cutting off the generating path and the charging path of one electric power system is used, the bidirectional SWs 24 are controlled to be conductive or nonconductive so as to provide (N−1) electric power system(s) wherein the first cut-off control process is performed (see FIG. 14). Therefore, only the first cut-off control process is performed, the bidirectional SW 24 is rendered conductive in only one electric power system. Consequently, a short-circuited state wherein a current flows from one of the batteries 22 into the other battery 22 through a parallel circuit is prevented from being developed.

When only the second control rule is used, all the charging SW elements 62 are turned off, i.e., the charging path is cut off, for electric power generation, and all the generating SW elements 60 are turned off, i.e., the generating path is cut off, for battery charging. Consequently, a short-circuited state also is prevented from occurring between the batteries 22 when only the second control rule is used.

Therefore, when either one of the first control rule and the second control rule is used, a short-circuited state can be prevented from occurring between the batteries 22. An excessive current is thus prevented from being generated, particularly when switching between the batteries 22, due to a voltage difference between the batteries 22, and a power loss can also be prevented from being caused due to equalization of the batteries 22. When at least one of the first control rule and the second control rule is used, a short-circuited state can reliably be avoided without performing a process which uses high and low voltages of the batteries 22.

It is thus possible to increase the range of options for using the batteries 22 while achieving the above advantages.

According to the first embodiment, the bidirectional SWs 24 are used as semiconductor switches which can be rendered nonconductive separately in both directions. Thus, the bidirectional conduction and nonconduction can be controlled separately.

According to the first embodiment, for selectively turning on and off the SW elements 60, 62, e.g., for switching between one generating path and another charging path of the first battery 22a and the second battery 22b, a dead time dt is inserted into the drive signals Sh1, Sl1, Sh2, Sl2 for the SW elements 60, 62 for thereby reliably preventing a short circuit from occurring between the first battery 22a and the second battery 22b.

According to the first embodiment, for switching from the "ONE POWER SUPPLY USE (FIRST BATTERY)" mode to the "ONE POWER SUPPLY USE (SECOND BATTERY)" mode, or vice versa, the electric power ECU 50 controls the SW elements 60, 62 in order to shift from the bidirectionally conductive state of one of the batteries 22 to the bidirectionally conductive state of the other battery 22. It is thus possible to generate electric power from the batteries 22 and charge the batteries 22 while switching between the batteries 22.

According to the first embodiment, switching from the "ONE POWER SUPPLY USE (FIRST BATTERY)" mode to the "ONE POWER SUPPLY USE (SECOND BATTERY)" mode, or vice versa, takes place in the "GENERATION/CHARGE SWITCHING MODE" as an intermediate mode between the power mode and the regenerative mode of the electric automobile 10 (see FIGS. 15 and 16). It is thus possible to use a battery 22 for generating electric power and a battery 22 for being charged, separately from each other.

According to the first embodiment, when the electric automobile 10 is in the power mode in the "HIGH-VOLTAGE BATTERY GENERATION" mode, the electric power ECU 50 turns on the generating SW elements 60a, 60b simultaneously (FIG. 14). Since the battery 22 whose voltage is higher now supplies electric power without the need for comparing the first battery voltage Vbat1 and the second battery voltage Vbat2, the electric power can efficiently be supplied under a high load. The battery 22 whose voltage is lower, i.e., whose SOC is lower, is prevented from generating electric power.

According to the first embodiment, when the electric automobile 10 is in the regenerative mode in the "LOW-VOLTAGE BATTERY CHARGE" mode, the electric power ECU 50 turns on the charging SW elements 62a, 62b simultaneously (FIG. 14). The battery 22 whose voltage is lower can now be positively charged automatically without the need for comparing the first battery voltage Vbat1 and the second battery voltage Vbat2. As the battery 22 whose SOC is lower is positively charged, it is prevented from being excessively discharged.

According to the first embodiment, the "HIGH-VOLTAGE BATTERY GENERATION" mode can be used when the electric automobile 10 is in the power mode, and the "LOW-VOLTAGE BATTERY CHARGE" mode can be used when the electric automobile 10 is in the regenerative mode. An appropriate control process can thus be carried out depending on the automobile mode.

According to the first embodiment, when the "HIGH-VOLTAGE BATTERY GENERATION" mode and the "LOW-VOLTAGE BATTERY CHARGE" mode are combined with each other, the "GENERATION/CHARGE SWITCHING MODE" as an intermediate mode between the power mode (GENERATION MODE) and the regenerative mode (CHARGE MODE) of the electric automobile 10 is judged. If the electric automobile 10 is in the "GENERATION/CHARGE SWITCHING MODE", the SW elements 60b, 62b are turned on to render the second battery 22b conductive bidirectionally, and the SW elements 60a, 62a are turned off to render the first battery 22a nonconductive bidirectionally. When the electric automobile 10 is in the "GENERATION/CHARGE SWITCHING MODE", therefore, a single battery 22 is charged and discharged. Even in the "GENERATION/CHARGE SWITCHING MODE", the electric power ECU 50 and the batteries 22 can operate stably, and a short-circuited state is reliably prevented from occurring between the first battery 22a and the second battery 22b.

According to the first embodiment, the electric power ECU 50 selectively turns on and off the SW elements 60, 62 while a three-phase short-circuited state is being developed in the inverter 26. A short-circuited state is thus more reliably prevented from occurring between the first battery 22a and the second battery 22b.

According to the first embodiment, the SW elements 60, 62 are selectively turned on and off, i.e., the batteries 22 are switched over, while a three-phase short-circuited state is being developed in the inverter 26. Therefore, a voltage variation due to the switching between the batteries 22 is not transmitted to the motor 12, which is thus prevented from causing an unwanted torque variation.

According to the first embodiment, the electric power ECU 50 turns on and off the upper arm SW elements 86 in the respective phases and the lower arm SW elements 92 in the respective phases based on the result of comparison between the voltage command values THu, THv, THw in the respective three phases and the carrier signal Sca. The electric power ECU 50 detects when the carrier signal Sca becomes higher or lower than all the voltage command values THu, THv, THw in the respective three phases, thus detecting a three-phase short-circuited state (see FIG. 12).

While the inverter 26 is being normally controlled, therefore, it is possible to judge a three-phase short-circuited state as being developed when all the upper arm SW elements 86 in the respective three phases or all the lower arm SW elements 92 in the respective three phases are turned on, and to switch between the SW elements 60, 62 in the three-phase short-circuited state. Therefore, the SW elements 60, 62 can be switched over while preventing the motor 12 from causing an unwanted torque variation while the inverter 26 is being normally controlled.

According to the first embodiment, when the electric power ECU 50 receives a forced short circuit request Rs for switching between the batteries 22, the electric power ECU 50 outputs the drive signals UH, VH, WH to all the upper arm SW elements 86 in the respective three phases or the drive signals UL, VL, WL to all the lower arm SW elements 92 in the respective three phases, forcibly bringing on a three-phase short-circuited state. Consequently, when switching between the batteries 22 is required, they can be switched over at an appropriate timing.

II. Second Embodiment

A. Description of Arrangement (Differences from First Embodiment)

Figure 19:
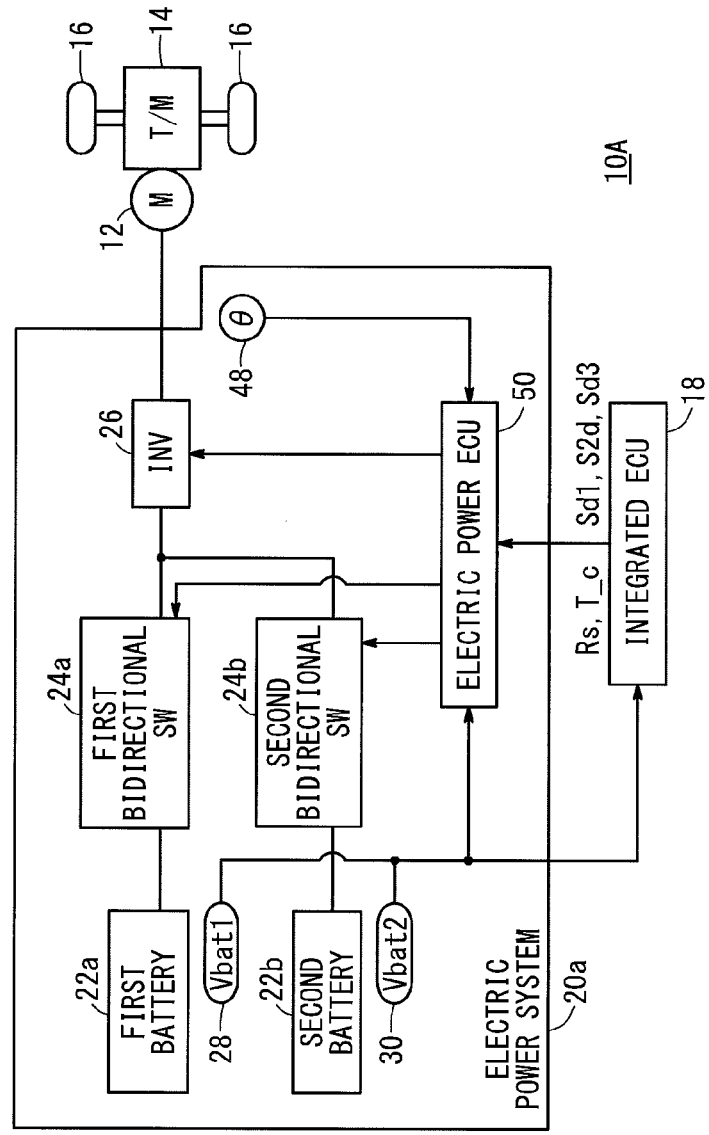
FIG. 19 is a block diagram of an electric automobile according to a second embodiment of the present invention.

FIG. 19 is a block diagram of an electric automobile 10A according to a second embodiment of the present invention. The electric automobile 10A is of the same arrangement as the electric automobile 10 according to the first embodiment, but is different from the electric automobile 10 according to the first embodiment in that the detected values from the voltage sensors 28, 30, i.e., the first battery voltage Vbat1 and the second battery voltage Vbat2, are required to be input to the integrated ECU 18, and the integrated ECU 18 selects the batteries 22.

Those components of the second embodiment which are identical to those of the first embodiment are denoted by identical reference characters, and will not be described in detail below.

B. On-Off Control for Bidirectional SWs 24

A control process for turning on and off the bidirectional SWs 24 will be described below.

According to the second embodiment, the integrated ECU 18 determines which of the batteries 22 is to be used by comparing the first battery voltage Vbat1 of the first battery 22a and the second battery voltage Vbat2 of the second battery 22b with each other.

According to the second embodiment, as with the first embodiment, the integrated ECU 18 can select one of the modes shown in FIG. 20, for example, "STOP", "ONE POWER SUPPLY GENERATION", "ONE POWER SUPPLY CHARGE", "ONE POWER SUPPLY USE", "HIGH-VOLTAGE BATTERY GENERATION", and "LOW-VOLTAGE BATTERY CHARGE". In addition, the integrated ECU 18 can also select one of modes "ONE POWER SUPPLY GENERATION AND ONE POWER SUPPLY CHARGE", "HIGH-VOLTAGE BATTERY GENERATION AND ONE POWER SUPPLY CHARGE", and "ONE POWER SUPPLY GENERATION AND LOW-VOLTAGE BATTERY CHARGE".

However, unlike the first embodiment, each of the "ONE POWER SUPPLY GENERATION", "ONE POWER SUPPLY CHARGE", and "ONE POWER SUPPLY USE" modes can be established depending on high and low voltages.

Specifically, the "ONE POWER SUPPLY GENERATION" mode is a mode in which one of the first battery 22a and the second battery 22b is used to generate electric power, as with the first embodiment. According to the second embodiment, one of a mode which uses a battery whose voltage is relatively high (i.e., the first battery 22a in FIG. 20) and a mode which uses a battery whose voltage is relatively low (i.e., the second battery 22*b* in FIG. 20) can be selected as the "ONE POWER SUPPLY GENERATION" mode.

The "ONE POWER SUPPLY CHARGE" mode is a mode in which one of the first battery 22*a* and the second battery 22*b* is to be charged, as with the first embodiment. According to the second embodiment, one of a mode which uses a battery whose voltage is relatively high (i.e., the first battery 22*a* in FIG. 20) and a mode which uses a battery whose voltage is relatively low (i.e., the second battery 22*b* in FIG. 20) can be selected as the "ONE POWER SUPPLY CHARGE" mode.

The "ONE POWER SUPPLY USE" mode is a mode in which one of the first battery 22*a* and the second battery 22*b* is used to generate electric power and is to be charged, and the other battery is neither used to generate electric power nor to be charged, as with the first embodiment. According to the second embodiment, one of a mode which uses a battery whose voltage is relatively high (i.e., the first battery 22*a* in FIG. 20) and a mode which uses a battery whose voltage is relatively low (i.e., the second battery 22*b* in FIG. 20) can be selected as the "ONE POWER SUPPLY USE" mode.

In each of the "ONE POWER SUPPLY GENERATION", "ONE POWER SUPPLY CHARGE", and "ONE POWER SUPPLY USE" modes, high and low voltages are judged by the integrated ECU 18 based on the first battery voltage Vbat1 from the voltage sensor 28 and the second battery voltage Vbat2 from the voltage sensor 30. In other modes which require voltage judgment, high and low voltages are judged in the same manner.

The "ONE POWER SUPPLY GENERATION", "ONE POWER SUPPLY CHARGE", and "ONE POWER SUPPLY USE" modes that are used in the first embodiment, which can be selected without the need for judging battery voltages, can also be used in combination.

The "ONE POWER SUPPLY GENERATION AND ONE POWER SUPPLY CHARGE", "HIGH-VOLTAGE BATTERY GENERATION AND ONE POWER SUPPLY CHARGE", and "ONE POWER SUPPLY GENERATION AND LOW-VOLTAGE BATTERY CHARGE" modes which are added according to the second embodiment will be described below.

The "ONE POWER SUPPLY GENERATION AND ONE POWER SUPPLY CHARGE" mode is a mode in which the "ONE POWER SUPPLY GENERATION" mode is carried out with respect to one of the first battery 22*a* and the second battery 22*b* which has a lower voltage and the "ONE POWER SUPPLY CHARGE" mode is carried out with respect to one of the first battery 22*a* and the second battery 22*b* which has a higher voltage. The "ONE POWER SUPPLY GENERATION AND ONE POWER SUPPLY CHARGE" mode can be used, for example, when it cannot be judged whether the motor 12 is in the power mode or the regenerative mode while it is known that one of the batteries 22 will soon be replaced, and the battery 22 to be replaced is to output electric power. The "ONE POWER SUPPLY GENERATION" mode and the "ONE POWER SUPPLY CHARGE" mode can be switched over according to the process described in the first embodiment.

The "HIGH-VOLTAGE BATTERY GENERATION AND ONE POWER SUPPLY CHARGE" mode is a mode in which the "HIGH-VOLTAGE BATTERY GENERATION" mode is carried out when the electric automobile 10A is in the power mode, and the "ONE POWER SUPPLY CHARGE" mode is carried out with respect to one of the first battery 22*a* and the second battery 22*b* which has a higher voltage when the electric automobile 10A is in the regenerative mode. The "HIGH-VOLTAGE BATTERY GENERATION AND ONE POWER SUPPLY CHARGE" mode can be used, for example, when it cannot be judged whether the motor 12 is in the power mode or the regenerative mode while it is known that one of the batteries 22 will soon be replaced, and the battery 22 to be replaced is to output electric power as much as possible. The "HIGH-VOLTAGE BATTERY GENERATION" mode and the "ONE POWER SUPPLY CHARGE" mode can be switched over according to the process described in the first embodiment.

The "ONE POWER SUPPLY GENERATION AND LOW-VOLTAGE BATTERY CHARGE" mode is a mode in which the "ONE POWER SUPPLY GENERATION" is carried out with respect to one of the first battery 22*a* and the second battery 22*b* which has a lower voltage when the electric automobile 10A is in the power mode, and the "LOW-VOLTAGE BATTERY CHARGE" mode is carried out when the electric automobile 10A is in the regenerative mode. The "ONE POWER SUPPLY GENERATION AND LOW-VOLTAGE BATTERY CHARGE" mode can be used, for example, when it cannot be judged whether the motor 12 is in the power mode or the regenerative mode while it is known that one of the batteries 22 will soon be replaced, and the battery 22 not to be replaced is charged as much as possible. The "ONE POWER SUPPLY GENERATION" mode and the "LOW-VOLTAGE BATTERY CHARGE" mode can be switched over according to the process described in the first embodiment.

According to the first embodiment, as described above, the SW elements 60, 62 are controlled such that when one of the batteries 22 generates electric power, the other battery 22 cannot be charged, and that when one of the batteries 22 is charged, the other battery 22 cannot generate electric power. Stated otherwise, in each of the modes shown in FIG. 14, SW elements that are turned on do not exist in a diagonally opposite pair, i.e., both the generating SW element 60*a* and the charging SW element 62*b* are not turned on, or both the generating SW element 60*b* and the charging SW element 62*a* are not turned on. In this manner, a short-circuited state is prevented from occurring between the first battery 22*a* and the second battery 22*b*.

According to the second embodiment, the "ONE POWER SUPPLY GENERATION AND ONE POWER SUPPLY CHARGE", "HIGH-VOLTAGE BATTERY GENERATION AND ONE POWER SUPPLY CHARGE", and "ONE POWER SUPPLY GENERATION AND LOW-VOLTAGE BATTERY CHARGE" modes that are added go counter to the above rules, i.e., the first control rule and the second control rule according to the first embodiment.

According to the second embodiment, a short-circuited state is prevented from occurring based on a first control rule and a second control rule which use the first battery voltage Vbat1 and the second battery voltage Vbat2.

The first control rule according to the second embodiment is that the charging SW element 62 corresponding to the battery 22 whose battery voltage is lower than the highest battery voltage Vbat of the battery 22 (hereinafter referred to as "highest voltage battery") of the batteries 22 corresponding to the generating SW elements 60 that are turned on, is turned off. Stated otherwise, the charging path whose voltage is lower than the generating path whose voltage is highest (hereinafter referred to as "highest voltage generating path") of energized generating paths, is cut off. The charging SW element 62 corresponding to the battery 22 whose voltage is equal to or higher than the highest voltage battery may be turned on or off. In other words, the charging path whose voltage is equal to or higher than the highest voltage generating path may be turned on or off.

For example, in the "ONE POWER SUPPLY GENERATION AND ONE POWER SUPPLY CHARGE" mode shown in FIG. 20, since the first battery voltage Vbat1 is higher than the second battery voltage Vbat2, the charging SW element 62b corresponding to the second battery 22b is turned off. Therefore, the electric power from the first battery 22a is not supplied to the second battery 22b, preventing a short circuit from occurring between the batteries 22.

The second control rule according to the second embodiment is that the generating SW element 60 corresponding to the battery 22 whose battery voltage is higher than the lowest battery voltage of the battery 22 (hereinafter referred to as "lowest voltage battery") of the batteries 22 corresponding to the charging SW elements 62 that are turned on, is turned off. Stated otherwise, the generating path whose voltage is higher than the charging path whose voltage is lowest (hereinafter referred to as "lowest voltage charging path") of energized charging paths, is cut off. The generating SW element 60 corresponding to the battery 22 whose voltage is equal to or lower than the lowest voltage battery may be turned on or off. In other words, the generating path whose voltage is equal to or lower than the lowest voltage charging path may be turned on or off.

For example, in the "ONE POWER SUPPLY GENERATION AND ONE POWER SUPPLY CHARGE" mode shown in FIG. 20, since the first battery voltage Vbat1 is higher than the second battery voltage Vbat2, the generating SW element 60a corresponding to the first battery 22a is turned off. Therefore, the electric power from the first battery 22a is not supplied to the second battery 22b, preventing a short circuit from occurring between the batteries 22.

According to the first control rule and the second control rule described above in the second embodiment, a short-circuited state can be prevented from occurring between the first battery 22a and the second battery 22b.

C. Advantages of Second Embodiment

The second embodiment offers the following advantages in addition to the advantages of the first embodiment:

According to the second embodiment, the SW elements 60, 62 are controlled based on the first control rule and the second control rule which use the first battery voltage Vbat1 and the second battery voltage Vbat2. According to the first control rule (first cut-off state), the charging SW element 62 corresponding to the battery 22 whose battery voltage is lower than that of the highest voltage battery, whose voltage is highest of the batteries 22 corresponding to the generating SW elements 60 are turned on, is turned off. Stated otherwise, the charging path whose voltage is lower than the highest voltage generating path of the energized generating paths, is cut off. Consequently, a short-circuited state wherein a current flows from the highest voltage battery, i.e., the highest voltage generating path, into either one of the batteries 22, i.e., the charging path, through a parallel circuit is prevented from being developed.

According to the second control rule (second cut-off state), the generating SW element 60 corresponding to the battery 22 whose battery voltage is higher than the lowest voltage battery whose voltage is lowest of the batteries 22 corresponding to the charging SW elements 62 are turned on, is turned off. Stated otherwise, the generating path whose voltage is higher than the lowest voltage charging path of the energized charging paths, is cut off. Consequently, a short-circuited state wherein a current flows to the lowest voltage battery, i.e., the lowest voltage charging path, from either one of the batteries 22, i.e., the generating path, through a parallel circuit is prevented from being developed.

Therefore, when either one of the first control rule and the second control rule is used, a short-circuited state is prevented from occurring between the batteries 22. An excessive current is thus prevented from being generated, particularly when switching between the batteries 22, due to a voltage difference between the batteries 22, and a power loss is also prevented from being caused due to equalization of the batteries 22.

It is thus possible to increase the range of options for processes for using the batteries 22 while achieving the above advantages.

According to the second embodiment, the voltage sensors 28, 30 are provided in combination with the first battery 22a and the second battery 22b, respectively. The magnitudes of the voltages of these batteries 22 are grasped using the voltage sensors 28, 30, and the control process is carried out based on the grasped voltages. Since the control process is carried out based on the grasped voltages, a short-circuited state is reliably prevented from occurring between the batteries 22.

III. Third Embodiment

A. Description of Arrangement (Differences from Each of Above Embodiments)

Figure 21:
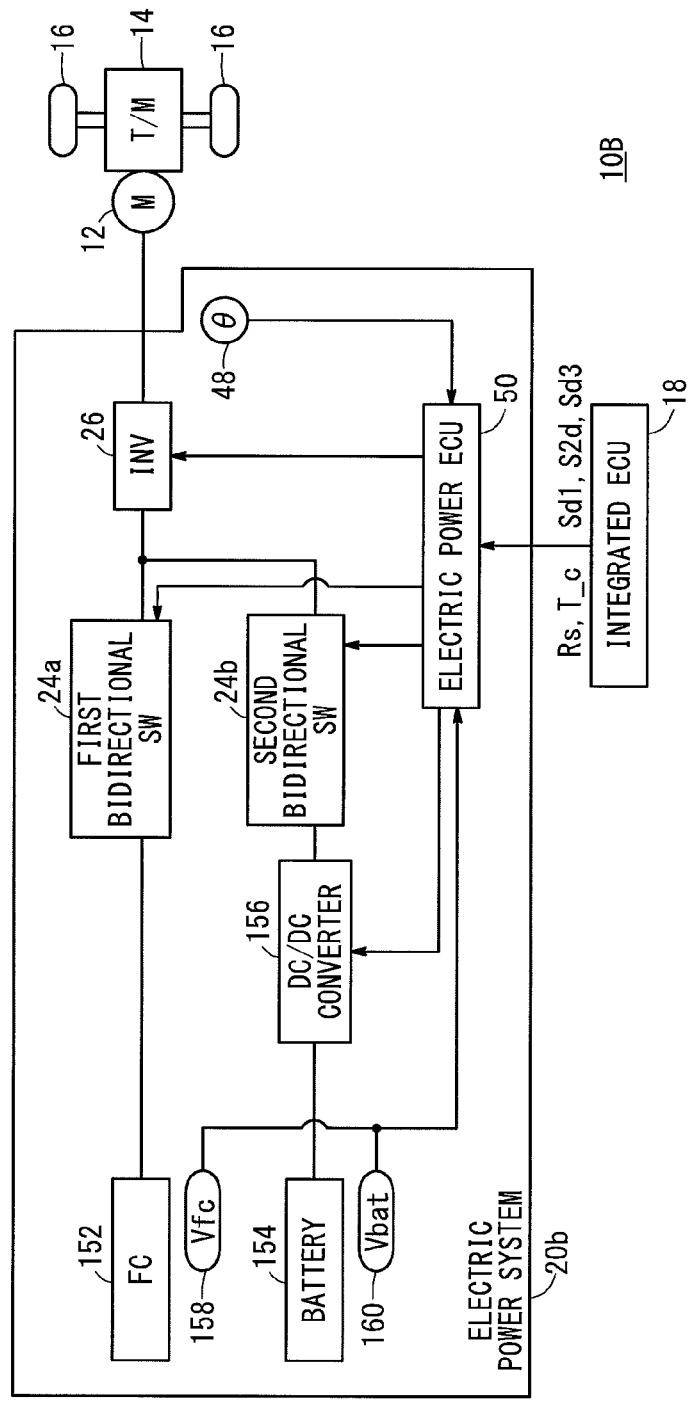
FIG. 21 is a block diagram of an electric automobile according to a third embodiment of the present invention.
Figure 22:
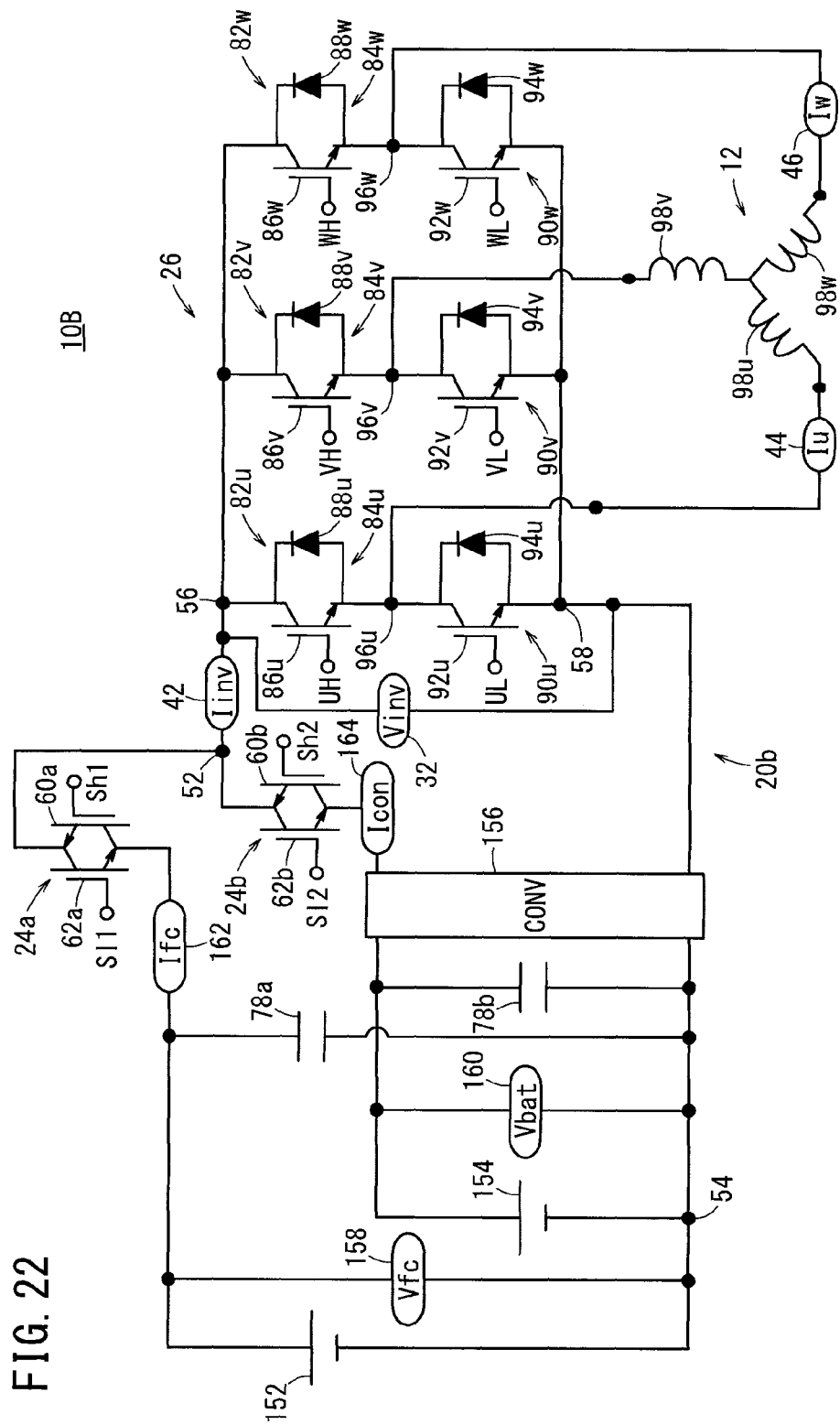
FIG. 22 is a circuit diagram showing a portion of a circuit arrangement of the electric automobile according to the third embodiment.

FIG. 21 is a block diagram of an electric automobile 10B according to a third embodiment of the present invention. FIG. 22 is a circuit diagram showing a portion of a circuit arrangement of the electric automobile 10B. The electric automobile 10B has a traction motor 12, a transmission 14, road wheels 16, an integrated ECU 18, and an electric power system 20b, as with each of the above embodiments.

Those components of the third embodiment which are identical to those of each of the above embodiments are denoted by identical reference characters, and will not be described in detail below.

The electric power system 20b supplies electric power to the motor 12 and is supplied with regenerative electric power Preg from the motor 12. The electric power system 20b has a fuel cell 152 (hereinafter referred to as "FC 152"), a battery 154, a DC/DC converter 156, a first bidirectional SW 24a, a second bidirectional SW 24b, an inverter 26, voltage sensors 32, 158, 160, current sensors 42, 44, 46, 162, 164, a resolver 48, and an electric power ECU 50. Since the electric power system 20b has the FC 152, the electric automobile 10B is a fuel cell vehicle.

The FC 152 is of a stacked structure including a stack of cells each having an anode, a cathode, and a solid polymer electrolyte membrane interposed between the anode and the cathode. A reaction gas supply unit, not shown, is connected to the FC 152 by a pipe. The reaction gas supply unit includes a hydrogen tank which stores hydrogen gas (fuel gas) as a reaction gas and a compressor which compresses air (oxygen-containing gas) as another reaction gas. Hydrogen and air that are supplied from the reaction gas supply unit to the FC 152 electrochemically react with each other in the FC 152, generating an electric current which is supplied to the motor 12 and the battery 154.

The battery 154 is identical to the first battery 22a or the second battery 22b according to the first embodiment.

The DC/DC converter 156 comprises a chopper-type voltage converter which has a terminal (primary terminal) connected to the battery 154 and another terminal (secondary terminal) connected to a junction 52 between the FC 152 and the inverter 26. Specifically, the DC/DC converter 156 comprises a step up/down voltage converter which converts, i.e., steps up, a voltage at the primary terminal (hereinafter referred to as "primary voltage V1") into a voltage at the secondary terminal (hereinafter referred to as "secondary voltage V2"), and converts, i.e., steps down, the secondary voltage V2 into the primary voltage V1 (V1≤V2).

The FC 152 has its output power controllable by controlling the secondary voltage V2 with the DC/DC converter 156. Such a control process is disclosed in U.S. Patent Application Publication No. 2009/0243386, for example.

The voltage sensor 158 detects an output voltage [V] from the FC 152 (hereinafter referred to as "FC voltage Vfc"). The voltage sensor 160 detects an output voltage [V] from the battery 154 (hereinafter referred to as "battery voltage Vbat").

The current sensor 162 detects an output current [A] from the FC 152 (hereinafter referred to as "FC current Ifc"). The current sensor 164 detects an output current [A] from the secondary terminal of the DC/DC converter 156 (hereinafter referred to as "converter output current Icon").

B. Various Control Processes

1. On-Off Control for Bidirectional SWs 2:

According to the third embodiment, the FC 152 only generates electric power, and cannot be charged. In view of this, the integrated ECU 18 controls the bidirectional SWs 24 as follows:

The integrated ECU 18 selects one of modes shown in FIG. 23 as necessary, for example. According to the third embodiment, specifically, the integrated ECU 18 selects and uses one of modes "STOP", "ONE POWER SUPPLY GENERATION", "ONE POWER SUPPLY CHARGE", and "ONE POWER SUPPLY USE" as with the first embodiment. In the "ONE POWER SUPPLY GENERATION (FC)" mode, the generating switching element 60b corresponding to the battery 154 is also turned on in order to step up the battery voltage Vbat with the DC/DC converter 156 to adjust the output power from the FC 152. The "ONE POWER SUPPLY CHARGE" mode is carried out for the battery 154 only. Since the "ONE POWER SUPPLY GENERATION" mode and the "ONE POWER SUPPLY USE" mode are essentially the same as each other with respect to the FC 152, the "ONE POWER SUPPLY USE (FC)" mode is not illustrated in FIG. 23. In the "ONE POWER SUPPLY GENERATION AND ONE POWER SUPPLY CHARGE" mode, the FC 152 generates electric power, which is supplied to charge the battery 154.

According to the third embodiment, the FC voltage Vfc and the battery voltage Vbat are not compared with each other, as with the first embodiment.

2. Control for Switching of Bidirectional SWs 24:

A control process for the SW elements 60, 62 for switching between the modes will be described below. As described above, for switching between the modes, the inverter 26 brings on a three-phase short-circuited state of the upper arm SW elements 86 or a three-phase short-circuited state of the lower arm SW elements 92. The charging SW element 62a of the first bidirectional SW 24a remains turned off at all times. Only the generating SW element 60a may be provided instead of the first bidirectional SW 24a.

(1) Simple Switching:

For switching between the "STOP" mode and another mode, e.g., for switching from the "STOP" mode to the "ONE POWER SUPPLY GENERATION" mode or vice versa, the electric power ECU 50 turns on and off the SW elements 60, 62 simply according to the table shown in FIG. 23. When the SW elements 60, 62 are thus turned on and off, no short circuit occurs between the FC 152 and the battery 154. At the time of switching, the dead time generator 128 (FIG. 8) inserts a dead time dt.

Similarly, for switching from the "ONE POWER SUPPLY GENERATION (FC)" mode to the "ONE POWER SUPPLY GENERATION (BATTERY)" mode or vice versa, the electric power ECU 50 turns on and off the SW elements 60, 62 simply according to the table shown in FIG. 23. When the SW elements 60, 62 are thus turned on and off, no short circuit occurs between the FC 152 and the battery 154. At the time of switching, the dead time generator 128 (FIG. 8) inserts a dead time dt.

(2) Stepwise Switching:

If the above simple switching is not effective to prevent a short circuit from occurring between the FC 152 and the battery 154, for example, if, when the electric automobile 10B is in the power mode, the "ONE POWER SUPPLY GENERATION (FC)" mode is carried out for the FC 152 to generate electric power, and if, when the electric automobile 10B is in the regenerative mode, the "ONE POWER SUPPLY USE (BATTERY)" mode is carried out to charge the battery 154, then such a short circuit can be prevented by the following process:

In FIG. 15, the input current Iinv of the inverter 26 switches from positive to negative, i.e., the electric automobile 10B switches from the power mode to the regenerative mode. When the input current Iinv of the inverter 26 exceeds the current threshold value THi1, the generating SW element 60a of the first bidirectional SW 24a is turned on and the charging SW element 62a thereof is turned off, and the generating SW element 60b of the second bidirectional SW 24b is turned on and the charging SW element 62b thereof is turned off.

At time t11, when the input current Iinv of the inverter 26 becomes equal to or lower than the current threshold value THi1, the generating SW element 60a of the first bidirectional SW 24a is turned off. Thereafter, both the generating SW element 60b and the charging SW element 62b of the second bidirectional SW 24b are turned on. A short-circuited state is now prevented from occurring which would otherwise allow the electric power from the FC 152 to be supplied to the battery 154 through the charging SW element 62b. However, such a short circuit may intentionally be caused to charge the battery 154. When the input current Iinv of the inverter 26 is equal to or higher than the current threshold value THi2 and equal to or lower than the current threshold value THi1, the SW elements 60, 62 remain thus turned on and off in that manner.

At time t12, when the input current Iinv of the inverter 26 becomes lower than the current threshold value THi2, both the generating SW element 60a and the charging SW element 62a of the first bidirectional SW 24a are kept turned off, and both the generating SW element 60b and the charging SW element 62b of the second bidirectional SW 24b are kept turned on.

In FIG. 16, the input current Iinv of the inverter 26 switches from negative to positive, i.e., the electric automobile 10B switches from the regenerative mode to the power mode. When the input current Iinv of the inverter 26 is lower than the current threshold value THi2, both the generating SW element 60a and the charging SW element 62a of the first bidirectional SW 24a are turned off, and both the generating SW element 60b and the charging SW element 62b of the second bidirectional SW 24b are turned on.

At time t21, when the input current Iinv of the inverter 26 becomes equal to or higher than the current threshold value THi2, and thereafter the input current Iinv of the inverter 26 is equal to or higher than the current threshold value THi2 and equal to or lower than the current threshold value THi1, both the generating SW element 60a and the charging SW element 62a of the first bidirectional SW 24a are kept turned off, and both the generating SW element 60b and the charging SW element 62b of the second bidirectional SW 24b are kept turned on.

At time t22, when the input current Iinv of the inverter 26 becomes equal to or higher than the current threshold value THi1, both the generating SW element 60b and the charging SW element 62b of the second bidirectional SW 24b are turned off. Thereafter, the generating SW element 60a of the first bidirectional SW 24a is turned on.

Though the first bidirectional SW 24a and the second bidirectional SW 24b are turned on and off based on the input current Iinv of the inverter 26 as described above, the first bidirectional SW 24a and the second bidirectional SW 24b may be turned on and off based on the input voltage Vinv of the inverter 26 or the electric power consumed by the motor 12 or the electric power regenerated thereby. Alternatively, if times of switching between generation and charge can be determined, then the SW elements 60, 62 can be selectively turned on and off at prescribed times before and after the times of switching. For example, the times of switching between generation and charge may be determined using a predicted time until actual electric power crosses a zero point.

C. Advantages of Third Embodiment

According to the third embodiment, as described above, the advantages of each of the above embodiments are achieved, and in addition, the electric power system 20b having the FC 152 is capable of controlling the SW elements 60, 62 appropriately.

IV. Fourth Embodiment

A. Description of Arrangement (Differences from First Embodiment)

Figure 24:
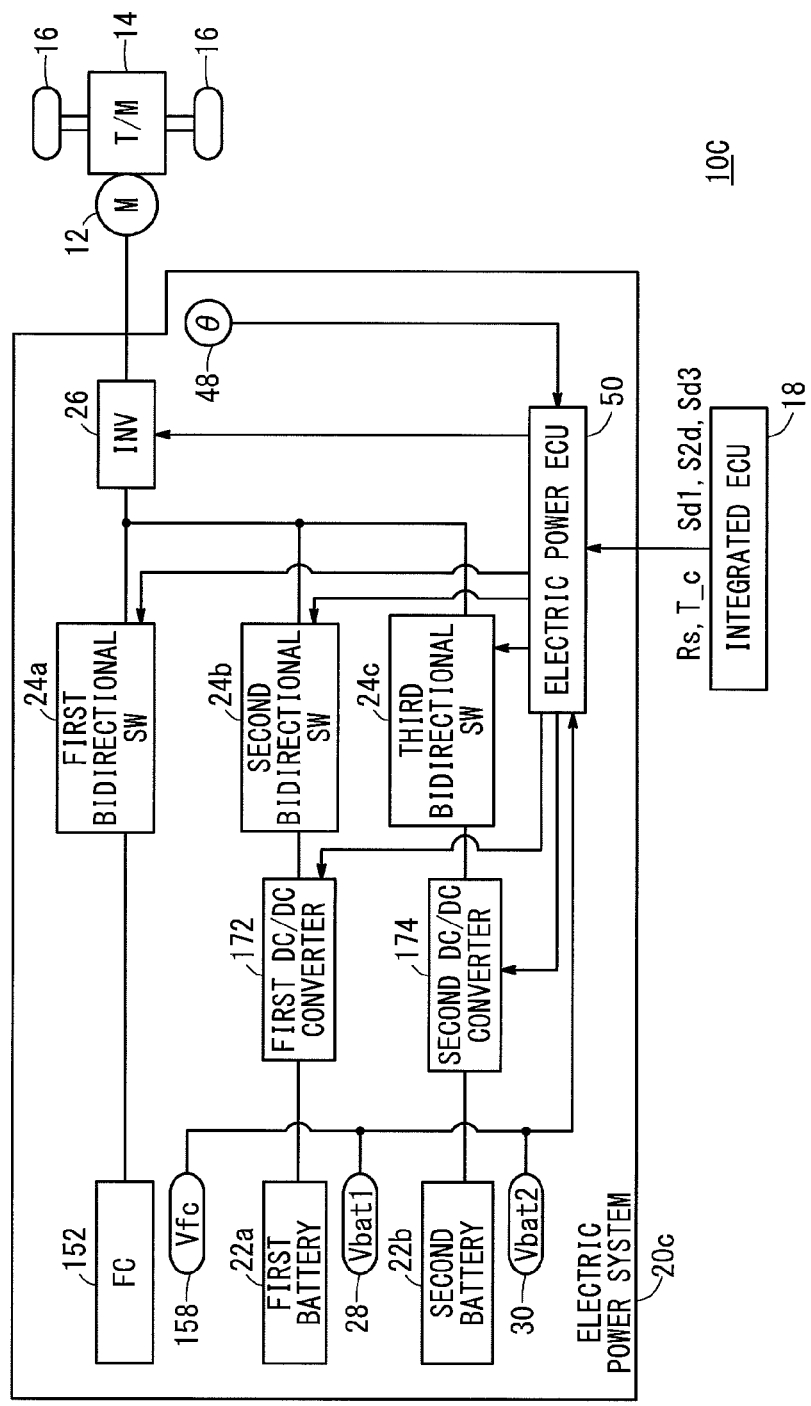
FIG. 24 is a block diagram of an electric automobile according to a fourth embodiment of the present invention.
Figure 25:
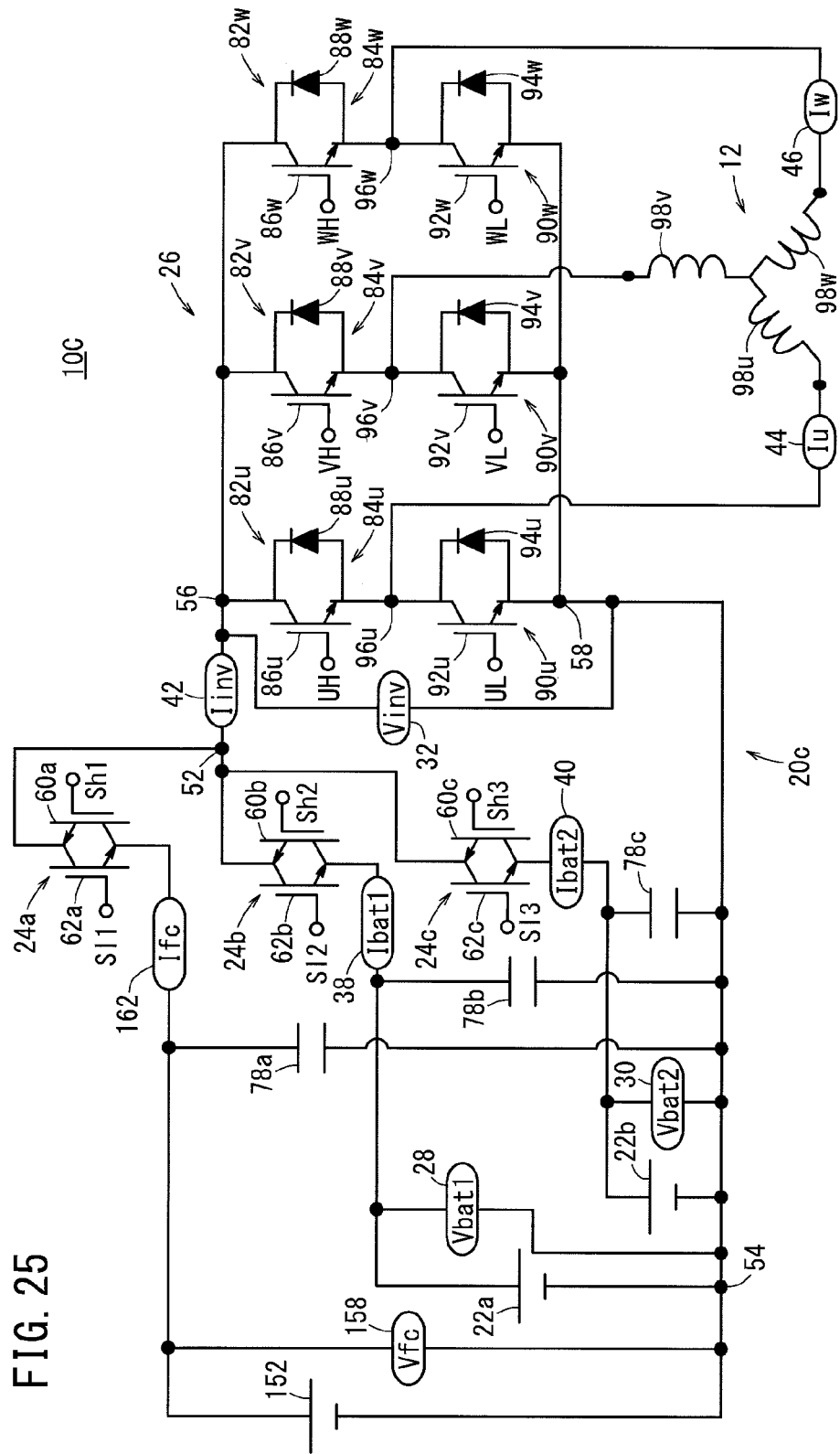
FIG. 25 is a circuit diagram showing a portion of a circuit arrangement of the electric automobile according to the fourth embodiment.

FIG. 24 is a block diagram of an electric automobile 10C according to a fourth embodiment of the present invention. FIG. 25 is a circuit diagram showing a portion of a circuit arrangement of the electric automobile 10C. The electric automobile 10C has a traction motor 12, a transmission 14, road wheels 16, an integrated ECU 18, and an electric power system 20c, as with each of the above embodiments.

Those components of the fourth embodiment which are identical to those of each of the above embodiments are denoted by identical reference characters, and will not be described in detail below.

The electric power system 20c supplies electric power to the motor 12 and is supplied with regenerative electric power Preg from the motor 12. The electric power system 20c has an FC 152, a first battery 22a, a second battery 22b, a first DC/DC converter 172, a second DC/DC converter 174, a first bidirectional SW 24a, a second bidirectional SW 24b, a third bidirectional switch 24c (hereinafter referred to as "third bidirectional SW 24c"), an inverter 26, voltage sensors 28, 30, 32, 158, current sensors 38, 40, 42, 44, 46, 162, a resolver 48, and an electric power ECU 50. Since the electric power system 20c has the FC 152, the electric automobile 10C is a fuel cell vehicle.

The third bidirectional SW 24c is identical in structure to the first bidirectional SW 24a and the second bidirectional SW 24b.

The first DC/DC converter 172 and the second DC/DC converter 174 are identical in structure to the DC/DC converter 156 according to the third embodiment. In FIG. 25, the first DC/DC converter 172 and the second DC/DC converter 174 are omitted from illustration.

B. Control Processes

1. On-Off Control for Bidirectional SWs 24:

A control process for turning on and off the bidirectional SWs 24 will be described below.

According to the fourth embodiment, since the FC 152, the first battery 22a, and the second battery 22b are present as power supplies and the voltages of the power supplies, i.e., the FC voltage Vfc, the first battery voltage Vbat1, and the second battery voltage Vbat2, are not used to select the power supplies. Therefore, the control process according to the first embodiment (FIG. 14) and the control process according to the third embodiment (FIG. 23) are basically used in combination.

The integrated ECU 18 selects and uses accordingly one of modes "STOP", "ONE POWER SUPPLY GENERATION", "ONE POWER SUPPLY CHARGE", "ONE POWER SUPPLY USE", "HIGH-VOLTAGE BATTERY GENERATION", and "LOW-VOLTAGE BATTERY CHARGE" shown in FIG. 26, according to the fourth embodiment.

When electric power is to be generated by the FC 152, the output electric power from the batteries 22 is used to control the output electric power from the FC 152. The "ONE POWER SUPPLY GENERATION" mode that uses the FC 152 includes a "ONE POWER SUPPLY GENERATION (FC, FIRST BATTERY)" mode which controls the output electric power with the first battery 22a and a "ONE POWER SUPPLY GENERATION (FC, SECOND BATTERY)" mode which controls the output electric power with the second battery 22b. The "HIGH-VOLTAGE BATTERY GENERATION" mode and the "LOW-VOLTAGE BATTERY CHARGE" mode are the same as those according to the first embodiment except that the FC 152 is held at rest.

2. Control for Switching of Bidirectional SWs 24:

A control process for the SW elements 60, 62 for switching between the modes will be described below. As described above, for switching between the modes, the inverter 26 brings on a three-phase short-circuited state of the upper arm SW elements 86 or a three-phase short-circuited state of the lower arm SW elements 92. The charging SW element 62a of the first bidirectional SW 24a remains turned off at all times. Only the generating SW element 60a may be provided instead of the first bidirectional SW 24a.

(1) Simple Switching:

For switching between the "STOP" mode and another mode, e.g., for switching from the "STOP" mode to the "ONE POWER SUPPLY GENERATION" mode or vice versa, the electric power ECU 50 turns on and off the SW elements 60, 62 simply according to the table shown in FIG. 26. When the SW elements 60, 62 are thus turned on and off, no short circuit occurs between the FC 152, the first battery 22*a*, and the second battery 22*b*. At the time of switching, the dead time generator 128 (FIG. 8) inserts a dead time dt.

Similarly, for switching from the "ONE POWER SUPPLY GENERATION (FC, FIRST BATTERY)" mode to the "ONE POWER SUPPLY GENERATION (FIRST BATTERY)" mode or vice versa, or for switching from the "ONE POWER SUPPLY GENERATION (FC, SECOND BATTERY)" mode to the "ONE POWER SUPPLY GENERATION (SECOND BATTERY)" mode or vice versa, or for switching from the "ONE POWER SUPPLY GENERATION (FC, FIRST BATTERY)" mode to the "ONE POWER SUPPLY GENERATION (SECOND BATTERY)" mode or vice versa, or for switching from the "ONE POWER SUPPLY GENERATION (FC, SECOND BATTERY)" mode to the "ONE POWER SUPPLY GENERATION (FIRST BATTERY)" mode or vice versa, or for switching from the "ONE POWER SUPPLY GENERATION (FIRST BATTERY)" mode to the "ONE POWER SUPPLY GENERATION (SECOND BATTERY)" mode or vice versa, or for switching from the "ONE POWER SUPPLY CHARGE (FIRST BATTERY)" mode to the "ONE POWER SUPPLY CHARGE (SECOND BATTERY)" mode or vice versa, or for switching from the "ONE POWER SUPPLY GENERATION (FC, FIRST BATTERY)" mode or the "ONE POWER SUPPLY GENERATION (FC, SECOND BATTERY)" mode or the "ONE POWER SUPPLY GENERATION (FIRST BATTERY)" mode or the "ONE POWER SUPPLY GENERATION (SECOND BATTERY)" mode to the "HIGH-VOLTAGE BATTERY GENERATION" mode or vice versa, or for switching from the "ONE POWER SUPPLY CHARGE (FIRST BATTERY)" mode or the "ONE POWER SUPPLY CHARGE (SECOND BATTERY)" mode to the "LOW-VOLTAGE BATTERY CHARGE" mode or vice versa, the electric power ECU 50 turns on and off the SW elements 60, 62 simply according to the table shown in FIG. 26. When the SW elements 60, 62 are thus turned on and off, no short circuit occurs between the FC 152, the first battery 22*a*, and the second battery 22*b*. At the time of switching, the dead time generator 128 (FIG. 8) inserts a dead time dt.

(2) Stepwise Switching:

If the above simple switching is not effective to prevent a short circuit from occurring between the FC 152, the first battery 22*a*, and the second battery 22*b*, for example, if, when the electric automobile 10C is in the power mode, the "ONE POWER SUPPLY GENERATION (FC, FIRST BATTERY)" mode is carried out, and if, when the electric automobile 10C is in the regenerative mode, the "LOW-VOLTAGE BATTERY CHARGE" mode is carried out to charge the first battery 22*a* or the second battery 22*b*, then such a short circuit can be prevented by the following process:

In FIG. 15, the input current Iinv of the inverter 26 switches from positive to negative, i.e., the electric automobile 10C switches from the power mode to the regenerative mode. When the input current Iinv of the inverter 26 exceeds the current threshold value THi1, the generating SW element 60*a* of the first bidirectional SW 24*a* is turned on and the charging SW element 62*a* thereof is turned off, and the generating SW element 60*b* of the second bidirectional SW 24*b* is turned on and the charging SW element 62*b* thereof is turned off. Both the generating SW element 60*c* and the charging SW element 62*c* of the third bidirectional SW 24*c* are turned off.

At time t11, when the input current Iinv of the inverter 26 becomes equal to or lower than the current threshold value THi1, the generating SW element 60*a* of the first bidirectional SW 24*a* is turned off. Thereafter, both the generating SW element 60*b* and the charging SW element 62*b* of the second bidirectional SW 24*b* are turned on. A short-circuited state is now prevented from occurring which would otherwise allow the electric power from the FC 152 to be supplied to the first battery 22*a* through the charging SW element 62*b*. However, such a short circuit may intentionally be caused to charge the first battery 22*a*. Both the generating SW element 60*c* and the charging SW element 62*c* of the third bidirectional SW 24*c* are kept turned off. When the input current Iinv of the inverter 26 is equal to or higher than the current threshold value THi2 and equal to or lower than the current threshold value THi1, the SW elements 60, 62 remain thus turned on and off.

The generating SW element 60*b* and the charging SW element 62*b* of the second bidirectional SW 24*b*, rather than the generating SW element 60*c* and the charging SW element 62*c* of the third bidirectional SW 24*c*, are turned on because of settings made in advance to that effect. Instead, the generating SW element 60*c* and the charging SW element 62*c* of the third bidirectional SW 24*c* may be turned on.

At time t12, when the input current Iinv of the inverter 26 becomes lower than the current threshold value THi2, both the generating SW element 60*a* and the charging SW element 62*a* of the first bidirectional SW 24*a* are kept turned off, and the generating SW element 60*b* of the second bidirectional SW 24*b* is turned off. Thereafter, the charging SW element 62*c* of the third bidirectional SW 24*c* is turned on. Then, the charging SW element 62*b* of the second bidirectional SW 24*b* and the charging SW element 62*c* of the third bidirectional SW 24*c* are turned on, whereas the other SW elements are turned off. The regenerative electric power Preg from the motor 12 is preferentially supplied to charge one of the first battery 22*a* and the second battery 22*b* whose voltage is lower. Since the generating SW elements 60*a*, 60*b*, 60*c* are turned off, no short circuit occurs between the FC 152, the first battery 22*a*, and the second battery 22*b*.

In FIG. 16, the input current Iinv of the inverter 26 switches from negative to positive, i.e., the electric automobile 10C switches from the regenerative mode to the power mode. When the input current Iinv of the inverter 26 is lower than the current threshold value THi2, the charging SW element 62*b* of the second bidirectional SW 24*b* and the charging SW element 62*c* of the third bidirectional SW 24*c* are turned on, and the other SW elements are turned off.

At time t21, when the input current Iinv of the inverter 26 becomes equal to or higher than the current threshold value THi2, the charging SW element 62*c* of the third bidirectional SW 24*c* is turned off, and thereafter, the generating SW element 60*b* of the second bidirectional SW 24*b* is turned on. Therefore, it is possible for the first battery 22*a* to be charged and discharged without a short circuit occurring between the first battery 22*a* and the second battery 22*b*. When the input current Iinv of the inverter 26 is equal to or higher than the current threshold value THi2 and equal to or lower than the current threshold value THi1, the SW elements 60, 62 remain thus turned on and off.

At time t22, when the input current Iinv of the inverter 26 becomes equal to or higher than the current threshold value THi1, the charging SW element 62*b* of the second bidirectional SW 24*b* is turned off, and thereafter, the generating SW element 60*a* of the first bidirectional SW 24*a* is turned on. The generating SW element 60*b* of the second bidirectional SW 24*b* is kept turned on. Therefore, electric power generation may switch to FC 152 without a short circuit occurring between the FC 152 and the first battery 22*a*.

Though the first bidirectional SW 24a and the second bidirectional SW 24b are turned on and off based on the input current Iinv of the inverter 26 as described above, the first bidirectional SW 24a and the second bidirectional SW 24b may be turned on and off based on the input voltage Vinv of the inverter 26 or the electric power consumed by the motor 12 or the electric power regenerated thereby. Alternatively, if times of switching between generation and charge can be determined, then the SW elements 60, 62 can be selectively turned on and off at prescribed times before and after the times of switching. The times of switching between generation and charge may be determined using a predicted time until actual electric power crosses a zero point.

C. Advantages of Fourth Embodiment

The fourth embodiment offers the following advantages in addition to the advantages of each of the above embodiments:

According to the fourth embodiment, in the electric power system 20c which uses three power supplies (the FC 152, the first battery 22a, and the second battery 22b), the SW elements 60, 62 can be controlled appropriately without using the voltage values of the power supplies.

V. Fifth Embodiment

A. Description of Arrangement (Differences from Fourth Embodiment)

Figure 27:
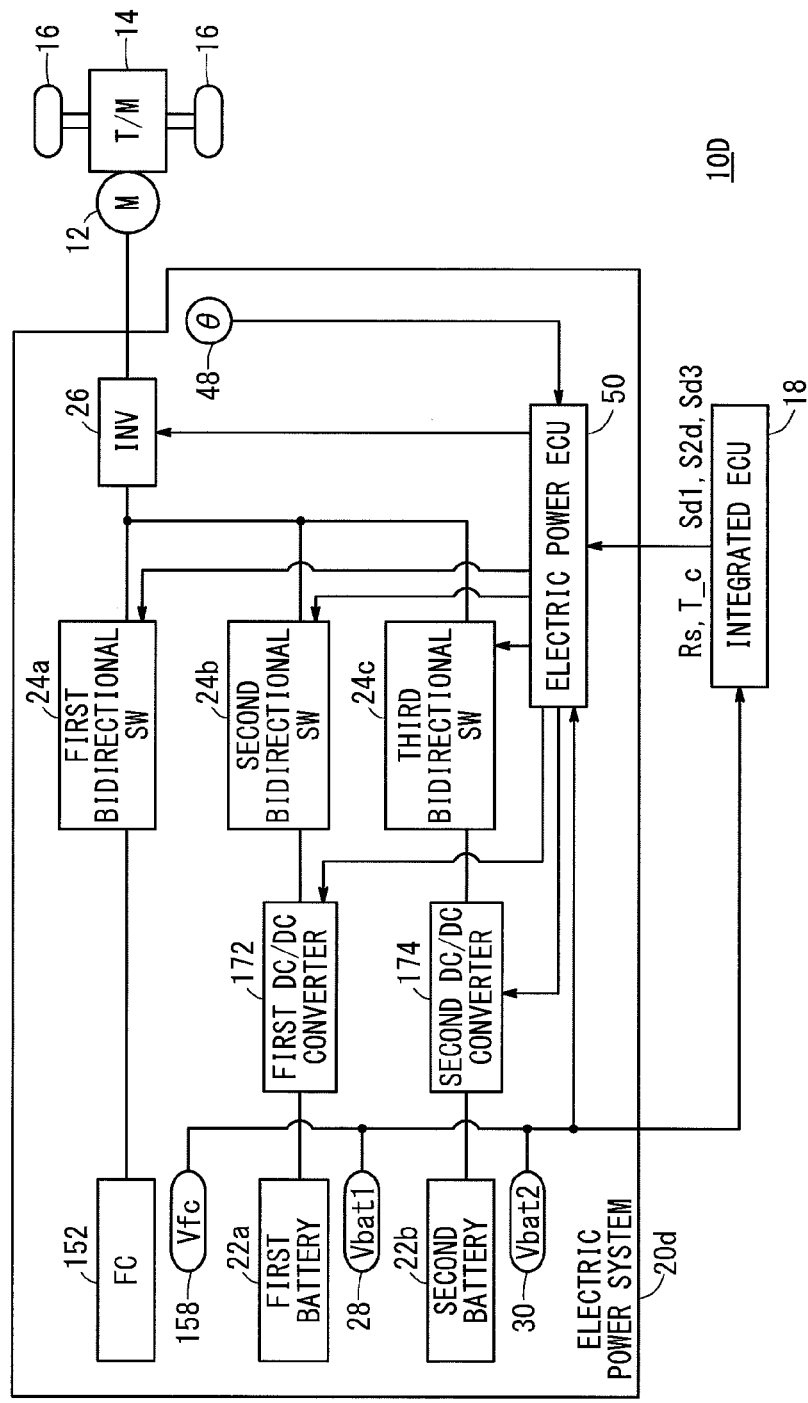
FIG. 27 is a block diagram of an electric automobile according to a fifth embodiment of the present invention.

FIG. 27 is a block diagram of an electric automobile 10D according to a fifth embodiment of the present invention. As with the electric automobile 10C according to the fourth embodiment, the electric automobile 10D has a traction motor 12, a transmission 14, road wheels 16, an integrated ECU 18, and an electric power system 20d. However, the electric automobile 10D is different from the electric automobile 10C according to the fourth embodiment in that the detected values from the voltage sensors 158, 28, 30, i.e., the FC voltage Vfc, the first battery voltage Vbat1, and the second battery voltage Vbat2, are required to be input to the integrated ECU 18, and the integrated ECU 18 selects the FC 152, the batteries 22, and so on.

Those components of the fifth embodiment which are identical to those of each of the above embodiments are denoted by identical reference characters, and will not be described in detail below.

B. On-Off Control for Bidirectional SWs 24

A control process for turning on and off the bidirectional SWs 24 will be described below.

According to the fifth embodiment, since the FC 152, the first battery 22a, and the second battery 22b are present as power supplies, the output electric power from the FC 152 is controlled using the output electric power from the first battery 22a or the second battery 22b, and the voltages of the power supplies, i.e., the FC voltage Vfc, the first battery voltage Vbat1, and the second battery voltage Vbat2, are used to select the power supplies. Therefore, the control process according to the first embodiment (FIG. 14), the control process according to the second embodiment (FIG. 20), the control process according to the third embodiment (FIG. 23), and the control process according to the fourth embodiment (FIG. 26) are basically used in combination.

The integrated ECU 18 selects and uses one of the modes shown in FIG. 28. According to the fifth embodiment, specifically, the integrated ECU 18 selects and uses one of the modes "STOP", "ONE POWER SUPPLY GENERATION", "ONE POWER SUPPLY CHARGE", "ONE POWER SUPPLY USE", "HIGH-VOLTAGE BATTERY GENERATION", "LOW-VOLTAGE BATTERY CHARGE", "ONE POWER SUPPLY GENERATION AND ONE POWER SUPPLY CHARGE", "HIGH-VOLTAGE BATTERY GENERATION AND ONE POWER SUPPLY CHARGE", and "ONE POWER SUPPLY GENERATION AND LOW-VOLTAGE BATTERY CHARGE".

In the "ONE POWER SUPPLY GENERATION" mode, when the FC 152 is used to generate electric power, which one of the first battery 22a and the second battery 22b is used to control the output electric power from the FC 152 can be determined based on the magnitude of the voltages of the batteries 22.

C. Advantages of Fifth Embodiment

The fifth embodiment offers the following advantages in addition to the advantages of each of the above embodiments:

According to the fifth embodiment, in the electric power system 20d which uses three power supplies (the FC 152, the first battery 22a, and the second battery 22b), the SW elements 60, 62 can be controlled appropriately using the voltage values of the power supplies.

VI. Modifications

The present invention is not limited to the above embodiments, but may employ various arrangements based on the contents of the description thereof. For example, the present invention may employ the following advantages:

A. Number of Power Supplies:

According to the first through third embodiments, electric power systems 20, 20a, 20b have two power supplies, i.e., the combination of the first battery 22a and the second battery 22b, or the combination of the FC 152 and the battery 154. According to the fourth and fifth embodiments, the electric power systems 20c, 20d have three power supplies, i.e., the combination of the FC 152, the first battery 22a, and the second battery 22b. However, the number of power supplies is not limited to those illustrated, but may be four or greater.

B. On-Off Control for Bidirectional SWs 24 for Four or More Power Supplies:

1. When No Power Supply Voltages are Used:

According to the first, third, and fifth embodiments, the bidirectional SWs 24 are selectively turned on and off even if the power supply voltages, i.e., the first battery voltage Vbat1, the second battery voltage Vbat2, the FC voltage Vfc, and the battery voltage Vbat, are not known. Similarly, if there are four or more power supplies, then even though the power supply voltages are not used, the bidirectional SWs 24 can be selectively turned on and off without causing a short circuit when at least one of a first control rule and a second control rule, similar to those according to the first embodiment, is satisfied.

Specifically, the first control rule which does not use the power supply voltages is that if there are N bidirectional SWs 24 (N is an integer of 2 or greater), there exist(s) (N−1) bidirectional SW or SWs 24 wherein both the generating SW element 60 and the charging SW element 62 are turned off. Stated otherwise, there exist(s) (N−1) electric power system or systems wherein both a generating path and a charging path are turned off. In the remaining one bidirectional SW 24, only one of the generating SW element 60 and the charging SW element 62 may be turned on, or both the generating SW element 60 and the charging SW element 62 may be turned on.

As shown in FIG. 29, for example, if the generating SW element 60 corresponding to the fourth power supply, i.e., the generating path of the fourth power supply, is turned on, and the other generating paths are turned off, then the charging SW element 62 corresponding to the fourth power supply, i.e., the charging path of the fourth power supply, may be turned on or off, but the other charging paths need to be turned off.

The second control rule which does not use the power supply voltages is that the generating SW elements 60 or the charging SW elements 62 of all (N) bidirectional SWs 24 are turned off. Stated otherwise, the generating paths or the charging paths of all the electric power systems are turned off. In this case, some or all charging paths or generating paths which are opposite to generating paths or charging paths all of which are turned off may be turned on.

As shown in FIG. 30, for example, if the generating paths of all the power supplies are turned off, then each of the charging paths may be turned on or off.

According to the first control rule and the second control rule described above, even though the number of power supplies is increased, a short-circuited state is prevented from occurring between the power supplies.

2. When Power Supply Voltages are Used:

According to the second and fourth embodiments, the bidirectional SWs 24 are selectively turned on and off using the power supply voltages, i.e., the first battery voltage Vbat1, the second battery voltage Vbat2, the FC voltage Vfc, and the battery voltage Vbat. Similarly, if there are four or more power supplies, then using the power supply voltages, the bidirectional SWs 24 can be selectively turned on and off without causing a short circuit between the power supplies when at least one of a first control rule and a second control rule, to be described below, is satisfied.

The first control rule which uses the power supply voltages is that the charging SW element 62 corresponding to the power supply whose power supply voltage is lower than the highest power supply voltage of the power supply (hereinafter referred to as "highest voltage power supply") among power supplies corresponding to the generating SW elements 60 that are turned on, is turned off. Stated otherwise, the charging path whose voltage is lower than the generating path whose voltage is highest (hereinafter referred to as "highest voltage generating path") among energized generating paths, is cut off. The charging SW elements 62 corresponding to the power supplies whose voltages are equal to or higher than the highest voltage power supply may be turned on or off. In other words, the charging paths whose voltages are equal to or higher than the highest voltage generating path may be turned on or off.

In an example shown in FIG. 31, among the first through nth power supplies arranged in the descending order of voltages, the power supply which corresponds to the generating SW element 60 (generating path) that is turned on and which has the highest voltage is the fourth power supply. The charging paths of the fifth through nth power supplies whose voltages are lower than the fourth power supply are turned off, and the charging paths of the first through fourth power supplies may be turned on or off.

The second control rule which uses the power supply voltages is that the generating SW element 60 corresponding to the power supply whose voltage is higher than the lowest voltage of the power supply (hereinafter referred to as "lowest voltage power supply") among power supplies corresponding to the charging SW elements 62 that are turned on, is turned off. Stated otherwise, the generating path whose voltage is higher than the charging path whose voltage is lowest (hereinafter referred to as "lowest voltage charging path") among energized charging paths, is cut off. The generating SW elements 60 corresponding to the power supplies whose voltages are equal to or lower than the lowest voltage power supply may be turned on or off. In other words, the generating paths whose voltages are equal to or lower than the lowest voltage generating path may be turned on or off.

In an example shown in FIG. 32, among the first through nth power supplies arranged in the descending order of voltages, the power supply whose charging path is turned on and which has the lowest voltage is the sixth power supply. The generating paths of the first through fifth power supplies whose voltages are higher than the sixth power supply are turned off, and the generating paths of the sixth through nth power supplies may be turned on or off.

According to the first control rule and the second control rule described above, even though the number of power supplies is increased, a short-circuited state is prevented from occurring between the power supplies.

C. Types of Power Supplies:

According to the first embodiment and the second embodiment, the first battery 22a and the second battery 22b are used. According to the third embodiment, the FC 152 and the battery 154 are used. According to the fourth embodiment and the fifth embodiment, the FC 152, the first battery 22a, and the second battery 22b are used. However, power supplies that can be used are not limited to those power supplies, but a combination of an engine and an alternator may be used as a power supply.

D. Switching Between Modes:

In the above embodiments, some simple control processes and some stepwise switching processes have been referred to as switching control for the bidirectional SWs 24. However, mode switching is not limited to those control processes. For switching between modes, all the switching elements 60, 62 may temporarily be turned off, and thereafter a new mode may be selected.

Figure 33:
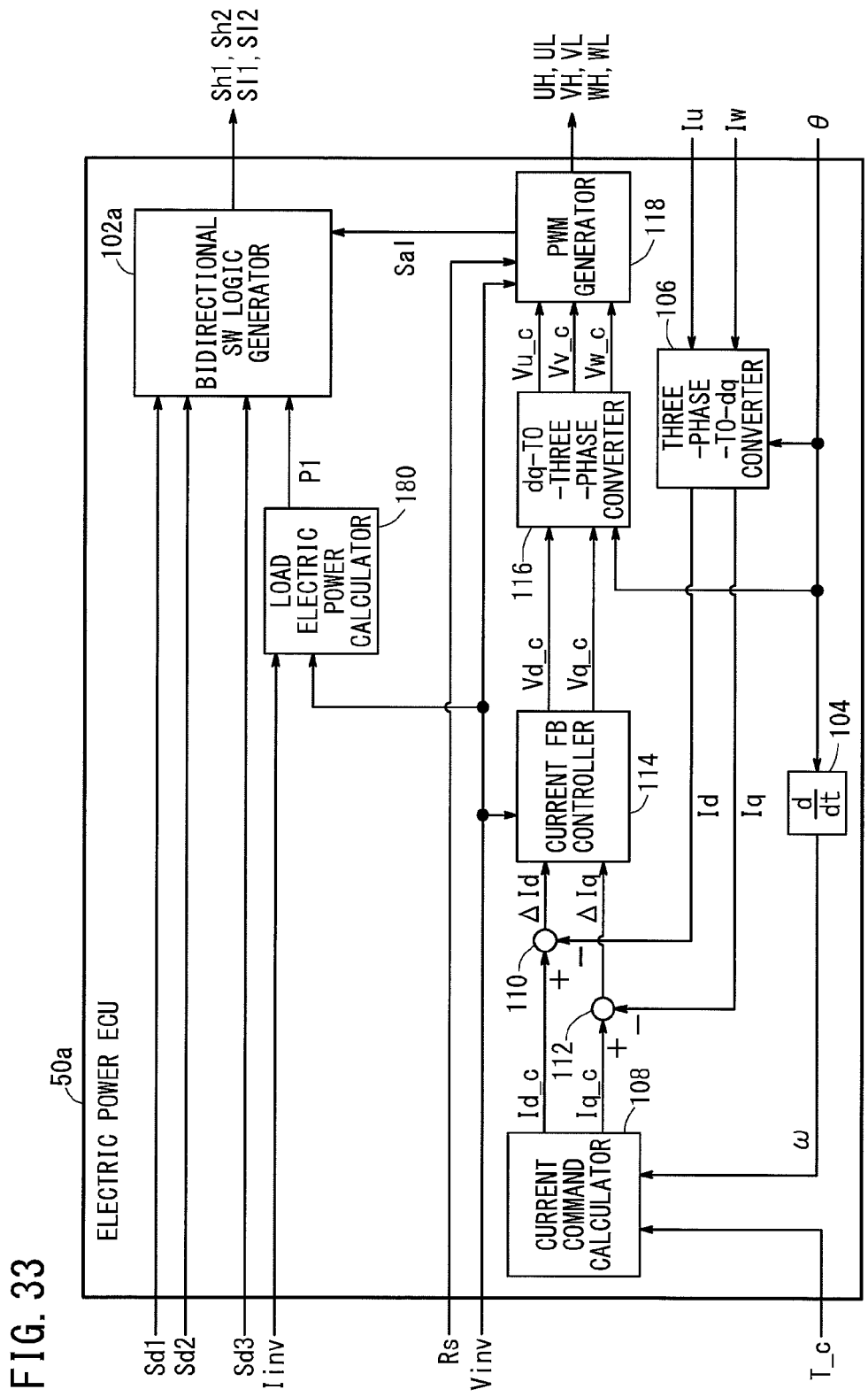
FIG. 33 is a functional block diagram of a first modification of the electric power electronic control unit shown in FIG. 7.

E. Electric Power ECU 50:

In the above embodiments, the electric power ECU 50 having the arrangement shown in FIG. 7 is used (see FIGS. 1, 19, 21, 24, and 27). The electric power ECU 50 is not limited to the arrangement shown in FIG. 7, but may be arranged according to the following modifications:

1. First Modification:

An electric power electronic control unit 50a (hereinafter referred to as "electric power ECU 50a") shown in FIG. 33 is different from the electric power ECU 50 shown in FIG. 7 in that it has a load electric power calculator 180. The load electric power calculator 180 calculates a load electric power P1 by multiplying the input voltage Vinv of the inverter 26 by the input current Iinv thereof, and outputs the calculated load electric power P1 to a bidirectional switch logic generator 102a (hereinafter referred to as "bidirectional SW logic generator 102a" or "logic generator 102a") (P1=Vinv*Iinv).

Figure 34:
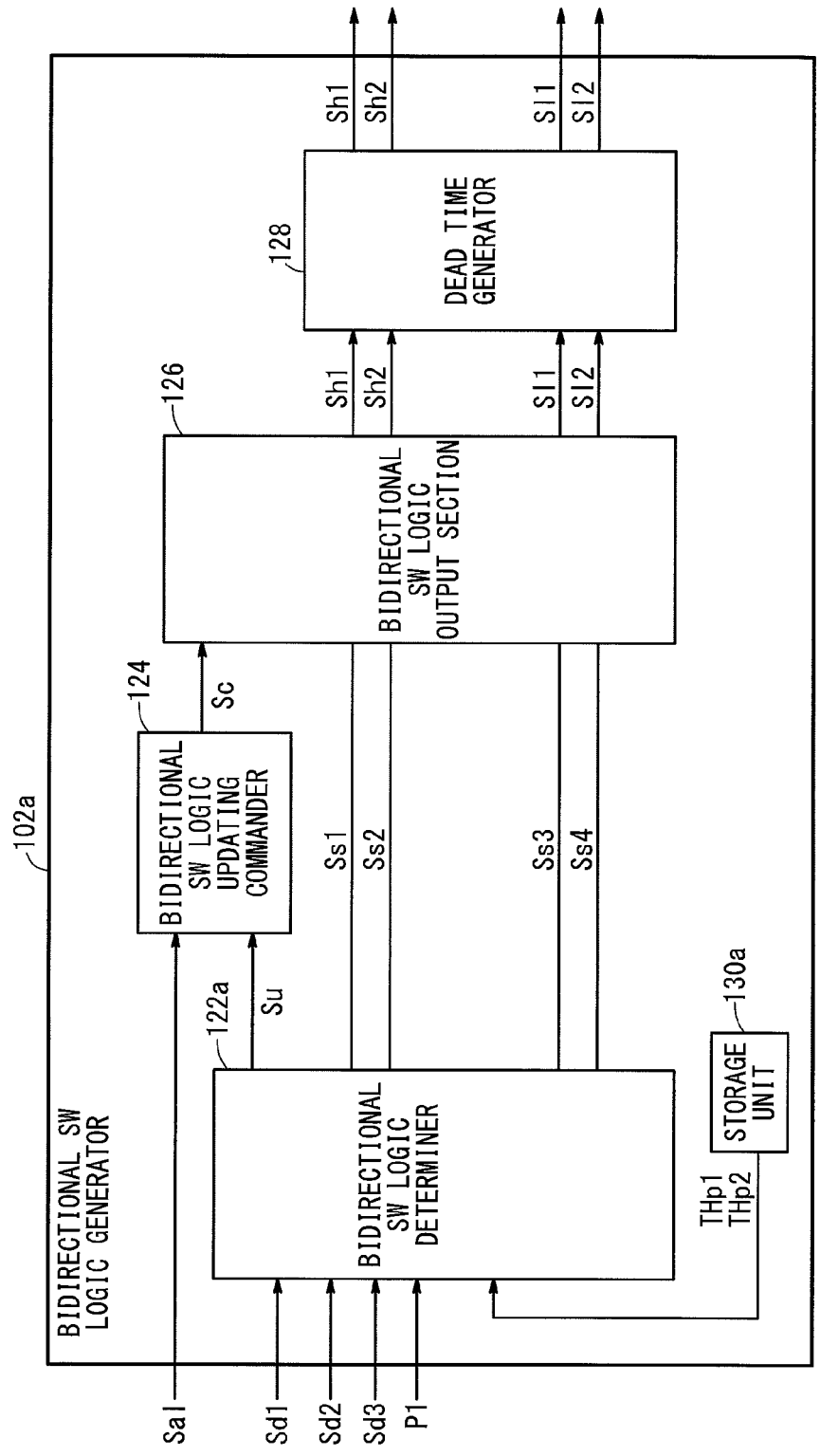
FIG. 34 is a functional block diagram of a bidirectional switch logic generator used in the electric power electronic control unit shown in FIG. 33.

FIG. 34 is a functional block diagram of the logic generator 102a. The logic generator 102a has a bidirectional switch logic determiner 122a (hereinafter referred to as "bidirectional SW logic determiner 122a" or "logic determiner 122a") which outputs SW element selection signals Ss1, Ss2, Ss3, Ss4 based on power supply indicating signals Sd1, Sd2, Sd3 from the integrated ECU 18, the load electric power PI from the load electric power calculator 180 and electric power threshold values THp1, THp2 (THp1>THp2) from a storage unit 130a.

More specifically, the logic generator 102a compares the load electric power P1 with the electric power threshold values THp1, THp2. If the load electric power P1 is greater than the electric power threshold value THp1, then logic generator 102a judges a "GENERATION MODE". If the load electric power P1 is equal to or greater than the electric power threshold value THp2 and equal to or smaller than the electric power threshold value THp1, then the logic determiner 122a judges a "GENERATION/CHARGE SWITCHING MODE". If the load electric power P1 is smaller than the electric power threshold value THp2, then the logic determiner 122a judges a "CHARGE MODE" (see FIGS. 15 and 16).

Figure 35:
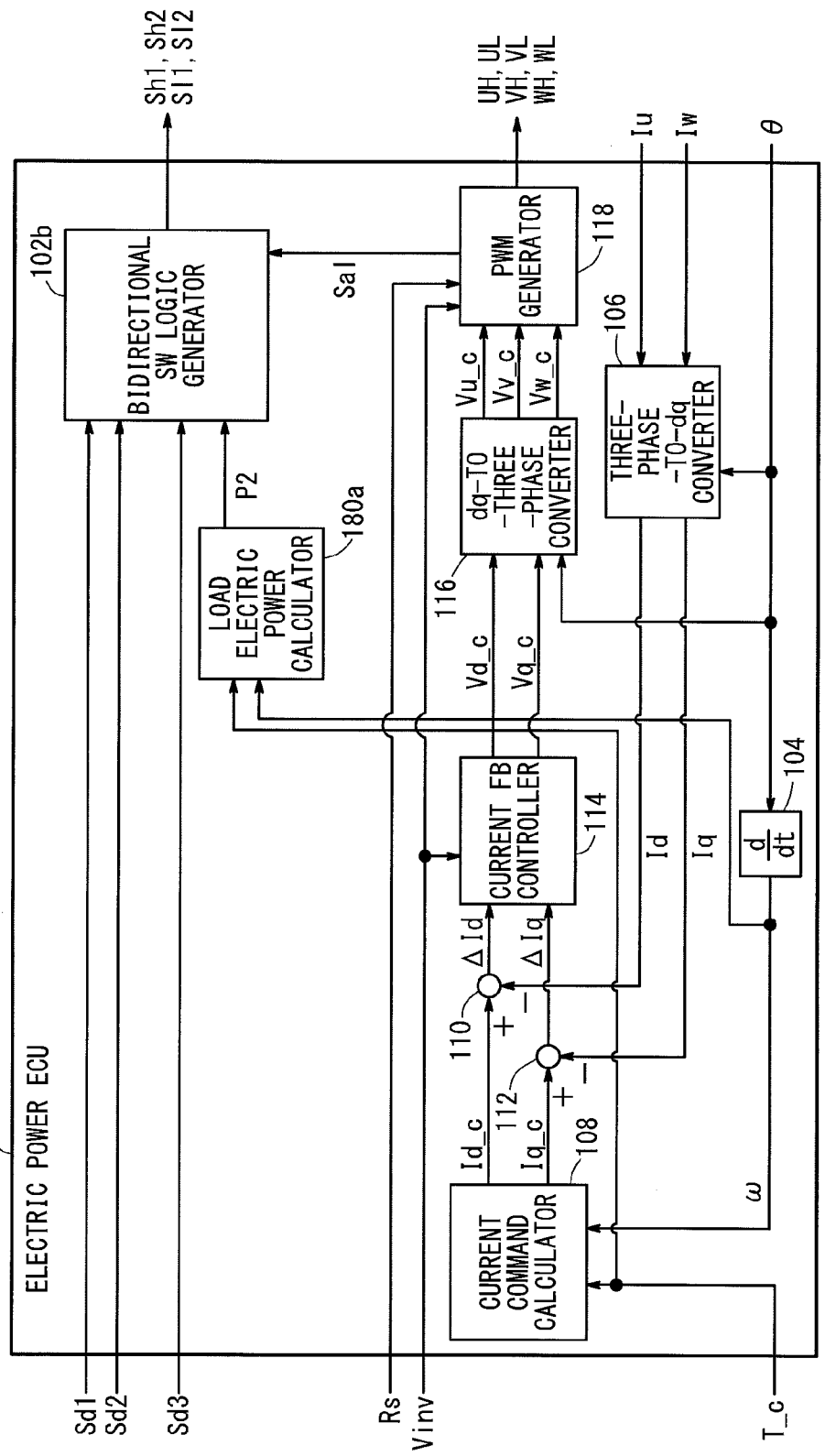
FIG. 35 is a functional block diagram of a second modification of the electric power electronic control unit shown in FIG. 7.

2. Second Modification:

An electric power electronic control unit 50b (hereinafter referred to as "electric power ECU 50b") shown in FIG. 35 is different from the electric power ECU 50 shown in FIG. 7 in that it has a load electric power calculator 180a. The load electric power calculator 180a calculates a load electric power P2 by dividing the product of the electrical angular velocity ω and the torque command value T_c by the number of pole pairs of the motor 12, and outputs the calculated load electric power P2 to a bidirectional switch logic generator 102b (hereinafter referred to as "bidirectional SW logic generator 102b" or "logic generator 102b") (P2=ω*T/number of pole pairs).

The logic generator 102b is identical in configuration to the logic generator 102a according to the first modification. The logic generator 102b outputs SW element selection signals Ss1, Ss2, Ss3, Ss4 based on the power supply indicating signals Sd1, Sd2, Sd3 from the integrated ECU 18, the load electric power P2 from the load electric power calculator 180a, and the electric power threshold values THp1, THp2 (THp1>THp2) from the storage unit 130a.

More specifically, the logic generator 102b compares the load electric power P2 with the electric power threshold values THp1, THp2. If the load electric power P2 is greater than the electric power threshold value THp1, then logic generator 102b judges a "GENERATION MODE". If the load electric power P2 is equal to or greater than the electric power threshold value THp2 and equal to or smaller than the electric power threshold value THp1, then the logic generator 102b judges a "GENERATION/CHARGE SWITCHING MODE". If the load electric power P2 is smaller than the electric power threshold value THp2, then the logic generator 102b judges a "CHARGE MODE" (see FIGS. 15 and 16).

Figure 36:
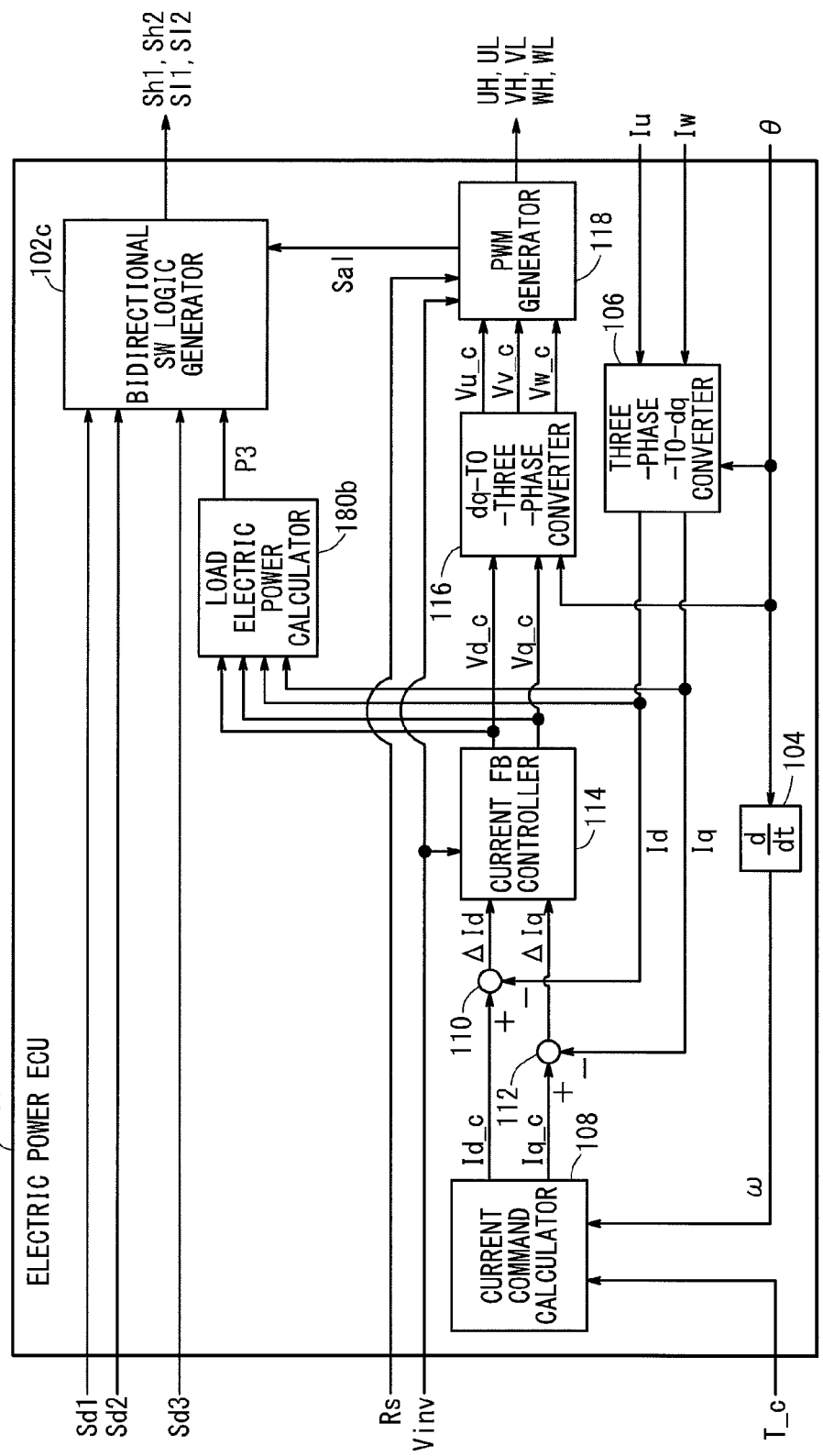
FIG. 36 is a functional block diagram of a third modification of the electric power electronic control unit shown in FIG. 7.

3. Third Modification:

An electric power electronic control unit 50c (hereinafter referred to as "electric power ECU 50c") shown in FIG. 36 is different from the electric power ECU 50 shown in FIG. 7 in that it has a load electric power calculator 180b. The load electric power calculator 180b calculates a load electric power P3 by adding the product of the d-axis voltage command value Vd_c and the d-axis current Id to the product of the q-axis voltage command value Vq_c and the q-axis current Iq, and outputs the calculated load electric power P3 to a bidirectional switch logic generator 102c (hereinafter referred to as "bidirectional SW logic generator 102c" or "logic generator 102c") (P3=Vd_c*Id+Vq_c*Iq).

The logic generator 102c is identical in configuration to the logic generator 102a according to the first modification. The logic generator 102c outputs SW element selection signals Ss1, Ss2, Ss3, Ss4 based on the power supply indicating signals Sd1, Sd2, Sd3 from the integrated ECU 18, the load electric power P3 from the load electric power calculator 180b, and the electric power threshold values THp1, THp2 (THp1>THp2) from the storage unit 130a.

More specifically, the logic generator 102c compares the load electric power P3 with the electric power threshold values THp1, THp2. If the load electric power P3 is greater than the electric power threshold value THp1, then logic generator 102c judges a "GENERATION MODE". If the load electric power P3 is equal to or greater than the electric power threshold value THp2 and equal to or smaller than the electric power threshold value THp1, then the logic generator 102c judges a "GENERATION/CHARGE SWITCHING MODE". If the load electric power P3 is smaller than the electric power threshold value THp2, then the logic generator 102c judges a "CHARGE MODE" (see FIGS. 15 and 16).

Figure 37:
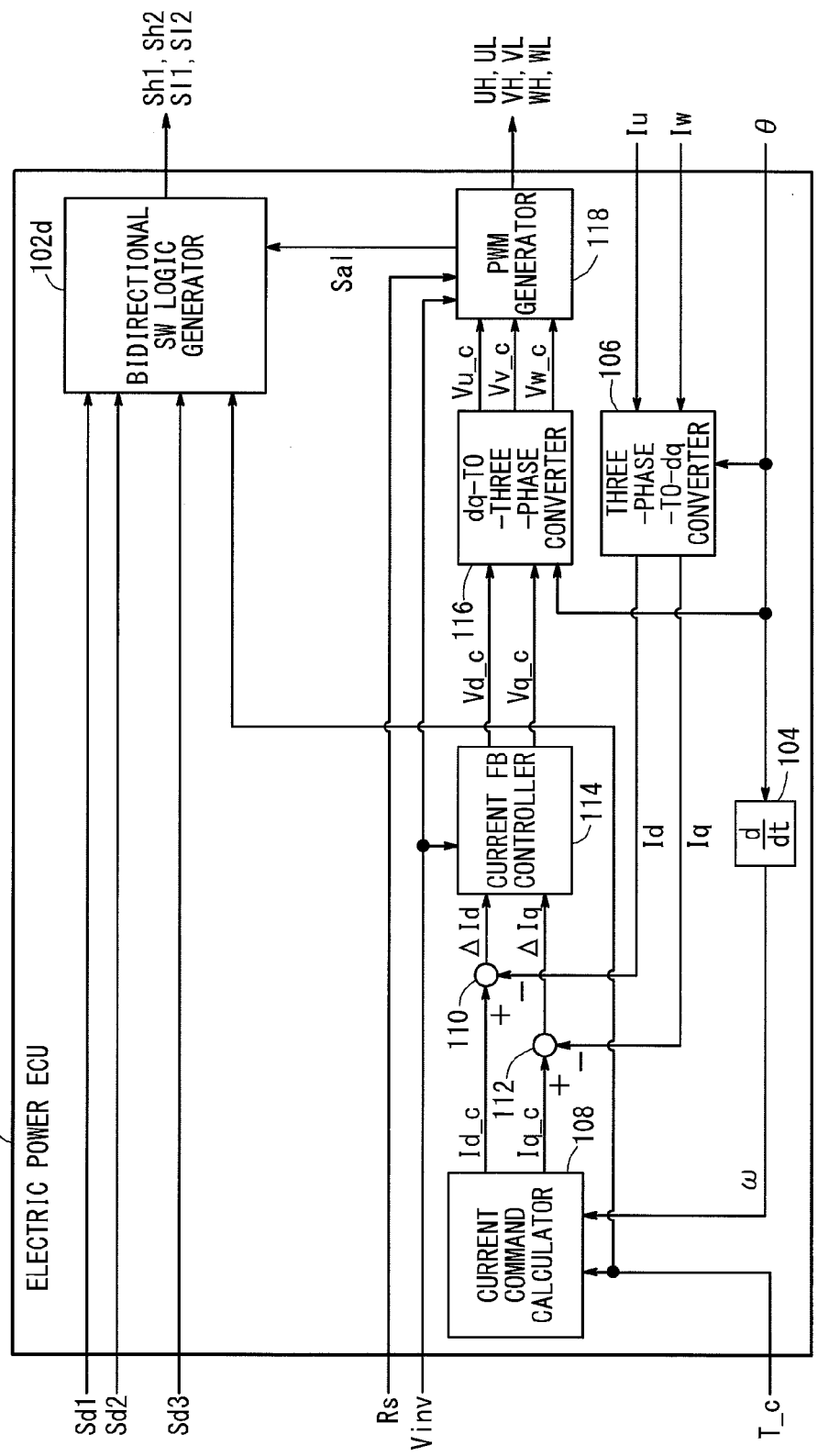
FIG. 37 is a functional block diagram of a fourth modification of the electric power electronic control unit shown in FIG. 7.

4. Fourth Modification:

An electric power electronic control unit 50d (hereinafter referred to as "electric power ECU 50d") shown in FIG. 37 is different from the electric power ECU 50 shown in FIG. 7 in that the torque command value T_c is input to a bidirectional switch logic generator 102d (hereinafter referred to as "bidirectional SW logic generator 102d" or "logic generator 102d").

The logic generator 102d outputs SW element selection signals Ss1, Ss2, Ss3, Ss4 based on the power supply indicating signals Sd1, Sd2, Sd3 from the integrated ECU 18, the torque command value T_c from the integrated ECU 18, and torque threshold values THt1, THt2 (THt1>THt2) from the storage unit 130a.

More specifically, the logic generator 102d compares the torque command value T_c with the torque threshold values THt1, THt2. If the torque command value T_c is greater than the torque threshold value THt1, then logic generator 102d judges a "GENERATION MODE". If the torque command value T_c is equal to or greater than the torque threshold value THt2 and equal to or smaller than the torque threshold value THt1, then the logic generator 102d judges a "GENERATION MODE/CHARGE SWITCHING MODE". If the torque command value T_c is smaller than the torque threshold value THt2, then the logic generator 102d judges a "CHARGE MODE" (see FIGS. 15 and 16).

The invention claimed is:

1. A power supply system, comprising:
a primary side including at least two power supplies whose power supply voltages are variable independently of each other;
a secondary side including an inverter and a drive motor connected to the inverter;
at least two electric power systems connecting the primary side and the secondary side with the at least two power supplies being parallel to each other;
semiconductor switches for being rendered nonconductive separately in a generating direction and a charging direction of bidirectional conduction, one semiconductor switch being disposed per electric power system; and a control unit for controlling nonconduction of the semiconductor switches;

wherein smoothing capacitors are connected in parallel to the power supplies on the primary side, respectively, and closer to the power supplies than the semiconductor switches;

the semiconductor switches are connected in series with the power supplies and the smoothing capacitors;

the semiconductor switches are connected to the inverter through a single junction on each of a positive side and a negative side, and each of the semiconductor switches are controllable so that each is able to be separately rendered non-conductive in the generating direction and the charging direction of a bidirectional current flow, depending upon modes in which the at least two electric power systems are used;

the semiconductor switches are bidirectional switches each including a generating switching element and a charging switching element, wherein the generating switching element allows or prevents discharge from the associated electric power system to the inverter, and the charging switching element allows or prevents charge from the inverter to the associated electric power system; and the semiconductor switches are connected to motor windings without an intervening additional smoothing capacitor, wherein the control unit selectively carries out a first cut-off control process for cutting off both a generating path and a charging path of at least one of the electric power systems and a second cut-off control process for cutting off all generating paths of all the electric power systems, and for fixedly rendering the semiconductor switches conductive or nonconductive in at least one switching period of the semiconductor switches, the control unit carries out at least one of the first cut-off control process and the second cut-off control process, and if the control unit carries out only the first cut-off control process, the control unit controls conduction or nonconduction of the semiconductor switches such that the first cut-off control process is performed on one or more of the electric power systems, wherein the power supply system is incorporated in an electric automobile and the control unit controls the semiconductor switches for changing from a bidirectionally conductive state of one of the power supplies to a bidirectionally conductive state of another one of the power supplies when the electric automobile is in an intermediate mode between a power mode and a regenerative mode, and wherein the intermediate mode is determined by a predicted time until actual electric power crosses a zero point.

2. The power supply system according to claim 1, wherein a dead time is inserted into drive signals for the semiconductor switches for switching between the generating path of one of the power supplies and the charging path of another one of the power supplies.

3. The power supply system according to claim 1, wherein the control unit simultaneously turns on at least two of the generating switching elements when the electric automobile is in the power mode.

4. The power supply system according to claim 1, wherein the control unit simultaneously turns on at least two of the charging switching elements when the electric automobile is in the regenerative mode.

5. The power supply system according to claim 1, wherein
it is judged whether the electric automobile is in the power mode or the regenerative mode;
at least two generating switching elements are connected if the electric automobile is in the power mode; and
at least two charging switching elements are connected if the electric automobile is in the regenerative mode.

6. The power supply system according to claim 5, wherein
it is judged whether the electric automobile is in the intermediate mode between the power mode and the regenerative mode; and
the control unit controls the semiconductor switches to render one of the power supplies conductive bidirectionally and render another one of the power supplies nonconductive bidirectionally when the electric automobile is in the intermediate mode.

7. The power supply system according to claim 1, wherein the intermediate mode is judged based on at least one command value of an input electric power, and an input current of the inverter, and a torque of the drive motor, or a load electric power of the drive motor.

8. The power supply system according to claim 1, wherein the control unit selectively renders semiconductor switches conductive or nonconductive while a three-phase short-circuited state is being developed in the inverter.

9. The power supply system according to claim 1, wherein the power supplies include an electric energy storage device.

10. The power supply system according to claim 1, wherein the power supplies include a fuel cell and an electric energy storage device.

11. The power supply system according to claim 1, wherein the power supplies include an electric generator and an electric storage device.

12. The power supply system according to claim 6, wherein the intermediate mode is judged based on at least one command value or measured value of an input electric power and an input current of the inverter and a torque and a load electric power of the drive motor.

13. The power supply system according to claim 1, wherein the intermediate mode is judged based on at least one measured value of an input electric power, an input current of the inverter, a torque of the drive motor, or a load electric power of the drive motor.

* * * * *